US010838463B2

(12) United States Patent
Park et al.

(10) Patent No.: US 10,838,463 B2
(45) Date of Patent: Nov. 17, 2020

(54) INPUT APPARATUS IN ELECTRONIC DEVICE AND CONTROL METHOD THEREOF

(71) Applicant: Samsung Electronics Co., Ltd., Gyeonggi-do (KR)

(72) Inventors: Sungeun Park, Gyeonggi-do (KR); Jong-Chul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 15/843,560

(22) Filed: Dec. 15, 2017

(65) Prior Publication Data

US 2018/0173279 A1  Jun. 21, 2018

(30) Foreign Application Priority Data

Dec. 16, 2016  (KR) .......................... 10-2016-0172727

(51) Int. Cl.
*G06F 1/16* (2006.01)
(52) U.S. Cl.
CPC ............ *G06F 1/1656* (2013.01); *G06F 1/163* (2013.01)
(58) Field of Classification Search
CPC ............................... G06F 1/1656; G06F 1/163
USPC .......................................................... 361/170
See application file for complete search history.

(56) References Cited

U.S. PATENT DOCUMENTS

| 7,959,352 | B2* | 6/2011 | Bonnet | G04B 3/06 368/319 |
| 2009/0122656 | A1 | 5/2009 | Bonnet et al. | |
| 2015/0189134 | A1* | 7/2015 | Joo | G06F 1/1686 348/373 |
| 2016/0170445 | A1* | 6/2016 | Wai | G06F 1/163 361/679.03 |
| 2016/0192526 | A1* | 6/2016 | Gao | G04G 17/08 361/679.01 |

FOREIGN PATENT DOCUMENTS

| KR | 10-1451990 B1 | 10/2014 |
| KR | 10-1454030 B1 | 10/2014 |

* cited by examiner

*Primary Examiner* — Dharti H Patel
(74) *Attorney, Agent, or Firm* — Cha & Reiter, LLC

(57) ABSTRACT

An electronic device may include a housing with an internal space and a hole comprising an opening through the housing; an actuator extending in a direction from a first end to a second end, and coupled to the hole to be movable in the direction, the first end exposed to the outside of the housing and the second end disposed to the internal space; at least one electronic component disposed the internal space, the electronic component generating an electric signal when the actuator is moved in the direction in response to application of an external force applied at the first end; and a stopper being configured to regulate a movement of the actuator in the direction in a specific state of the electronic device. Various other embodiments are possible.

20 Claims, 29 Drawing Sheets

INPUT APPARATUS IN ELECTRONIC DEVICE AND CONTROL METHOD THEREOF

CLAIM OF PRIORITY

The present application is related to and claims priority under 35 U.S.C. § 119 to an application filed in the Korean Intellectual Property Office on Dec. 16, 2016 and assigned Serial No. 10-2016-0172727, the entire contents of which are incorporated herein by reference.

BACKGROUND

1. Technical Field

Various embodiments of the present disclosure relate to an input apparatus in an electronic device and a control method thereof.

2. Description of the Related Art

With the development of digital technology, electronic devices are provided in various forms like a smart phone, a tablet personal computer (PC), a personal digital assistant (PDA), or the like. Electronic devices are developing into forms that can be worn on users to enhance portability and users' accessibility. Such wearable electronic devices may include wearable computers such as watches, virtual reality (mixed reality) experience devices such as head-mounted displays (HMDs), or smart clothes. They may be utilized in various fields such as industrial fields or medicine fields as well as for individuals.

An electronic device may include a screen for displaying an image. Such a screen may be a touch-sensitive screen and may be used to detect a user input. The electronic device may provide at least one input apparatus such as a key button as well as the screen. For example, the input apparatus may include a push button, and the bush button may be installed on the exterior of the electronic device in the proximity of the screen, and may enable a user input for controlling the electronic device without hiding the screen of the electronic device.

For example, when the electronic device is dropped, the input apparatus may bump into or impact a floor. When the input apparatus is installed to protrude relative to the exterior of the electronic device, there is a high possibility that an external shock or load is directly applied to the input apparatus (for example, an actuator of the input apparatus) due to the drop. The electronic device may include at least a portion that is interlocked with the input apparatus. For example, the at least portion may be various types of electronic elements or components which generate electric signals by a mechanical actuation of the input apparatus according to a user's operation (or action). When the external shock or load applied to the input apparatus goes beyond a design criterion regarding the mechanical actuation of the input apparatus, a portion of the input apparatus or another portion interlocked with the input apparatus may be damaged.

Nothing in the background section shall be construed as an admission of prior art unless otherwise noted.

SUMMARY

The present disclosure addresses at least the above problems and disadvantages, and provides at least the advantages described below. Accordingly, an aspect of the present disclosure is to provide an input apparatus for preventing a portion of the input apparatus or another portion functionally (or operatively) coupled to the input apparatus from being damaged when an external shock or a load going beyond a design criterion is applied to the input apparatus, and a control method thereof.

Another aspect of the present disclosure is to provide an input apparatus for preventing a shock or a load generated when the input apparatus disposed on the exterior of an electronic device bumps into a floor due to dropping of the electronic device from being transmitted to a portion of the input apparatus or another portion functionally coupled to the input apparatus, and a control method thereof.

According to an aspect of the present disclosure, an electronic device may includes: a housing with an internal space and a hole comprising an opening through the housing; an actuator extending in a direction from a first end to a second end, and coupled to the hole to be movable in the direction, the first end exposed to the outside of the housing and the second end disposed to the internal space; at least one electronic component disposed the internal space, the electronic component generating an electric signal when the actuator is moved in the direction in response to application of an external force applied at the first end; and a stopper being configured to regulate a movement of the actuator in the direction in a specific state of the electronic device.

According to another aspect of the present disclosure, an operation method of an electronic device includes: determining a posture of the electronic device; when the posture of the electronic device is a specific posture, determining whether the electronic device is dropped or not; and when it is determined that the electronic device is dropped, regulating a movement of an actuator of an input apparatus installed in the electronic device.

According to various embodiments of the present disclosure, the electronic device is designed to prevent the actuator (or a key button actuator) of the input apparatus from being moved toward the electronic component when the electronic device is dropped. Therefore, an external shock or load may not be transmitted to the electronic component through the actuator and the electronic component can be protected from the external shock or load.

These and other aspects of the present disclosure are more fully described hereinbelow with reference to the accompanying figures.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
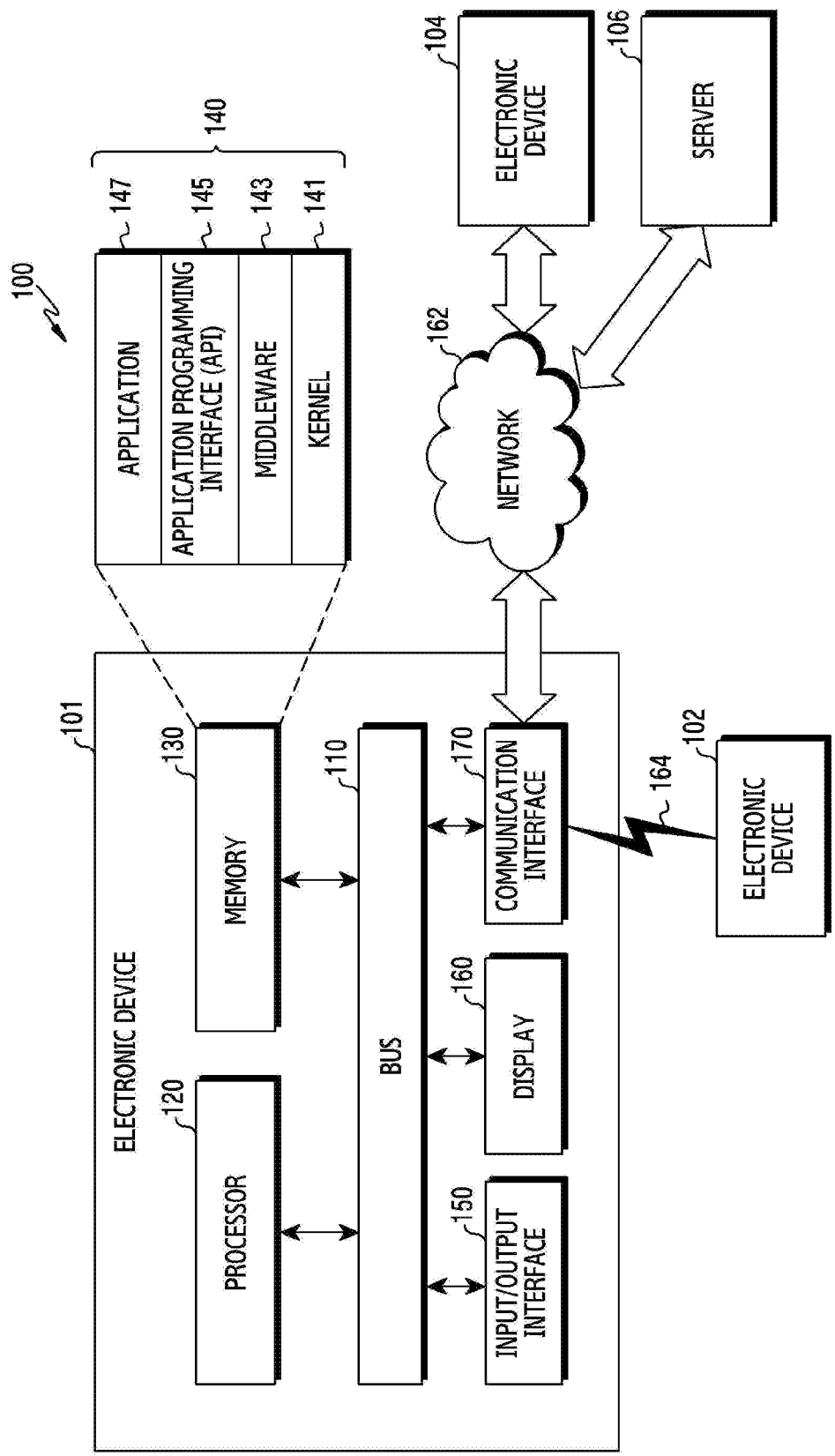
FIG. 1 is a block diagram of a network environment system according to an embodiment of the present disclosure.

Various embodiments of the present disclosure will be described hereinbelow with reference to the accompanying drawings. However, exemplary embodiments and terms used herein are not intended to limit the technical features described in the present disclosure to specific embodiments, and should be construed as including modifications, equivalents and/or alternatives of exemplary embodiments of the present disclosure. In the explanation of the drawings, similar reference numerals are used for similar elements. The terms of a singular form may include plural forms unless the context clearly indicates otherwise. The terms "A or B" or "at least one of A and/or B" used in the present disclosure include any and all combinations of the associated listed items. The terms such as "first" and "second" may be used in embodiments of the present disclosure to modify corresponding elements regardless of the order or importance of the elements, and may be used to distinguish one element from another and do not limit the corresponding elements. It will be understood that, when an element (for example, a first element) is mentioned as being "functionally or communicatively coupled with/to" or "connected to" another element (for example, a second element), the element may be directly coupled or connected to another element, or there may be an intervening element (for example, a third element) between the element and another element.

The term "configured (or set) to . . . " used in the embodiments may be interchangeably used with the terms "suitable for . . . ," "having the capacity to . . . ," "adapted to . . . ," "made to . . . ," "capable of . . . ," or "designed to" in a hardware or software level depending on a situation. In a certain situation, the term "a device configured to . . . " may mean "the device being capable of . . . " with other devices or parts. For example, "a processor configured (set) to perform A, B, and C" may mean a dedicated processor (for example, an embedded processor) for performing a corresponding operation, or a generic-purpose processor (for example, a central processing unit (CPU) or an application processor (AP)) for performing corresponding operations by executing one or more software programs stored in a memory device.

An electronic device according to various embodiments of the present disclosure may include at least one of smartphones, tablet PCs, mobile phones, video telephones, electronic book readers, desktop PCs, laptop PCs, netbook computers, workstations, PDAs, portable multimedia players (PMPs), Motion Picture Experts Group (MPEG-1 or MPEG-2) Audio Layer 3 (MP3) players, medical devices, cameras, or wearable devices. The wearable devices may include at least one of accessories (for example, watches, rings, bracelets, ankle bracelets, necklaces, glasses, contact lenses, or head-mounted-devices (HMDs)), fabric- or clothing-mounted devices (for example, electronic apparels), body-mounted devices (for example, skin pads, tattoos, etc.), bio-implantable circuits, and the like. According to some embodiments, the electronic devices may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™ Apple TV™, or Google TV™), game consoles (for example, Xbox™ and PlayStation™) electronic dictionaries, electronic keys, camcorders, electronic picture frames, and the like.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or Internet of things (for example, light bulbs, various sensors, sprinkler devices, fire alarms, thermostats, street lamps, toasters, exercise equipment, hot water tanks, heaters, boilers, and the like). According to a certain embodiment, the electronic devices may include at least one of furniture, a part of buildings/structures or cars, electronic boards, electronic signature receiving devices, projectors, or various measuring instruments (for example, water meters, electricity meters, gas meters, or wave meters, and the like). The electronic devices according to various embodiments may be flexible or may be a combination of two or more of the above-mentioned devices. Also, electronic devices according to various embodiments of the present disclosure are not limited to the above-mentioned devices. In the present disclosure, the term "user" may refer to a person who uses the electronic device or a device that uses the electronic device (for example, an artificial intelligence electronic device).

Referring to FIG. 1, there is illustrated an electronic device 101 in a network environment 100 according to various embodiments. The electronic device 101 may include a bus 110, a processor 120, a memory 130, an input/output interface 150, a display 160, and a communication interface 170. According to a certain embodiment, the electronic device 101 may not include at least one of the above-described elements or may further include other or additional element(s). The bus 110 may interconnect the above-described elements 120-170 and may include a circuit for conveying communications (for example, a control message or data) among the above-described elements. The processor 120 may include one or more of a central processing unit (CPU), an application processor (AP), or a communication processor (CP). The processor 120 may perform, for example, an operation or data processing associated with control and/or communication of at least one other element(s) of the electronic device 101.

The memory 130 may include a volatile memory and/or nonvolatile memory. The memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be called an "operating system (OS)." The kernel 141 may control or manage system resources (for example, the bus 110, the processor 120, the memory 130, and the like) that are used to execute operations or functions of other programs (for example, the middleware 143, the API 145, or the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (for example, the bus 110, the processor 120, the memory 130, or the like) of the electronic device 101, to at least one of the application program 147, and may process the one or more task requests. The API 145 may be an interface through which the application program 147 controls a function provided by the kernel 141 or the middleware 143, and may include, for example, at least one interface or function (for example, an instruction) for a file control, a window control, image processing, a character control, or the like. The input/output interface 150 may transmit an instruction or data, inputted from a user or another external device, to other element(s) of the electronic device 101. Furthermore, the input/output interface 150 may output an instruction or data, received from other element(s) of the electronic device 101, to a user or another external device.

According to an embodiment, the input/output interface 150 may include an actuator which is movably coupled to a hole formed in a housing forming the exterior of the electronic device 101 although it is not shown. The actuator may be formed in a shaft shape such that it extends in a direction from one end exposed to the outside of the housing to the other end not exposed to the outside of the housing. The input/output interface 150 may include at least one electronic component (for example, a push button switch) accommodated in the housing. When the actuator is moved in the direction by an external force applied to one end of the actuator, the at least one electronic component may generate an electric signal. The input/output interface 150 may include a stopper for regulating movement of the actuator in a specific state. For example, when the electronic device 101 is in a specific posture, the stopper may be moved to a position for regulating the movement of the actuator. According to an embodiment, the specific posture may be a posture in which a direction opposite to the direction is substantially parallel to a gravity direction or forms an acute angle. For example, the specific posture may be a posture in which the electronic device 101 is dropped with the actuator facing substantially in the gravity direction.

According to an embodiment, the stopper may be designed to be moved to the position by gravity. According to a certain embodiment, the input/output interface 150 may include at least one electromagnet. When the at least one electromagnet is controlled by the processor 120, the stopper may be moved by the force of attraction or repulsion of the at least one electromagnet.

According to an embodiment, the processor 120 may determine whether the electronic device 101 is dropped or not when the electronic device 101 is in the specific posture. For example, when the electronic device 101 is moved in the gravity direction with a gravitational acceleration for longer than a threshold time, the processor 120 may recognize that the electronic device 101 is in a dropping state. When the dropping of the electronic device 101 is determined, the processor 120 may move the stopper to the position for regulating the movement of the actuator.

According to various embodiments, when a wearing or carrying state of the electronic device 101 is determined, the processor 120 may move the stopper to a position for allowing the movement of the actuator.

According to various embodiments, when it is recognized that the electronic device 101 is not in the wearing or carrying state, the processor 120 may determine a posture of the electronic device 101. When the posture of the electronic device 101 is the specific posture, the processor 120 may determine whether the electronic device 101 is dropped or not. When it is determined that the electronic device 101 is dropped, the processor 120 may move the stopper to the position for regulating the movement of the actuator.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (for example, a text, an image, a video, an icon, and/or a symbol) to a user. The display 160 may include a touch screen and may receive, for example, a touch, gesture, proximity, or hovering input using an electronic pen or a portion of a user's body. The communication interface 170 may establish communication between the electronic device 101 and an external device (for example, a first external electronic device 102, a second external electronic device 104, or a server 106). For example, the communication interface 170 may be connected to a network 162 through wireless communication or wired communication to communicate with the external device (for example, the second external electronic device 104 or the server 106).

The wireless communication may include cellular communication using at least one of, for example, long-term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include short range wireless communication 164. The wireless communication may include, for example, at least one of wireless fidelity (WiFi), Bluetooth, Bluetooth low energy (BLE), Zigbee, near field communication (NFC), magnetic secure transmission, radio frequency (RF), or a body area network (BAN). According to an embodiment, the wireless communication may include global navigation satellite system (GNSS). The GNSS may include, for example, global positioning system (GPS), global navigation satellite system (Glonass), BeiDou navigation satellite system (hereinafter, referred to as "BeiDou") or Galileo, the European global satellite-based navigation system. Hereinafter, "GPS" and "GNSS" may be interchangeably used in the following descriptions. The wired communication may include at least one of, for example, a universal serial bus (USB), a high-definition multimedia interface (HDMI), a recommended standard-232 (RS-232), power line communication, or a plain old telephone service (POTS). The network 162 may include at least one of telecommunications networks, for example, a computer network (for example, local area network (LAN) or wide area network (WAN)), Internet, or a telephone network.

Each of the first and second external electronic devices 102 and 104, respectively, may be the same as or different type of device as or from the electronic device 101. According to various embodiments, all or a part of operations that the electronic device 101 will perform may be executed by another or plural other electronic devices (for example, the electronic devices 102 and 104 or the server 106). According to an embodiment, in the case where the electronic device 101 executes any function or service automatically or in response to a request, the electronic device 101 may not perform the function or the service internally, but, alternatively or additionally, it may request at least a portion of a function associated with the electronic device 101 at other device (for example, the electronic device 102 or 104 or the server 106). The other electronic device (for example, the electronic device 102 or 104 or the server 106) may execute the requested function or additional function and may transmit the execution result to the electronic device 101. The electronic device 101 may provide the requested function or service using the received result or may additionally process the received result to provide the requested function or service. To achieve this, for example, cloud computing, distributed computing, or client-server computing may be used.

Figure 2:
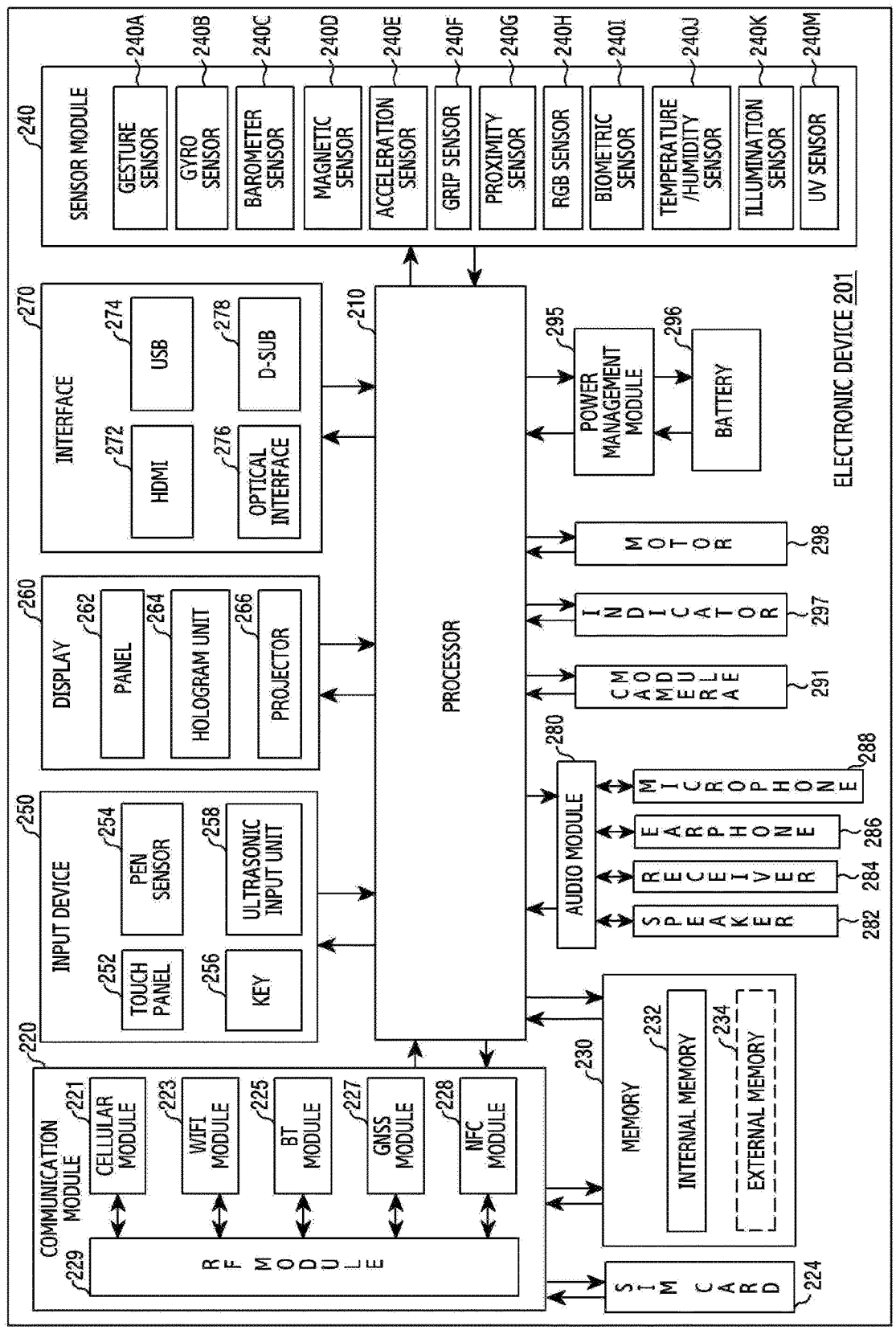
FIG. 2 is a block diagram of an electronic device according to various embodiments of the present disclosure.

FIG. 2 is a block diagram of an electronic device 201 according to various embodiments. The electronic device 201 may include, for example, all or a portion of the electronic device 101 illustrated in FIG. 1. The electronic device 201 may include one or more processors 210 (for example, an AP), a communication module 220, a subscriber identification module 224, a memory 230, a sensor module 240, an input apparatus 250, a display 260, an interface 270, an audio module 280, a camera module 291, a power management module 295, a battery 296, an indicator 297, and/or a motor 298.

The processor 210 may drive an operating system (OS) or an application program to control a plurality of hardware or software elements connected to the processor 210 and may process and compute a variety of data. The processor 210 may be implemented with a System on Chip (SoC), for example. According to an embodiment, the processor 210 may further include a graphic processing unit (GPU) and/or an image signal processor. The processor 210 may include at least a portion (for example, a cellular module 221) of elements illustrated in FIG. 2. The processor 210 may load and process an instruction or data, which is received from at least one of other elements (for example, a nonvolatile memory) at a volatile memory, and may store resulting data at a nonvolatile memory.

The communication module 220 may be configured the same as or similar to the communication interface 170. The communication module 220 may include, for example, a cellular module 221, a Wi-Fi module 223, a Bluetooth module 225, a GNSS module 227, an NFC module 228, and/or an RF module 229. The cellular module 221 may provide, for example, voice communication, video communication, a messaging service, an Internet service or the like through a communication network. According to an embodiment, the cellular module 221 may perform discrimination and authentication of the electronic device 201 within a communication network using the subscriber identification module 224 (for example, a SIM card), for example. According to an embodiment, the cellular module 221 may perform at least a portion of functions that the processor 210 provides. According to an embodiment, the cellular module 221 may include a communication processor (CP). According to a certain embodiment, at least a portion (for example, two or more) of the cellular module 221, the Wi-Fi module 223, the Bluetooth module 225, the GNSS module 227, and/or the NFC module 228 may be included within one integrated chip (IC) or an IC package. The RF module 229 may transmit and receive a communication signal (for example, an RF signal). The RF module 229 may include a transceiver, a power amplifier module (PAM), a frequency filter, a low noise amplifier (LNA), an antenna, or the like. According to another embodiment, at least one of the cellular module 221, the Wi-Fi module 223, the Bluetooth module 225, the GNSS module 227, or the NFC module 228 may transmit and receive an RF signal through a separate RF module. The subscriber identification module 224 may include, for example, a card or an embedded SIM including a subscriber identification module, and may include unique identification information (for example, an integrated circuit card identifier (ICCID)) or subscriber information (for example, integrated mobile subscriber identity (IMSI)).

The memory 230 (for example, the memory 130 of FIG. 1) may include an internal memory 232 or an external memory 234. For example, the internal memory 232 may include at least one of a volatile memory (for example, a dynamic random access memory (DRAM), a static RAM (SRAM), or a synchronous DRAM (SDRAM)), and a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory 234 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 234 may be functionally or physically connected to the electronic device 201 through various interfaces.

The sensor module 240 may measure, for example, a physical quantity or may detect an operation state of the electronic device 201, and may convert the measured or detected information to an electric signal. The sensor module 240 may include at least one of, for example, a gesture sensor 240A, a gyro sensor 240B, a barometer sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illuminance sensor 240K, and/or an ultra violet (UV) sensor 240M. Additionally or alternatively, the sensor module 240 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. According to a certain embodiment, the electronic device 201 may further include a processor which is a portion of the processor 210 or a separate element from the processor 210 and is configured to control the sensor module 240. The processor 210 may control the sensor module 240 while the processor 210 remains in a sleep state.

The input apparatus 250 may include, for example, a touch panel 252, a (digital) pen sensor 254, a key 256, or an ultrasonic input device 258. The touch panel 252 may use at least one of a capacitive, resistive, infrared or ultrasonic detecting method. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, a keypad, and/or the like. The ultrasonic input device 258 may detect an ultrasonic wave, which is generated from an input tool, through a microphone (for example, a microphone 288), and may check data corresponding to the detected ultrasonic wave.

According to an embodiment, the key 256 may be movably coupled to a hole formed in a housing forming the exterior of the electronic device 201 although it is not shown. The key 256 may be formed in a shaft shape such that it extends in a direction from one end exposed to the outside of the housing to the other end not exposed to the outside of the housing. The input apparatus 250 may include at least one electronic component (for example, a push button switch) accommodated in the housing. When the key 256 is moved in the direction by an external force applied to one end of the key 256, the at least one electronic component may generate an electric signal. The input apparatus 250 may include a stopper for regulating movement of the key 256 in a specific state. For example, when the electronic device 201 is in a specific posture, the stopper may be moved to a position for regulating the movement of the key 256. According to an embodiment, the specific posture may be a posture in which a direction opposite to the direction is substantially parallel to a gravity direction or forms an acute angle. For example, the specific posture may be a posture in which the electronic device 201 is dropped with the key 256 facing substantially in the gravity direction.

According to an embodiment, the stopper may be designed to be moved to the position by gravity. According to a certain embodiment, the input apparatus 250 may include at least one electromagnet. When the at least one electromagnet is controlled by the processor 210, the stopper may be moved by the force of attraction or repulsion of the at least one electromagnet.

According to an embodiment, the processor 210 may determine whether the electronic device 201 is dropped or not when the electronic device 201 is in the specific posture. For example, when the electronic device 201 is moved in the gravity direction with a gravitational acceleration for longer than a threshold time, the processor 210 may recognize that the electronic device 201 is in a dropping state. When the dropping of the electronic device 201 is determined, the processor 120 may move the stopper to the position for regulating the movement of the key 256.

According to various embodiments, when a wearing or carrying state of the electronic device 201 is determined, the processor 120 may move the stopper to a position for allowing the movement of the key 256.

According to various embodiments, when it is recognized that the electronic device 201 is not in the wearing or carrying state, the processor 210 may determine a posture of the electronic device 201. When the posture of the electronic device 201 is the specific posture, the processor 210 may determine whether the electronic device 201 is dropped or not. When it is determined that the electronic device 201 is dropped, the processor 210 may move the stopper to the position for regulating the movement of the key 256. The display 260 (for example, the display 160) may include a panel 262, a hologram device 264, a projector 266, and/or a control circuit for controlling the aforementioned elements. The panel 262 may be implemented to be flexible, transparent, or wearable. The panel 262 and the touch panel 252 may be integrated into one or more modules. According to an embodiment, the panel 262 may include a pressure sensor (or a force sensor) for measuring an intensity of pressure by a user's touch. The pressure sensor may be integrated into the touch panel 252 or may be implemented as one or more separate sensors from the touch panel 252. The hologram device 264 may display a stereoscopic image in a space using a light interference phenomenon. The projector 266 may project light onto a screen so as to display an image. The screen may be arranged inside or outside the electronic device 201. The interface 270 may include, for example, an HDMI 272, a USB 274, an optical interface 276, and/or a D-subminiature (D-sub) 278. The interface 270 may be included, for example, in the communication interface 170 illustrated in FIG. 1. Additionally or alternatively, the interface 270 may include, for example, a mobile high definition link (MHL) interface, a SD card/multi-media card (MMC) interface, and/or an infrared data association (IrDA) standard interface.

The audio module 280 may convert a sound and an electric signal in dual directions. At least a portion of the audio module 280 may be included, for example, in the input/output interface 150 illustrated in FIG. 1. The audio module 280 may process, for example, sound information that is inputted or outputted through a speaker 282, a receiver 284, an earphone 286, or a microphone 288. The camera module 291 may be, for example, a device for shooting a still image or a moving image, and according to an embodiment, the camera module 291 may include, for example, one or more image sensors (for example, a front sensor or a rear sensor), a lens, an image signal processor (ISP), or a flash (for example, an LED or a xenon lamp). The power management module 295 may manage, for example, power of the electronic device 201. According to an embodiment, the power management module 295 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method or an electromagnetic wave method. The PMIC may further include an additional circuit for wirelessly charging, for example, a coil loop, a resonance circuit, or a rectifier, and the like. The fuel gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a portion thereof (for example, the processor 210), such as a booting state, a message state, a charging state, and the like. The motor 298 may convert an electrical signal into a mechanical vibration and may generate vibration, a haptic effect, and the like. For example, the electronic device 201 may include a mobile TV supporting device (for example, a GPU) for processing media data according to the standards of digital multimedia broadcasting (DMB), digital video broadcasting (DVB), MediaFlo™, or the like. Each of the elements described in the present disclosure may be configured with one or more components, and the names of the elements may be changed according to the type of the electronic device. According to various embodiments, some elements of the electronic device (for example, the electronic device 201) may be omitted or other additional elements may be added. Furthermore, some of the elements may be combined with each other so as to form one entity, and the functions of the elements may be performed in the same manner as before being combined.

Figure 3:
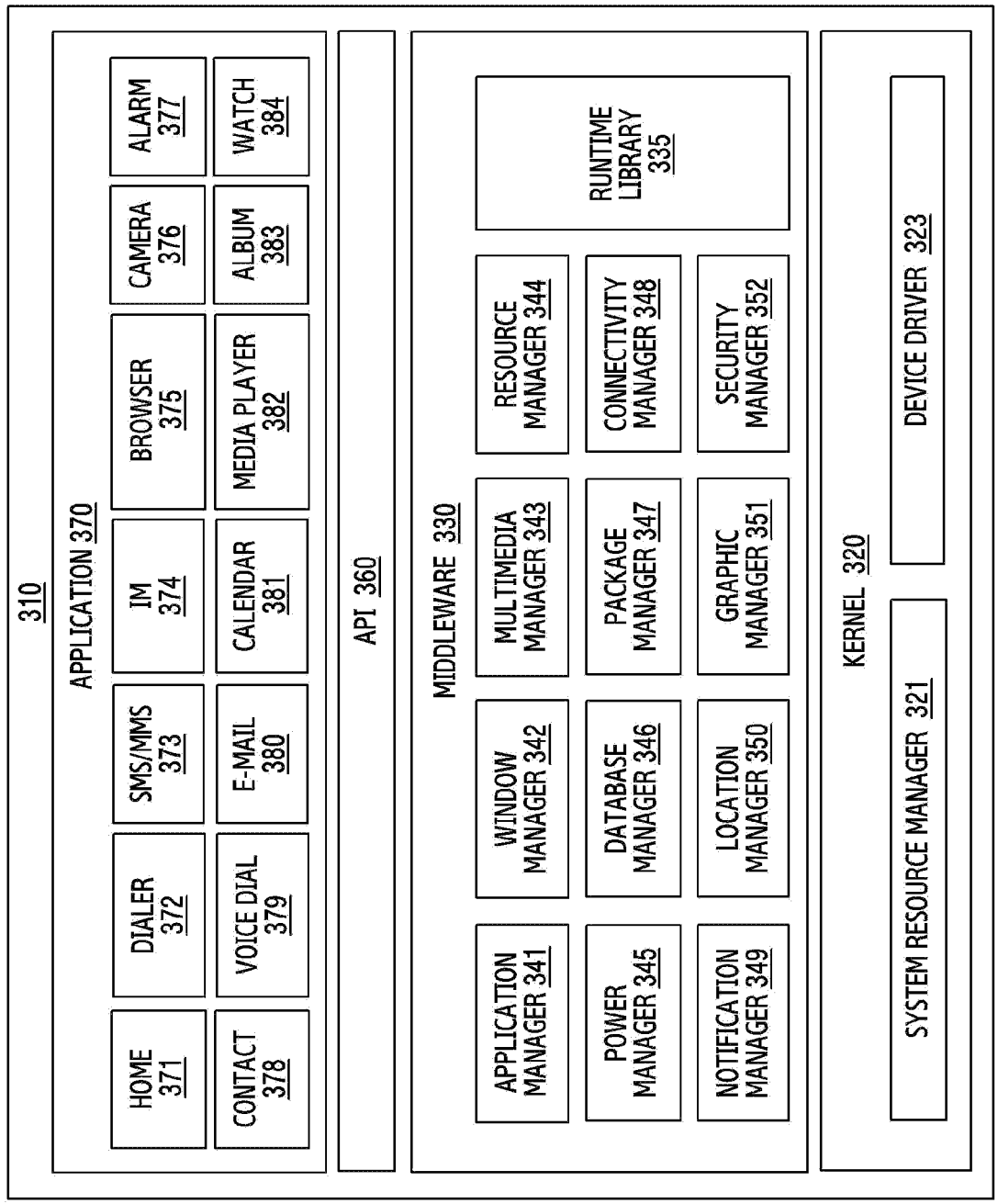
FIG. 3 is a block diagram of a program module according to various embodiments of the present disclosure.

FIG. 3 is a block diagram of a program module according to various embodiments. According to an embodiment, a program module 310 (for example, the program 140) may include an OS for controlling resources associated with an electronic device (for example, the electronic device 101) and/or various applications (for example, the application program 147) driven on the OS. For example, the OS may include, for example, Android™, iOS™, Windows™, Symbian™, Tizen™, Bada™, or the like. Referring to FIG. 3, the program module 310 may include a kernel 320 (for example, the kernel 141), a middleware 330 (for example, the middleware 143), an API 360 (for example, the API 145), and/or an application 370 (for example, the application program 147). At least a portion of the program module 310 may be preloaded on the electronic device or downloaded from an external electronic device.

The kernel 320 may include, for example, a system resource manager 321 and/or a device driver 323. The system resource manager 321 may control, allocate or collect the system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver. The middleware 330 may provide functions which are commonly required by the application 370 or may provide various functions to the application 370 through the API 360 such that the application 370 can use limited system resources in the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

For example, the runtime library 335 may include a library module which is used by a compiler to add a new function through a programming language while the application 370 is executed. The runtime library 335 may perform input/output management, memory management, an arithmetic function, and the like. The application manager 341 may manage a life cycle of the application 370, for example. The window manager 342 may manage GUI resources used in a screen. The multimedia manager 343 may grasp a format necessary for reproducing media files and may encode or decode the media files by using a Codec suited to the corresponding format. The resource manager 344 may manage a source code of the application 370 or a space of a memory. The power manager 345 may manage a capacity of a battery or a power source, for example, and may provide power information necessary for the operation of the electronic device. According to an embodiment, the power manager 345 may interwork with a basic input/output system (BIOS). The database manager 346 may generate, search, or change a database which is used in the application 370. The package manager 347 may manage installing or updating an application which is distributed in the form of a package file.

The connectivity manager 348 may manage wireless connection, for example. The notification manager 349 may notify the user of an event such as a message arrived, an appointment, a notification of proximity, or the like. The location manager 350 may manage location information of the electronic device. The graphic manager 351 may manage, for example, a graphic effect to be provided to the user or a relevant user interface. The security manager 352 may provide, for example, system security or user authentication. According to an embodiment, the middleware 330 may include a telephony manager to manage a speech or video telephony function of the electronic device, or a middleware module to form a combination of the various functions of the above-described elements. According to an embodiment, the middleware 330 may provide a module which is customized according to a kind of an OS. The middleware 330 may dynamically delete a portion of the existing elements or may add new elements. The API 360 may be, for example, a set of API programming functions and may be provided as a different configuration according to an OS. For example, in the case of Android or iOS, a single API set may be provided for each platform. In the case of Tizen, two or more API sets may be provided for each platform.

The application 370 may include, for example, a home 371, a dialer 372, a short message service (SMS)/multimedia messaging service (MMS) 373, an instant message (IM) 374, a browser 375, a camera 376, an alarm 377, contacts 378, a voice dial 379, an email 380, a calendar 381, a media player 382, an album 383, a watch 384, an application for providing health care (for example, measuring exercise or a blood sugar), or environmental information (for example, information on atmospheric pressure, humidity, or temperature). According to an embodiment, the application 370 may include an information exchanging application for supporting information exchange between the electronic device and an external electronic device. The information exchanging application may include, for example, a notification relay application for relaying specific information to an external electronic device or a device management application for managing an external electronic device. For example, the notification relay application may relay notification information generated in another application of the electronic device to an external electronic device, or may receive notification information from an external electronic device and provide the notification information to the user. The device management application may install, delete, or update, for example, a function (for example, turn-on/turn-off of an external electronic device itself (or a part of components) or adjustment of brightness (or resolution) of a display) of the external electronic device which communicates with the electronic device, or an application running in the external electronic device. According to an embodiment, the application 370 may include an application (for example, a health care application of a mobile medical device) which is assigned in accordance with an attribute of the external electronic device. According to an embodiment, the application 370 may include an application which is received from an external electronic device. At least a portion of the program module 310 may be implemented (for example, executed) by software, firmware, hardware (for example, the processor 210), or a combination of two or more thereof, and may include modules, programs, routines, sets of instructions, or processes, or the like for performing one or more functions.

The term "module" used herein may include a unit including hardware, software, or firmware, and, for example, may be interchangeably used with the terms "logic," "logical block," "component" or "circuit". The "module" may be an integrally configured component or a minimum unit for performing one or more functions or a part thereof. The "module" may be implemented mechanically or electronically. For example, the "module" may include an application-specific IC (ASIC) chip, a field-programmable gate array (FPGA), and a programmable-logic device for performing some operations, which are known or will be developed. At least a portion of a device (for example, modules or functions thereof) or a method (for example, operations) according to various embodiments, for example, may be implemented by instructions stored in a computer-readable storage media (for example, the memory 130,) in the form of a programmable module. When the instruction is executed by a processor (for example, the processor 120), the processor may perform a function corresponding to the instruction. A computer-readable recording media may include a hard disk, a floppy disk, a magnetic media (for example, a magnetic tape), an optical media (for example, compact disc read only memory (CD-ROM) and a digital versatile disc (DVD), a magneto-optical media (for example, a floptical disk)), an internal memory, or the like. Also, an instruction may include a code generated by a compiler or a code executable by an interpreter. A module or a program module according to various embodiments may include at least one of the above-described elements, or a portion of the above-described elements may be omitted, or additional other elements may be further included. Operations performed by a module, a program module, or other elements according to various embodiments may be executed sequentially, in parallel, repeatedly, or in a heuristic method. Also, at least a portion of operations may be executed in different sequences, omitted, or other operations may be added.

Figure 4A:
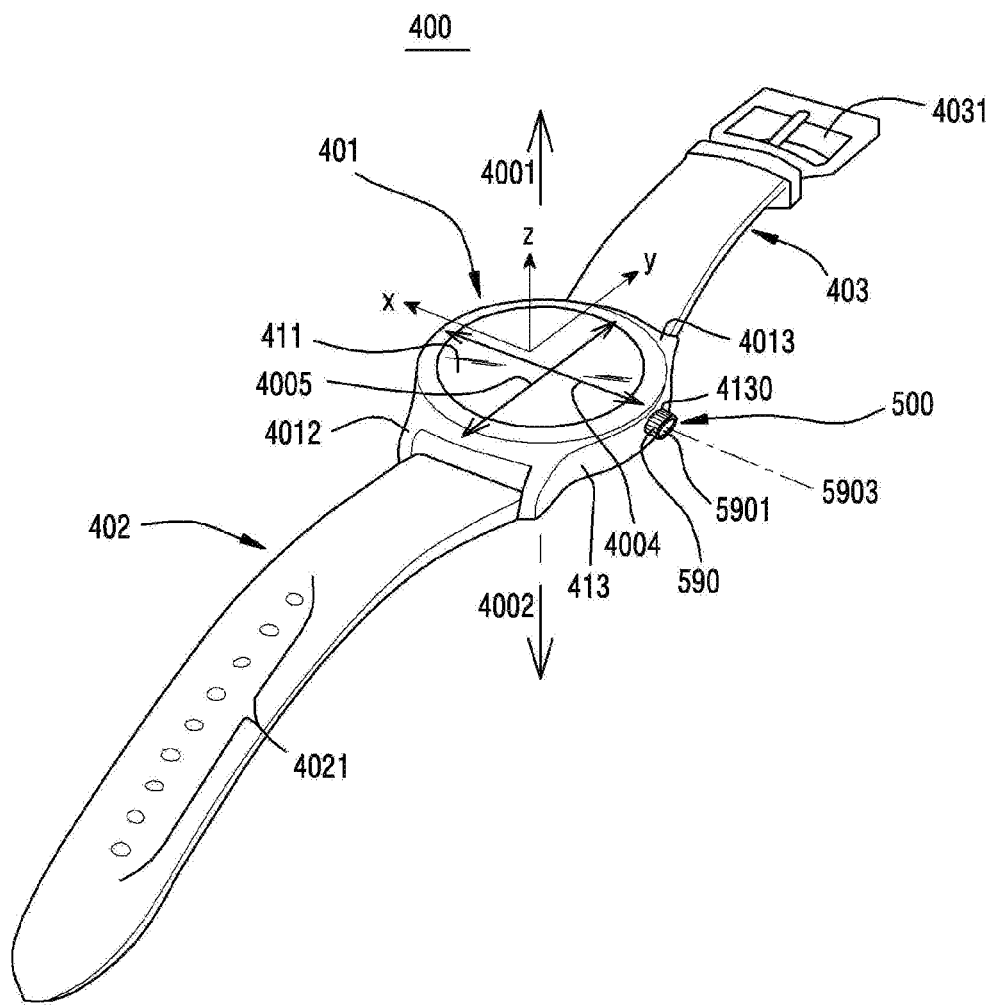
FIG. 4A is a view showing an electronic device having an input apparatus installed therein and providing a shock prevention function according to an embodiment of the present disclosure.
Figure 4B:
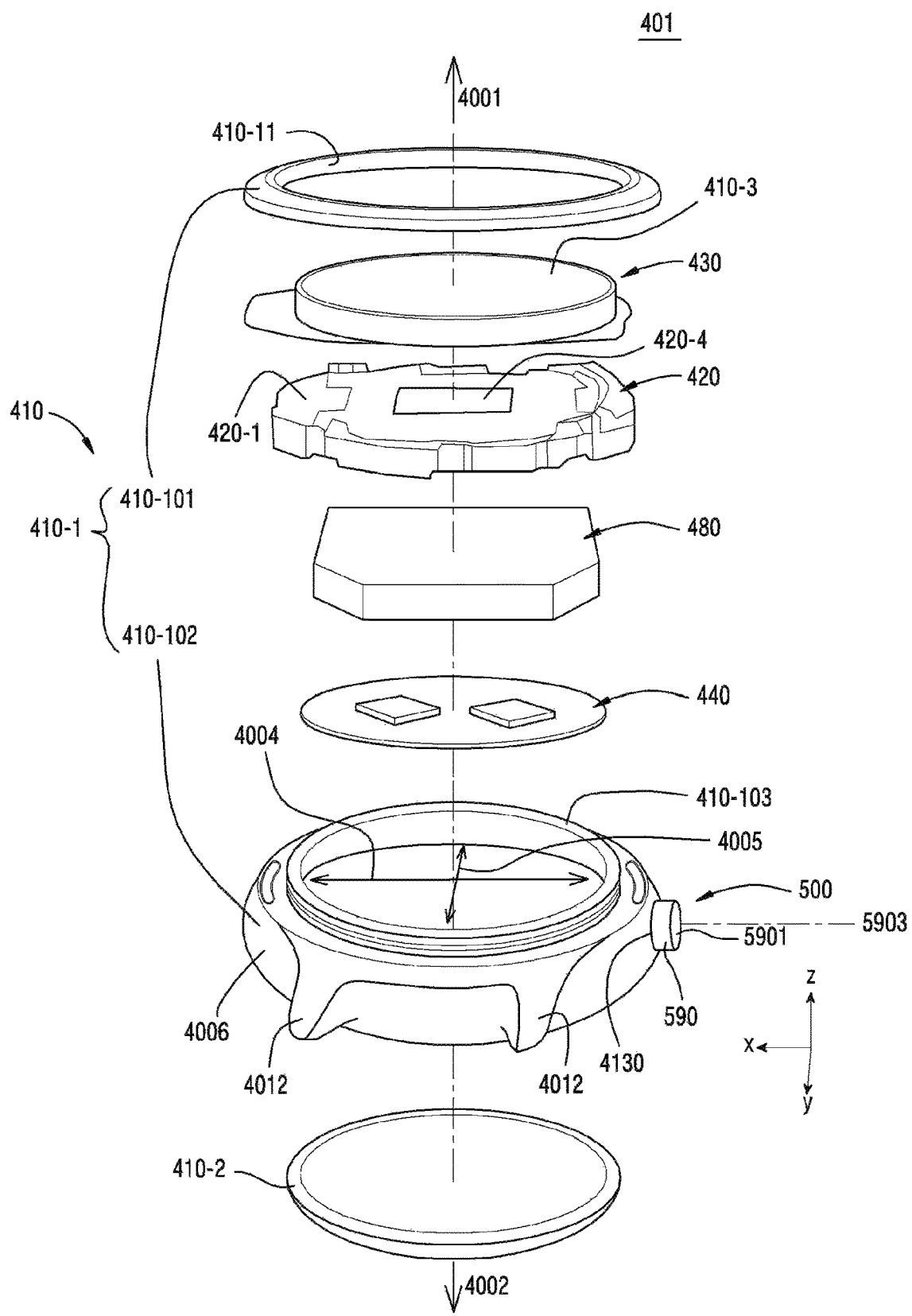
FIG. 4B is a view showing coupling relationships among elements of the electronic device having the input apparatus installed therein and providing the shock prevention function according to an embodiment of the present disclosure.
Figure 4C:
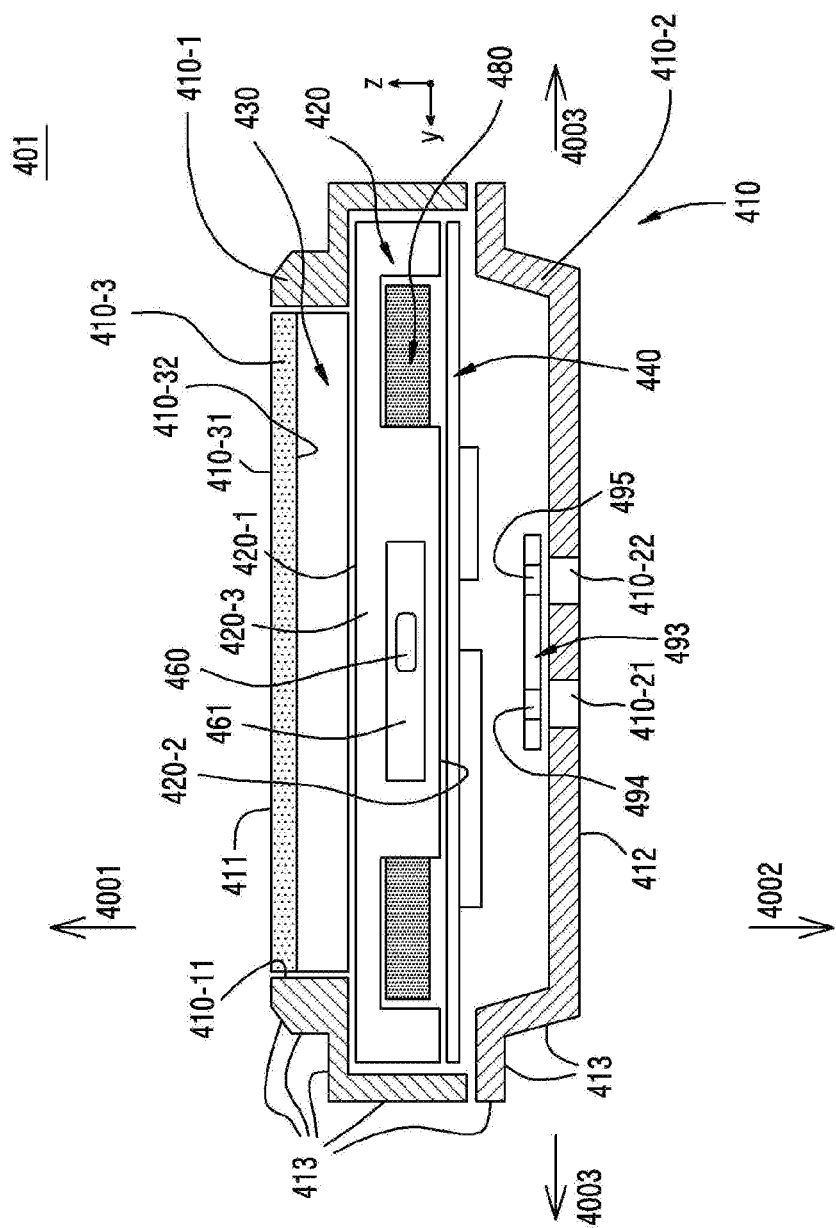
FIG. 4C is a cross section view to illustrate elements of the electronic device having the input apparatus installed therein and providing the shock prevention function according to an embodiment of the present disclosure.
Figure 4D:
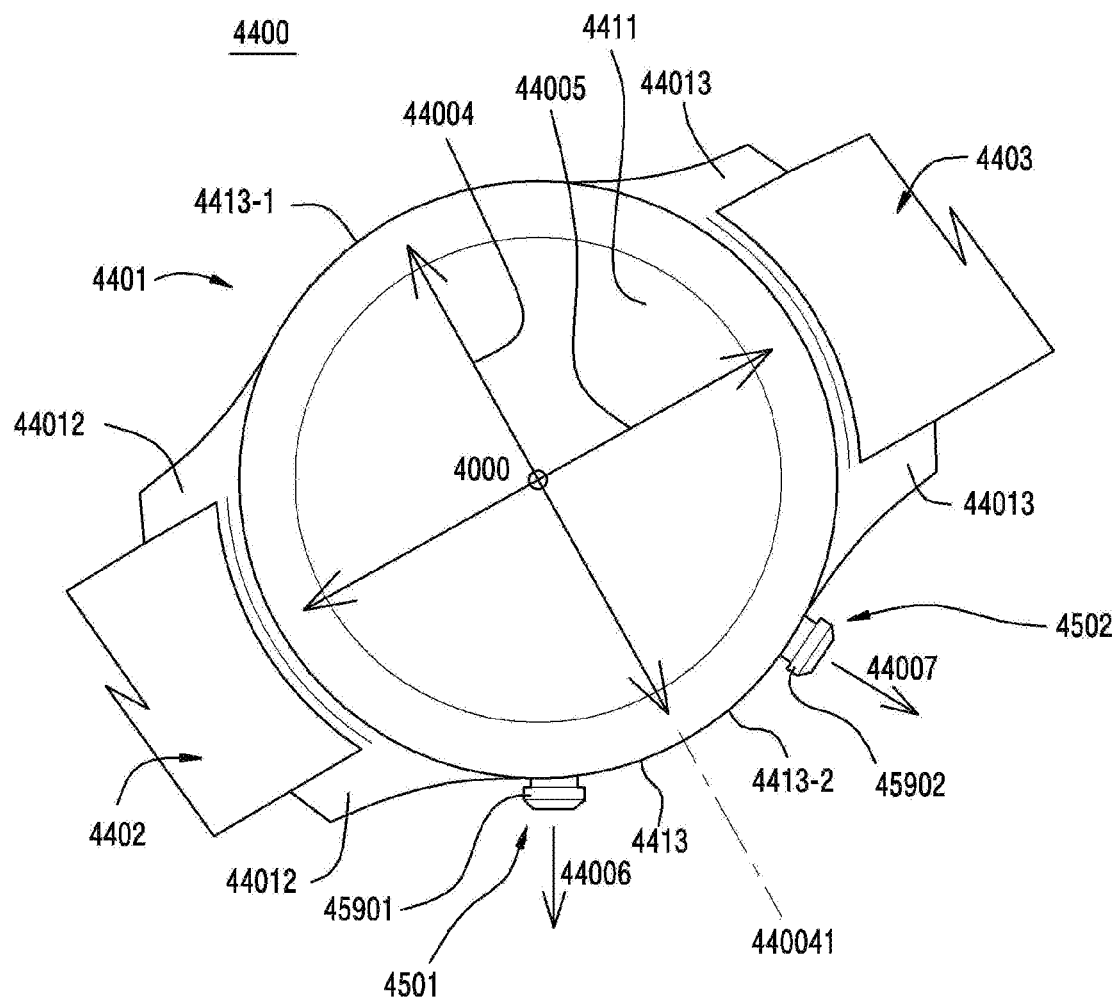
FIG. 4D is a view showing another electronic device having an input apparatus installed therein and providing a shock prevention function according to various embodiment of the present disclosure.

FIG. 4A illustrates an electronic device having an input apparatus installed therein and providing a shock prevention function according to an embodiment of the present disclosure. FIG. 4B illustrates coupling relationships of elements of the electronic device having the input apparatus installed therein and providing the shock prevention function according to an embodiment of the present disclosure. FIG. 4C is a cross section view to illustrate the elements of the electronic device having the input apparatus installed therein and providing the shock prevention function according to an embodiment of the present disclosure. FIG. 4D illustrates another electronic device having an input apparatus installed therein and providing a shock prevention function according to various embodiments of the present disclosure.

According to various embodiments, the electronic device 400 may include at least a portion of the elements of the electronic device 101 of FIG. 1 or the electronic device 201 of FIG. 2.

Referring to FIG. 4A, in an embodiment, the electronic device 400 is a wearable electronic device, and for example, may be an electronic device of a watch type which is wearable on a user's wrist. The electronic device 400 may include a main body 401 having various electronic components, such as a processor, a memory, a display 430, a wireless power transmission and reception apparatus, and an input apparatus 500, mounted therein, and a first extension portion 402 and a second extension portion 403 coupled to both ends 4012 and 4013 of the main body 401. The first extension portion 402 and the second extension portion 403 are portions enclosing a user's wrist when the electronic device 400 is worn on the user's wrist, and may be formed of a band or a strap made of various materials such as, for example, leather, rubber, metal, or the like. The first extension portion 402 and the second extension portion 403 may be designed to be coupled to each other in various methods when the electronic device 400 is worn on the user's wrist. According to an embodiment, as shown in FIG. 4A, the first extension portion 402 may include a plurality of fastening holes 4021 arranged along an extension length thereof, and the second extension portion 403 may include a fastening apparatus 4031 formed at one end thereof to be coupled to the first extension portion 402 using the plurality of fastening holes 4021.

According to an embodiment, the first extension portion 402 may be coupled to one end 4012 of the main body 401 in such a form that the first extension portion 402 is rotatable about one end 4012 of the main body 401. The second extension portion 403 may be coupled to the other end 4013 of the main body 401 in such a form that the second extension portion 403 is rotatable about the other end 4013 of the main body 401.

According to various embodiments, although it is not shown, the first extension portion 402 may be coupled to one end 4012 of the main body 401 in such a form that the first extension portion 402 is supported on one end 4012 of the main body 401 and is deflected. The second extension portion 403 may be coupled to the other end 4013 of the main body 401 in such a form that the second extension portion 403 may be supported on the other end 4013 of the main body 401 and may be deflected.

An exterior (or a housing) of the main body 401 may include a first surface 411 facing in a first direction 4001 and a second surface 412 (or a rear surface) (FIG. 4C) facing in a second direction 4002 opposite to that of the first surface 411 (or a front surface). The exterior of the main body 401 may include a third surface 413 (or a side surface) enclosing a space between the first surface 411 and the second surface 412 and formed in a substantially annular shape. A screen (or display) 430 (FIG. 4B) of the electronic device 400 may be exposed through the first surface 411. According to an embodiment, the electronic device 400 may include an input apparatus 500 coupled to the third surface 413 of the main body 401.

According to an embodiment, the input apparatus 500 may include a hole 4130 formed on the third surface 413 of the main body 401. The input apparatus 500 may include an actuator 590 (or a key button actuator) coupled to the hole 4130. The actuator 590 may be formed to straightly extend in a direction from one end 5901 (for example, a key top 520 of FIG. 5A) to the other end (not shown).

According to an embodiment, when the actuator 590 is coupled to the hole 4130, one end 5901 of the actuator 590 may be exposed to the outside and the other end (not shown) of the actuator 590 may be disposed inside the electronic device 400. An external force may be applied to one end 5901 of the actuator 590 exposed to the outside to perform a mechanical actuation of the input apparatus 500.

According to an embodiment, one end 5901 of the actuator 590 may be designed to protrude relative to the third surface 413. According to various embodiments, one end 5901 of the actuator 590 may be designed not to protrude relative to the third surface 413 although it is not shown.

According to an embodiment, the actuator 590 may be designed to be moved in an inward direction of the electronic device 400 by an external force. For example, the actuator 590 may include a shaft (for example, a shaft 510 of FIG. 5A) straightly extending in the direction from one end 5901 to the other end. When an external force is applied to one end 5901 of the actuator 590 exposed to the outside, the shaft may slide in the hole 4130 and the actuator 590 may be linearly moved in the inward direction of the electronic device 400 (translational motion). According to an embodiment, the actuator 590 may move in a direction 4004 perpendicular to a direction 4005 between the first extension portion 402 and the second extension portion 403. According to various embodiments, a virtual straight line along which the actuator 590 moves may be placed in the middle between the first extension portion 402 and the second extension portion 403.

According to another embodiment, the actuator 509 may be designed to be tilted by an external force in various directions like a joystick. For example, the actuator 590 may be designed to have one end 5901 titled in various directions with reference to the other end disposed inside the electronic device 400.

According to various embodiments, when the external force is removed, the actuator 590 may move to its original position. For example, the actuator 590 may move to the original position by a restoring force of at least one elastic member installed in the electronic device 400.

According to various embodiments, the actuator 590 may be designed to be rotated by an external force. The actuator 590 may be rotated about a central line 5903 of the shaft (for example, the shaft 510 of FIG. 5A) extending from one end 5901 to the other end in a clockwise direction or a counter clockwise direction. The central line 5903 of the actuator 590 may intersect with the virtual straight line in the direction 4005 connecting the first extension portion 402 and the second extension portion 403. For example, the central line 5903 of the actuator 590 may be parallel to the direction 4004 perpendicular to the direction 4005 between the first extension portion 402 and the second extension portion 403. According to various embodiments, the central line 5903 of the actuator 590 may be designed not to be perpendicular to the virtual straight line in the direction 4005 between the first extension portion 402 and the second extension portion 403.

According to an embodiment, the input apparatus 500 may include at least one electronic component functionally (or operatively) coupled to the actuator 590. The at least one electronic component may generate an electric signal in response to a motion (for example, a translational motion or a rotary motion) of the actuator 590 made by an external force.

For example, the at least one electronic component may be a push button switch. The push button switch may include a first contact and a second contact. When an external force is applied to the push button switch, the first contact and the second contact may be close to each other and may be brought into contact with each other, and the first contact and the second contact may allow an electric current to pass therethrough. When an external force is applied to one end 5901 of the actuator 590, the actuator 590 may be moved in the inward direction of the electronic device 400 and the push button switch may be pressed by the other end of the actuator 590.

In another example, the at least one electronic component may be a rotary switch. The rotary switch may include a plurality of first contacts which are arranged in a circular pattern and a shaft coupled to a second contact. When the shaft of the rotary switch is rotated, the second contact may allow an electric current to selectively pass through one of the plurality of first contacts. When an external force is applied to one end 5901 of the actuator 590, the actuator 590 may be rotated and the shaft of the rotary switch coupled to the other end of the actuator 590 may also be rotated.

It is to be understood that the push button switch or the rotary switch are merely examples and that various other electronic components such as a sensor (for example, a pressure sensor) capable of generating an electric signal in response to the motion (for example, a translational motion or a rotary motion) of the actuator 590 may be used in the input apparatus 500. For example, the input apparatus 500 may include a magnet and a hall sensor. The magnet may be disposed in the actuator 590. When the actuator 590 is rotated by an external force and the magnet is close to the hall sensor disposed in the proximity of the actuator 590, the hall sensor may output an electric signal.

According to various embodiments, the input apparatus 500 may be designed to selectively generate an electric signal according to a tilt direction or a tilt angle of the actuator 590 like a joystick. The input apparatus 500 may be designed to have one end 5901 of the actuator 590 tilted in various directions with reference to the other end of the actuator 590 disposed inside the electronic device 400. The input apparatus 500 may include a switch which outputs an electric signal according to the tilt direction or tilt angle of the actuator 590 titled by the external force.

The electronic device 400 may execute various instructions stored in a memory (for example, the memory 130 of FIG. 1 or the memory 130 of FIG. 2) based on at least a portion of the electric signal generated from the input apparatus 500 according to a motion (for example, a movement or rotation) of the actuator 590 made by an external force.

According to an embodiment, the electronic device 400 may display a main home screen according to an electric signal from the input apparatus 500. The main home screen may be a first screen which is displayed on a display (the display 430 of FIG. 4B) when the power of the electronic device 400 is turned on. When a plurality of home screens are provided in the form of pages which can toggle, the main home screen may be a first home screen from among the plurality of home screens. The home screen may display icons for executing applications, time, date, or the like. According to various embodiments, the home screen may display a state of the electronic device 400 such as a battery charging state, an intensity of a received signal, or a current time.

According to another embodiment, according to an electric signal from the input apparatus 500, the electronic device 400 may enter a sleep mode or a low-power mode. In the sleep mode or the low-power mode, the electronic device 400 may perform only set basic operations such as periodically listening to radio signals from the outside. In the sleep mode or the low-power mode, the electronic device 400 may include an operation of inactivating a specific element (for example, the display 430). In the sleep mode or the low-power mode, the electronic device 400 may include an operation of inactivating at least a portion of a processor (for example, the processor 120 of FIG. 1 or the processor 210 of FIG. 2).

According to various embodiments, according to an electric signal from the input apparatus 500, the electronic device 400 may convert from the sleep mode or the low-power mode to a wake-up mode. For example, in the wake-up mode, the electronic device 400 may activate the display 430.

According to various embodiments, according to an electric signal from the input apparatus 500, the electronic device 400 may magnify or reduce a content displayed through the display 430. When the actuator 590 of the input apparatus 500 is rotated about the central line 5903 in the clockwise direction, the electronic device 400 may magnify the content according to an amount of rotation (zoom-in). When the actuator 590 of the input apparatus 500 is rotated in the counter clockwise direction, the electronic device 400 may reduce the content according to an amount of rotation (zoom-out).

According to various embodiments, according to an electric signal from the input apparatus 500, the electronic device 400 may scroll the content displayed through the display 430. For example, when the actuator 590 of the input apparatus 500 is rotated about the central line 5903 in the clockwise direction or counter clockwise direction, the electronic device 400 may scroll the content according to a rotation direction and an amount of rotation.

According to an embodiment, a magnitude of a force (or an impulsive force) or an amount of an impulse force for letting the actuator 590 perform a motion such as linearly moving, tilting, or rotating in order for the electronic component (for example, the push button switch, the rotary switch, or the like) to generate an electric signal may be designed to be less than or equal to a threshold value. For example, when the electronic device 400 is dropped, the actuator 590 may bump into a floor. When the actuator 590 is designed to protrude relative to the third surface 413, it is highly likely that the actuator 590 bumps into a floor due to the dropping of the electronic device 400. A shock or a load generated when the actuator 590 bumps into a floor may go beyond a design criterion, which may cause a damage to the electronic component (for example, the push button switch, the rotary switch, or the like) functionally (or operatively) coupled to the actuator 590.

According to various embodiments, when the electronic device 400 is dropped, the electronic device 400 may prevent the actuator 590 from being moved in the inward direction of the electronic device 400. Even when an external shock or load going beyond the design criterion is applied to the actuator 590 due to the dropping of the electronic device 400, the actuator 590 may be prevented from being moved to the electronic component and thus a damage to the electronic component which may be caused by the dropping of the electronic device 400 can be prevented.

According to an embodiment, the electronic device 400 may prevent or inhibit the actuator 590 from being moved in the inward direction of the electronic device 400 due to an external shock or load when the electronic device 400 is dropped. For example, when the electronic device 400 is dropped, a stopper (not shown) may be moved from a first position to a second position. Even when an external shock or load is applied to the actuator 590, the actuator 590 may be prevented from being moved in the inward direction of the electronic device 400 due to the stopper moved to the second position. When the electronic device 400 is not dropped, the stopper may be placed in the first position and the actuator 590 may be in a state in which it is movable in the inward direction of the electronic device 400.

According to an embodiment, the electronic device 400 may include a first apparatus (not shown) which moves the stopper using gravity. For example, the first apparatus may include a shaft and a weight rotatably may be coupled to the shaft. The weight may have a length extending in a direction from one end to the other end. The shaft may be coupled to a hole formed between one end and the other end of the weight. The weight may be rotated about the shaft by gravity according to a posture of the electronic device 400. The stopper may be coupled to one end of the weight. One end of the weight to which the stopper is coupled may be moved between the first position and the second position by the rotation of the weight performed by gravity.

According to another embodiment, the electronic device 400 may include a second apparatus (not shown) which generates a force for moving the stopper. For example, the second apparatus may be at least one electromagnet. One electromagnet may be disposed on a side of the first position, and another electromagnet may be disposed on a side of the second position. When the electronic device 400 is dropped, the electronic device 400 may inactivate the electromagnet disposed on the side of the first position and may activate the electromagnet disposed on the side of the second position. When the electromagnet on the side of the second position is activated, the stopper may be moved to the second position due to the force of attraction of the activated electromagnet. When the electronic device 400 is not dropped, the electronic device 400 may activate the electromagnet on the side of the first position and may inactivate the electromagnet on the side of the second position. When the electromagnet on the side of the first position is activated, the stopper may be moved to the first position due to the force of attraction of the activated electromagnet.

According to various embodiments, when the electronic device 400 is dropped with the direction of the actuator 590 from the other end to one end 5901 being substantially parallel to the gravity direction, the stopper may be designed to be moved from the first position to the second position.

According to various embodiments, when the electronic device 400 is dropped with the direction of the actuator 590 from the other end to one end 5901 forming an acute angle with the gravity direction, the stopper may be designed to be moved from the first position to the second position.

According to various embodiments, the electronic device 400 may acquire information on a motion of the electronic device 400 using at least one sensor (for example, a gravity sensor, an acceleration sensor, a gyro sensor, a six-axis sensor, or the like) functionally coupled to the electronic device 400. The electronic device 400 may determine a posture of the electronic device 400 based on the information acquired from the at least one sensor. For example, information on the posture of the electronic device 400 may include an angle of the electronic device 400 rotated with respect to space axes, x-, y-, z-axes. The electronic device 400 may determine whether the electronic device 400 is dropped based on information acquired from the at least one sensor. For example, the electronic device 400 may determine whether the electronic device 400 is in a dropping (or falling) state, that is, is moving in the gravity direction with a gravitational acceleration, based on information acquired from the at least one sensor.

According to various embodiments, the electronic device 400 may be designed to include both the first apparatus and the second apparatus. When the second apparatus is activated, the stopper may be placed in the first position or the second position. Since the stopper is coupled to the weight of the first apparatus, the stopper may have difficulty in moving using the first apparatus when the second apparatus is activated. When the second apparatus is inactivated, the stopper may be in a state in which it is movable using the first apparatus.

When the electronic device 400 is designed to include both the first apparatus and the second apparatus, the electronic device 400 may selectively activate the second apparatus. According to an embodiment, when the electronic device 400 is worn on the user or carried by the user (for example, is held with user's hand), the electronic device 400 may activate the second apparatus. When the electronic device 400 is in a wearing state or a carrying state, the electronic device 400 may activate the second apparatus and the stopper may be placed in the first position by the activated second apparatus. When the stopper is placed in the first position, the actuator 590 may be in a state in which the actuator 590 is movable to the electronic component (for example, the push button switch). Since the stopper does not escape from the first position by the activated second apparatus in the wearing state or carrying state of the electronic device 400, the stopper may not be moved by the first apparatus even when there is a user's motion (for example, walking, running, or the like).

According to an embodiment, when the electronic device 400 is not in a dropping state, the electronic device 400 may activate the second apparatus. For example, a case in which the electronic device 400 is not in the dropping state may include the wearing state or carrying state of the electronic device 400. In another example, the case in which the electronic device 400 is not in the dropping state may include a state in which the electronic device 400 may be placed on a table.

According to an embodiment, when the electronic device 400 is not in the wearing state or carrying state, the electronic device 400 may inactivate the second apparatus. For example, when the electronic device 400 is in the dropping state, the electronic device 400 may inactivate the second apparatus. When the second apparatus is inactivated, the stopper may be moved by the first apparatus. According to various embodiments, when the electronic device 400 is dropped with the direction of the actuator 590 from the other end to one end 5901 being substantially parallel to the gravity direction, the stopper may be moved to the second position by the first apparatus. According to various embodiments, when the electronic device 400 is dropped with the direction of the actuator 590 from the other end to one end 5901 forming an acute angle with the gravity direction, the stopper may be moved to the second position by the first apparatus.

According to an embodiment, the input apparatus 500 may include a push button switch (not shown) which may be functionally (or operatively) coupled to the actuator 590. The push button switch may include a first contact and a second contact. The first contact and the second contact may be aligned in a linear moving direction of the actuator 590 or the second contact may be placed between the first contact and the actuator 590. For example, the second contact may be a metal elastic body having a metal dome shape. When the actuator 590 is moved to the inside of the electronic device 400, a portion of the second contact may be deformed by pressure of the actuator 590 and may be deflected toward the first contact, such that the first contact and the second contact may be brought into physical contact with each other. According to an embodiment, when the electronic device 400 is dropped, the actuator 590 may not be moved to the push button switch due to the stopper which is moved to the second position. Even when an external shock or load going beyond a design criterion is applied to the actuator 590 due to the dropping of the electronic device 400, the actuator 590 may not be moved to the push button switch and thus a damage to the push button switch can be prevented.

According to various embodiments, the input apparatus 500 may include an electronic component functionally coupled to the actuator 590, such as a rotary switch, a sensor, or the like. When the electronic device such as the rotary switch, the sensor, or the like is designed and an external shock or load going beyond the design criterion is applied to the actuator 590 due to the dropping of the electronic device 400, a damage to the electronic component such as the rotary switch, the sensor, or the like can be prevented by the stopper which is moved to the second position.

Referring to FIGS. 4B and 4C, the main body 401 may include housing 410, a support member 420, the display 430, a printed circuit board (PCB) 440, and the input apparatus 500.

The housing 410 may form the exterior of the main body 401 of the electronic device 400 (FIG. 4A). According to an embodiment, the housing 410 may include the first surface 411 facing in the first direction 4001 and the second surface 412 facing in the second direction 4002 which is opposite to that of the first surface 411. The housing 410 may include the third surface 413 enclosing the space between the first surface 411 and the second surface 412. For example, when the electronic device 400 is worn on the user's wrist, the second surface 412 may be brought into contact with the user's wrist and hidden by the wrist, and the display 430 may be exposed through the first surface 411.

According to an embodiment, the first surface 411 and the second surface 412 may be substantially planar and may be parallel to each other. According to various embodiments, although not shown, the first surface 411 or the second surface 412 may be surfaces which are convex in the first direction 4001 or the second direction 4002 (for example, curved surfaces).

According to an embodiment, the housing 410 may include a first housing 410-1 and a second housing 410-2. The first housing 410-1 may be a cover which is substantially convex in the first direction 4001. According to various embodiments, the second housing 410-2 may be a cover which is substantially convex in the second direction 4002. When the first housing 410-1 and the second housing 410-2 are coupled to each other, a space may be formed to have various components mounted therein.

According to an embodiment, the first surface 411 may be included in the first housing 410-1. The second surface 412 may be included in the second housing 410-2. The third surface 413 may be included in at least one of the first housing 410-1 and the second housing 410-2. The third surface 413, which is a side surface, may be a housing enclosing the first surface 411 and the second surface 412. The third surface 413 may be included in the first housing 410-1 or the second housing 410-2, or may be separately provided. For example, the first housing 410-1 may include a portion of the third surface 413 and the second housing 410-2 may include the other portion of the third surface 413. According to various embodiments, when viewed from a cross-section, the third surface 413 may be substantially convex in a direction 4003 perpendicular to the first direction 4001 (or the second direction 4002). According to various embodiments, an annular portion enclosing the space between the first surface 411 and the second surface 412 in the housing 410 may be referred to as a "bezel" 4006.

According to an embodiment, the first housing 410-1 may be formed in an annular shape having an opening 410-11. For example, the first housing 410-1 may have a substantially circular ring shape as shown in the drawings. According to various embodiments, the first housing 410-1 may have various ring shapes such as an oval ring shape, a triangular ring shape, or a rectangular ring shape. The display 430 may be exposed through the opening 410-11 of the first housing 410-1.

According to an embodiment, the first housing 410-1 may include a window 410-3 disposed in the opening 410-11. The window 410-3 may include a light transmission material, and for example, may be a glass plate. When viewed from the second direction 4002, the window 410-3 may be formed in a shape connectable to the opening 410-11 of the first housing 410-1, and for example, may be circular.

The window 410-3 may include an outer surface 410-31 facing in the first direction 4001 and an inner surface 410-32 facing in the second direction 4002. The outer surface 410-31 may include at least a portion of the first surface 411 and may be planar or a curved surface. According to various embodiments, the inner surface 410-32 may be disposed inside the main body 401 and may be planar.

The first housing 410-1 may include a first portion 410-101 and a second portion 410-102. The first portion 410-101 may have a circular ring shape. The second portion 410-102 may have a substantially cylindrical shape and may be disposed between the first portion 410-101 and the second housing 410-2. The second portion 410-102 may include a circular connection portion 410-103 protruding in the first direction 4001. The first portion 410-101 may be coupled to the connection portion 410-103 of the second portion 410-102. According to various embodiments, the first portion 410-101 may be designed to be rotatable in a state in which it is coupled to the connection portion 410-103 of the second portion 410-102.

The support member 420 (for example, a bracket) may be a structure which has electronic components installed thereon and supports the electronic components, and may be disposed between the display 430 and the PCB 440. The display 430 and the PCB 440 may be supported by the support member 420, thereby guaranteeing rigidity. According to various embodiments, the support member 420 may serve to support and protect a battery 480.

According to an embodiment, the support member 420 may include a first installation surface 420-1 supported as a portion having the display 430 installed thereon, and a second installation surface 420-2 supported as a portion having the PCB 440 installed thereon. The first installation surface 420-1 and the second installation surface 420-2 of the support member 420 may include a shape (for example, a recess or the like) having the display 430 and the PCB 440 mounted therein without shaking.

According to various embodiments, the support member 420 may have a substantially plate shape and may be disposed inside the second portion 410-102 of the housing 410-1. For example, the support member 420 may be coupled to a seating portion (not shown) formed inside the second portion 410-102 of the first housing 410-1 by using a coupling means such as a fastener, a bolt and/or the like.

According to various embodiments, when viewed from the second direction 4002, the support member 420 may have a substantially annular shape including a penetrating portion 420-4.

The display 430 may be disposed between the window 410-3 and the support member 420. According to an embodiment, the display 430 may be coupled to the inner surface 410-32 of the window 410-3. According to various embodiments, the display 430 may be provided as a module including the window 410-3. The display 430 may be electrically connected to the PCB 440 and may display an image according to an electric signal from the PCB 440. According to an embodiment, the display 430 may include an electric connecting means (not shown) (for example, a flexible printed circuit board (FPCB) or a cable) electrically connected to the PCB 440.

According to an embodiment, the display 430 may include a liquid crystal display (LCD) or an organic light emitting diode (OLED) (for example, an active matrix (AM)-OLED)).

According to an embodiment, the display 430 may further include a touch panel for inputting a touch or hovering. The touch input or hovering input caused on the display 430 may be transmitted to the PCB 440. According to various embodiments, the display 430 may provide a display-integrated touch screen. For example, the display 430 may be an AM-OLED-integrated touch screen (an on-cell TSP AMOLED (OCTA)). According to another embodiment, the display 430 may be designed as a wearable display, a flexible display, or a bendable display.

According to an embodiment, the main body 401 may further include a pressure sensor (not shown). For example, the pressure sensor may include a conductive pattern and a detector electrically connected to the conductive pattern.

According to an embodiment, the conductive pattern may include a first electrode and a second electrode which are separated from each other. The first electrode may be disposed to face the outer surface of the main body 401, and the second electrode (for example, a ground mounted in the main body 401) may be disposed inside the main body 401 to overlap the first electrode at least in part. The detector may apply a voltage to the first electrode and the second electrode, and accordingly, a capacitance may be generated between the first electrode and the second electrode. When a pressure is applied to the outer surface of the main body 401, the first electrode and the second electrode may be close to each other and the capacitance may be changed (for example, the capacitance increases). The director may output a signal caused by the change in the capacitance to the processor of the main body 401 (for example, the processor 120 of FIG. 1 or the processor 210 of FIG. 2). In this way, the processor of the main body 401 may detect a position of the outer surface of the main body 401 to which the pressure is applied.

The conductive pattern of the pressure sensor may be disposed along at least a portion of the outer surface of the main body 401. According to an embodiment, the conductive pattern of the pressure sensor may be disposed along at least a portion of the display 430. For example, the conductive pattern of the pressure sensor may be designed to be integrally formed with a conductive pattern for inputting a touch or hovering. According to various embodiments, the conductive pattern of the pressure sensor may be disposed between the conductive pattern for inputting a touch or hovering and the window 410-3. According to various embodiments, the conductive pattern of the pressure sensor may be displayed on an in-cell region or an on-cell region of the display 430.

The PCB 440 may be disposed between the support member 420 and the second surface 412. The PCB 440 may include a plurality of electronic components (for example, the processor 210, the memory 230, or the like of FIG. 2) and an electric wire connecting the electronic components. The PCB 440 may establish an execution environment of the electronic device 400 and may support data input/output exchange among apparatuses in the electronic device 400.

The PCB 440 may include an electromagnetic field circuit (not shown). The electromagnetic field circuit may wirelessly transmit and receive signals or may wirelessly receive or transmit power using at least one antenna included in the electronic device 400. According to an embodiment, the electromagnetic field circuit may include a power transmission and reception circuit and a communication circuit.

The power transmission and reception circuit of the PCB 440 may wirelessly receive or transmit power using at least one antenna (not shown) of the electronic device 400. According to an embodiment, the power transmission and reception circuit may include a power transmission and reception circuit of a magnetic induction method. For example, when an electromagnetic field flowing in an antenna (for example, a coil) of an external electronic device is applied to at least one antenna of an antenna arrangement region 450, an induced current may flow in at least a portion of the at least one antenna and the power transmission and reception circuit may provide power to a load of the electronic device 400 (for example, charging a battery) using the induced current.

According to various embodiments, the power transmission and reception circuit of the PCB 440 may include a power transmission and reception circuit of a magnetic resonance method. For example, at least a portion of the at least one antenna (for example, a conductive line extending from a first end to a second end to form a wound portion of a plurality of turns, or a coil-type metal pattern, an annular metal member, or the like), and the power transmission and reception antenna (for example, a coil) of the external electronic device may have the same resonant frequency, and the power transmission and reception circuit may receive power from the external electronic device or may transmit power to the external electronic device using a resonance phenomenon occurring therebetween.

The communication circuit of the PCB 440 may support various types of communications using at least one antenna. According to an embodiment, the communication circuit may include a short-range communication circuit and may support short range communication with an external electronic device using at least one antenna. For example, the short-range communication may include wireless fidelity (WiFi), Bluetooth, near field communication (NFC), a global navigation satellite system (GNSS), or the like. According to various embodiments, the short-range communication may include magnetic signal transmission and reception with the external electronic device (for example, magnetic secure transmission (MST) for electronic payment). The magnetic signal transmission and reception technology is communication technology for an offline payment using a magnetic field, and may be used to communicate with a point of sale (POS) device.

According to various embodiments, the communication circuit of the PCB 440 may include a cellular communication circuit and may transmit a mobile communication signal to a base station or receive a signal from the base station using at least one antenna.

The at least one antenna may be disposed in at least a portion of the housing 410 or inside the housing 410. According to an embodiment, the at least one antenna may be disposed on an inner surface of the annular portion (for example, the bezel 4006) providing the third surface 413 in the housing 410.

The main body 401 may include the battery 480 for providing power necessary for driving the electronic device 400. The battery 480 may be disposed between the support member 420 and the PCB 440. For example, the battery 480 may be disposed in the recess (not shown) formed on the second installation surface 420-2 of the support member 420. According to an embodiment, power wirelessly received from an external electronic device through the at least one antenna of the antenna arrangement region 450 may be used to charge the battery 480.

The main body 401 may include at least one sensor disposed at at least one portion of the electronic device 400 (for example, inside the housing 410). According to an embodiment, the at least one sensor (for example, an acceleration sensor, a gyro sensor, a gravity sensor, or the like) may acquire information on a motion of the electronic device 400. The electronic device 400 may determine a posture of the electronic device 400 based on the information acquired from the at least one sensor. For example, information on the posture of the electronic device 400 may include an angle of the electronic device 400 rotated with respect to space axes, x-, y-, z-axes. The electronic device 400 may determine whether the electronic device 400 is dropped based on information acquired from the at least one sensor. For example, the electronic device 400 may determine whether the electronic device 400 is in a dropping state, that is, falling by moving in the gravity direction with a gravitational acceleration, based on information acquired from the at least one sensor.

According to various embodiments, at least one sensor (for example, a grip sensor, a proximity sensor, a heart rate sensor, a temperature sensor, or the like) may acquire information which is used for determining whether the electronic device 400 is in the proximity of the user or whether the electronic device 400 is worn on the user or carried by the user. For example, when information on a user's heart rate (or sensor data) is acquired by the heart rate sensor, the electronic device 400 may determine a wearing state of the electronic device 400.

According to an embodiment, the main body 401 may further include at least one sensor 493 disposed between the PCB 440 and the second surface 412. The at least one sensor 493 may include a sensor for detecting a light signal of at least one wavelength band. For example, the at least one sensor 493 may include a light emitter 494 (for example, a light emitting diode) for generating light of at least one wavelength band, and a light receiver 495 (for example, a photodiode) for detecting a light signal of at least one wavelength band.

According to an embodiment, the second housing 410-2 may include a first penetrating hole 410-21 and a second penetrating hole 410-22. Light from the light emitter 494 may be discharged to the outside through the first penetrating hole 410-21. Light from the outside may be transmitted to the light receiver 495 through the second penetrating hole 410-22.

According to various embodiments, the at least one sensor 493 may include one or more light emitters and/or light receivers although they are not illustrated, and accordingly, the second housing 410-2 may have penetrating holes formed therein. For example, the at least one sensor 493 may include two light emitters and one light receiver. When viewed from the first direction 4001, one light receiver may be disposed between the two light emitters. When the at least one sensor 493 is designed to include two light emitters and one light receiver, the second housing 410-2 may include three penetrating holes corresponding to two light emitters and one light receiver of the at least one sensor 493.

According to various embodiments, the second housing 410-2 may include one penetrating hole although it is not illustrated, and the light emitter 494 and the light receiver 495 of the at least one sensor 493 may share one penetrating hole.

According to an embodiment, the at least one sensor 493 may include a biometric sensor. For example, when the electronic device 400 is worn on the user's wrist, light from the light emitter 494 may transmitted to the user's wrist and light reflected from the wrist may be transmitted to the light receiver 495. The light receiver 495 may detect a light signal and generate an electric signal. Such an electric signal may be about a heart rate.

According to an embodiment, the input apparatus 500 may include the hole 4130 formed on the bezel 4006 of the main body 401. The input apparatus 500 may include the actuator 590 coupled to the hole 4130. As described above with reference to FIG. 4A, the actuator 590 may substantially extend from one end 5901 to the other end in a straight line. When the actuator 590 is coupled to the hole 4130, one end 5901 of the actuator 590 may be exposed to the outside and the other end (not shown) of the actuator 590 may be disposed inside the electronic device 400.

The actuator 590 may be designed to be moved in the inward direction of the electronic device 400 by an external force. When an external force is applied to one end 5901 of the actuator 590 exposed to the outside, the shaft may slide in the hole 4130 and the actuator 590 may be linearly moved in the inward direction of the electronic device 400. According to an embodiment, the actuator 590 may be moved in the direction 4004 perpendicular to the direction 4005 between the first extension portion 402 and the second extension portion 403.

According to various embodiments, the actuator 590 may be designed to be tilted by an external force with reference to the other end disposed inside the electronic device 400 in various directions.

According to various embodiments, the actuator 590 may be designed to be rotated by an external force. The actuator 590 may be rotated about the central line 5903 of the shaft 510 (FIG. 5A) extending from one end 5901 to the other end in the clockwise direction or counter clockwise direction.

The main body 401 may include at least one electronic component 460 functionally (or operatively) coupled to the actuator 590. The at least one electronic component 460 may generate an electric signal in response to a motion (for example, a translational motion or a rotary motion) of the actuator 590 made by an external force. According to an embodiment, the at least one electronic component 460 may be a press button switch (for example, a dome switch or the like). According to various embodiments, the at least one electronic component 460 may be a rotary switch. According to various embodiments, the at least one electronic component may be various types of sensors.

The support member 420 may include a third installation surface 420-3 enclosing a space between the first installation surface 420-1 and the second installation surface 420-2 in a substantially annular shape. At least a portion of the third installation surface 420-3 may be formed to be coupled to the inside of the bezel 4006. According to an embodiment, the at least one electronic component 460 may be installed on the third installation surface 420-3. The at least one electronic component 460 (for example, a push button switch) may be aligned with the hole 4130 of the bezel 4006 in the linear moving direction of the actuator 590.

According to an embodiment, the at least one electronic component 460 may be installed on a flexible printed circuit board (FPCB) 461 disposed on the third installation surface 420-3 of the support member 420.

According to an embodiment, one end (not shown) of the FPCB 461 may extend to the PCB 440 and may be electrically connected to the PCB 440. The at least one electronic component 460 may generate an electric signal in response to a motion (for example, a translational motion or a rotary motion) of the actuator 590, and may transmit the generated electric signal to the PCB 440. The PCB 440 may process various functions of the electronic device 400 based on the electric signal generated from the at least one electronic component 460.

According to an embodiment, when the electronic device 400 is dropped, the electronic device 400 may prevent the actuator 590 from being moved in the inward direction of the electronic device 400. Even when an external shock or load going beyond a design criterion is applied to the actuator 590 due to the dropping of the electronic device 400, the actuator 590 may be prevented from being moved toward the electronic component and thus a damage to the electronic component which may be caused by the dropping of the electronic device 400 can be prevented. For example, the input apparatus 500 may include the stopper (not shown) which is movable according to a state of the electronic device 400. When the electronic device 400 is dropped, the stopper may be moved so as to prevent the actuator 590 from being moved in the inward direction of the electronic device 400. According to an embodiment, the electronic device 400 may include the above-described first apparatus (not shown) (for example, a weight) which moves the stopper using gravity. According to various embodiments, the electronic device 400 may include the above-described second apparatus (not shown) (for example, at least one electromagnet) which generates a force for moving the stopper.

According to various embodiments, an electronic device may include a plurality of input apparatuses. FIG. 4D illustrates another electronic device 4400 providing a shock prevention function according to various embodiments of the present disclosure. Referring to FIG. 4D, the electronic device 4400 may be an electronic device of a watch type which is wearable on a user's wrist, and may include a main body 4401, and a first extension portion 4402 and a second extension portion 4403 which are coupled to both ends 44012 and 44013 of the main body 4401. The electronic device 4400 may include a first input apparatus 4501 and a second input apparatus 4502 which are coupled to a side surface 4413 of the main body 4401. The first input apparatus 4501 and/or the second input apparatus 4502 may include a mechanical actuation structure similar to that of the input apparatus 500 of FIG. 4A. For example, the first input apparatus 4501 may include a first shaft 45901 straightly extending in a direction 44006 from one end to the other end, and the second input apparatus 4502 may include a second shaft 45902 straightly extending in a direction 44007 from one end to the other end.

The side surface 4413 of the main body 4401 may include both side surfaces (a first side surface 4413-1 and a second side surface 4413-2) distinguished from each other by a virtual straight line straightly connecting the first extension portion 4402 and the second extension portion 4403. According to an embodiment, both the first input apparatus 4501 and the second input apparatus 4502 may be installed on the second side surface 4413-2. According to various embodiments, the electronic device 4440 may be designed to have at least one input apparatus installed on the first side surface 4413-1 although it is not illustrated.

According to an embodiment, a first surface 4411 of the main body 4401 may be substantially circular. A virtual straight line 440041 may pass through a center 4000 of the circular first surface 4411 and may extend in a direction 44004 perpendicular to a direction 44005 between the first extension portion 4402 and the second extension portion 4403. A distance between the virtual straight line 440041 and the first extension portion 4402 may be the same as a distance between the virtual straight line 440041 and the second extension portion 4403. According to an embodiment, the first input apparatus 4501 and the second input apparatus 4502 may be disposed at both sides of the virtual straight line 440041.

According to an embodiment, as shown in FIG. 4D, for example, the first actuator 45901 of the first input apparatus 4501 may linearly move in a direction of forming an acute angle with the virtual straight line 440041 (for example, the direction 44006 or the opposite direction thereto). According to various embodiments, the second actuator 45902 of the second input apparatus 4502 may linearly move in a direction of forming an acute angle with the virtual straight line 440041 (for example, the direction 44007 or the opposite direction thereto).

According to an embodiment, the first actuator 45901 and/or the second actuator 45902 may be designed not to be moved in the inward direction of the electronic device 4400 when the electronic device 4400 is dropped. Even when an external shock or load going beyond a design criterion is applied to the first actuator 45901 or the second actuator 45902 due to the dropping of the electronic device 4400, the first actuator 45901 or the second actuator 45902 may be prevented from being moved toward the electronic components and thus a damage to the electronic component which may be caused by the dropping of the electronic device 4400 can be prevented. For example, when the electronic device 4400 is dropped with the direction 44006 from the other end of the first actuator 45901 to one end being substantially parallel to the gravity direction or forming an acute angle, a first stopper (not shown) of the first input apparatus 4501 may be moved to a specific position, and, even when an external shock or load is applied to the first actuator 45901, the first actuator 45901 may be prevented from being moved in the inward direction of the electronic device 4400 by the moved stopper. For example, when the electronic device 4400 is dropped with the direction 44007 from the other end of the second actuator 45902 to one end being substantially parallel to the gravity direction or forming an acute angle, a second stopper (not shown) of the second input apparatus 4502 may be moved, and, even when an external shock or load is applied to the second actuator 45902, the second actuator 45902 may be prevented from being moved in the inward direction of the electronic device 4400 by the moved second stopper.

According to an embodiment, the electronic component functionally coupled to the first actuator 45901 or the second actuator 45902 may include a push button switch, a rotary switch, a sensor, or the like.

According to various embodiments, mechanical actuation methods of the first actuator 45901 and the second actuator 45901 may be the same as each other or may be different from each other. For example, the first actuator 45901 may be designed to be functionally coupled to a push button switch and to be linearly moved by an external force, and the second actuator 45902 may be designed to be functionally coupled to a rotary switch and to be rotatable by an external force.

Figure 5A:
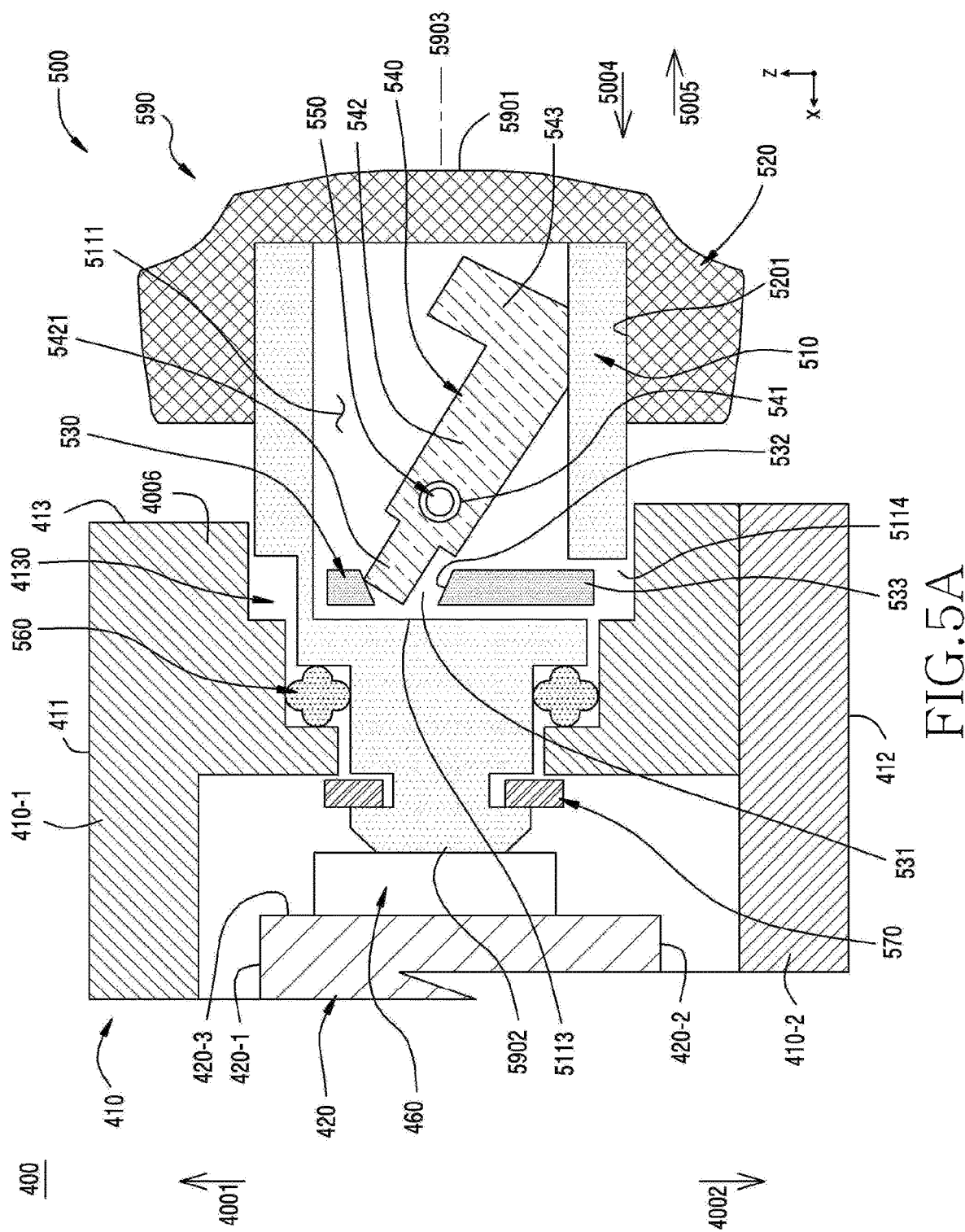
FIG. 5A and FIG. 5B are cross section views to illustrate the elements of the electronic device of FIG. 4A having the input apparatus installed therein and providing the shock prevention function according to an embodiment of the present disclosure.
Figure 5B:
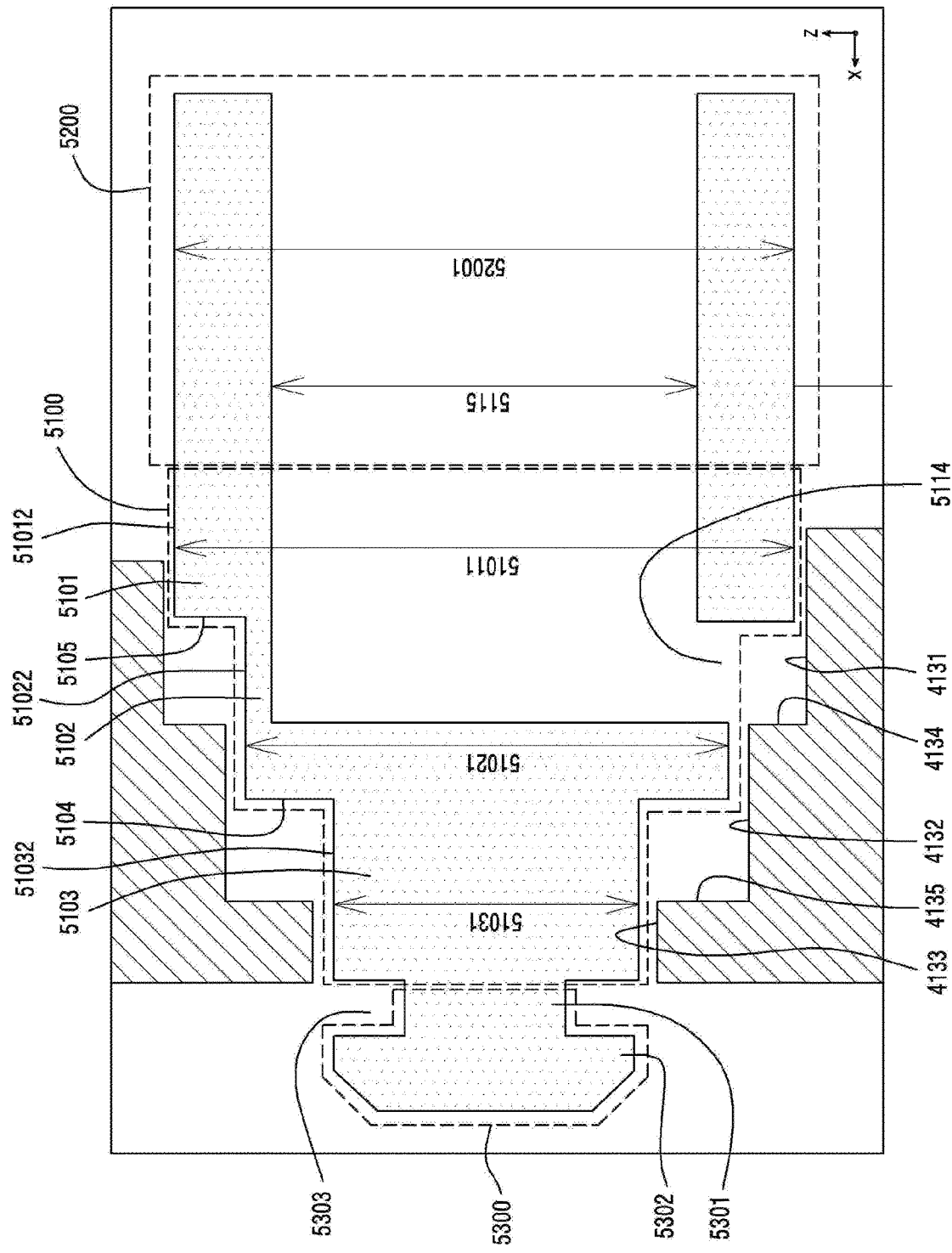
Figure 6:
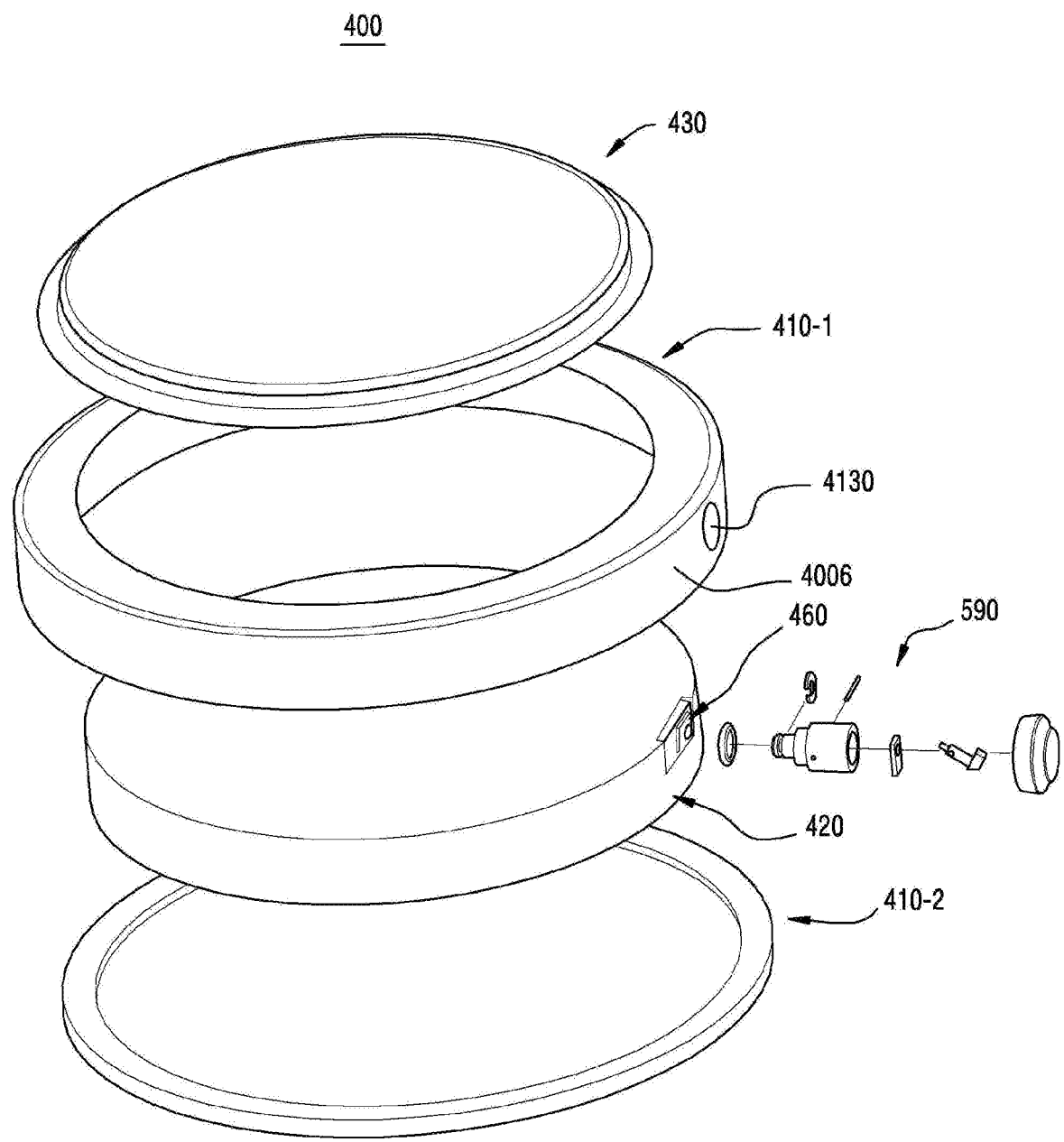
FIG. 6 is a view showing coupling relationships of the elements of the electronic device of FIG. 4A including the input apparatus installed therein and providing the shock prevention function according to an embodiment of the present disclosure.
Figure 7:
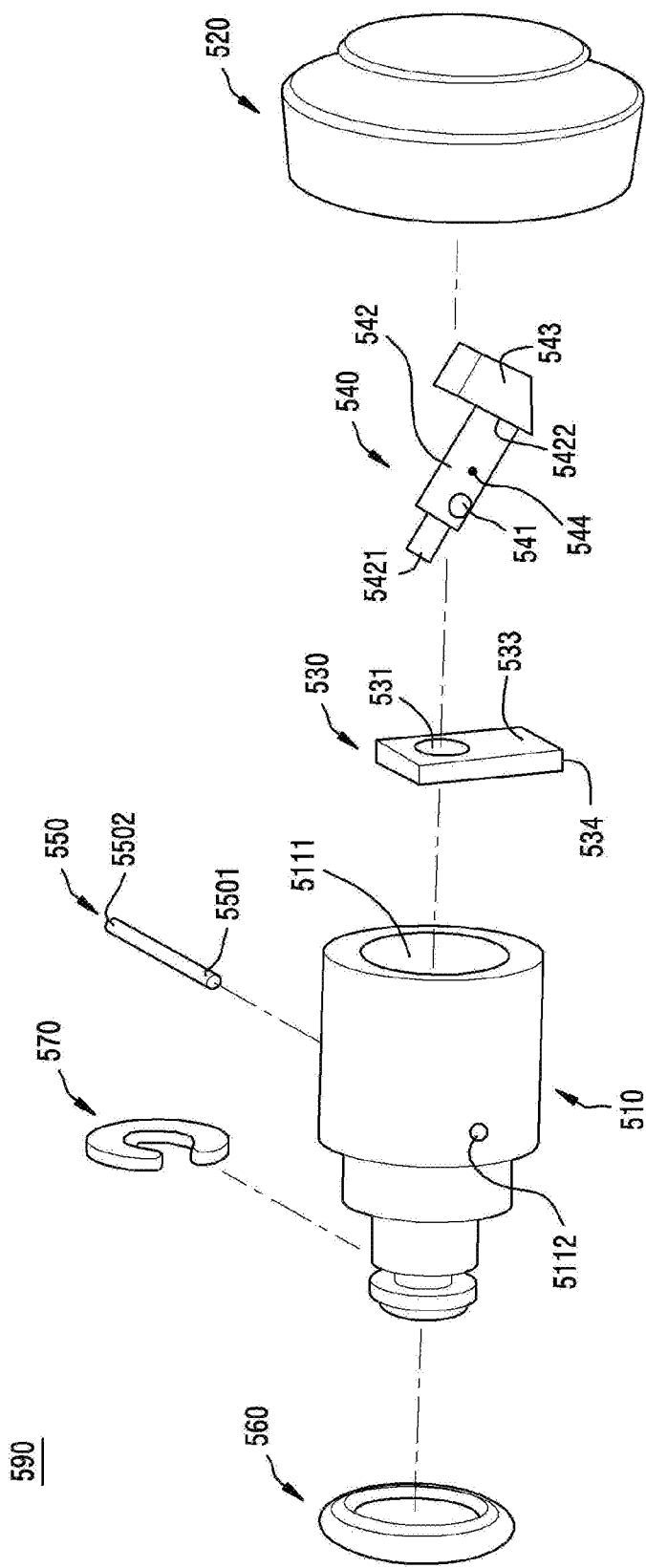
FIG. 7 is a view to illustrate an actuator of an input apparatus according to an embodiment of the present disclosure.

FIGS. 5A and 5B are cross section views to illustrate the elements of the electronic device of FIG. 4A having the input apparatus installed therein and providing the shock prevention function according to an embodiment of the present disclosure. FIG. 6 is a view showing coupling relationships of the elements of the electronic device of FIG. 4A having the input apparatus installed therein and providing the shock prevention function according to an embodiment of the present disclosure. FIG. 7 is a view to illustrate an actuator of an input apparatus according to an embodiment of the present disclosure. FIGS. 8A to 8D are views to illustrate a mechanical actuation of an input apparatus according to an embodiment of the present disclosure. According to various embodiments, the electronic device 400 may be the electronic device 101 of FIG. 1 or the electronic device 201 of FIG. 2.

Referring to FIGS. 5A to 6, the electronic device 400 may include a housing 410, a support member 420, and an input apparatus 500.

According to an embodiment, the housing 410 may include a first surface 411 facing in a first direction 4001 and a second surface 412 facing in a second direction 4002 opposite to the first surface 411. The housing 410 may include a third surface 413 enclosing a space between the first surface 411 and the second surface 412. According to an embodiment, the housing 410 may include a first housing 410-1 and a second housing 410-2. According to various embodiments, the housing 410 (for example, the first housing 410-1) may provide an annular bezel 4006 enclosing the space between the first surface 411 and the second surface 412.

According to an embodiment, the support member 420 may be a structure having electronic components installed and supported thereon. For example, the support member 420 may include a first installation surface 420-1 having a display 430 installed thereon, a second installation surface 420-2 having a PCB (for example, the PCB 440 of FIG. 4B) installed thereon, and a third installation surface 420-3 enclosing a space between the first installation surface 420-1 and the second installation surface 420-2 and having a substantially annular shape.

Referring to FIGS. 5A to 7, the input apparatus 500 may include an actuator 590, a hole 4130 of the bezel 4006, and at least one electronic component 460. The actuator 590 may be coupled to the hole 4130 of the bezel 4006 and may be moved in an inward direction 5004 (hereinafter, a "fourth direction") of the electronic device 400 by an external force. When the actuator 590 is moved in the fourth direction 5004, the at least one electronic component may generate an electric signal in response to the actuator 590 being moved or otherwise translated. According to an embodiment, the fourth direction 5004 may be perpendicular to the first direction 4001 or the second direction 4002.

According to various embodiments, the actuator 590 may be designed to have one end 5901 (for example, a key top 520) protruding relative the third surface 413. According to an embodiment, when the actuator 509 is coupled to the hole 4130 of the bezel 4006, one end 5901 (for example, the key top 520) of the actuator 590 may be exposed to the outside and the other end 5902 of the actuator 590 may be placed inside the electronic device 400.

According to an embodiment, the actuator 590 may include a shaft 510 straightly extending in a direction (for example, the fourth direction 5004) from one end 5901 to the other end 5902. When an external force is applied to one end 5901 of the actuator 590, the shaft 510 may slid in the hole 4130 of the bezel 4006 and the actuator 590 may be linearly moved in the fourth direction 5004.

Referring to FIG. 5B, the shaft 510 may include a shaft (hereinafter, a "middle shaft") 5100 having an outer diameter and having a circular cross section. The middle shaft 5100 may enable the shaft 510 to slide in the hole 4130 of the bezel 4006 and also enable the shaft 510 to rotate. For example, the actuator 590 may be rotated about a central line 5903 of the middle shaft 5100 in the clockwise direction or counter clockwise direction. When viewed from the fourth direction 5004, the hole 4130 of the bezel 4006 may be a circular hole enabling the middle shaft 5100 to linearly move and rotate.

According to an embodiment, the shaft 510 may include an outer shaft 5200 extending from one end of the middle shaft 5100 and an inner shaft 5300 extending from the other end of the middle shaft 5100. The outer shaft 5200 may protrude relative to the third surface 413. When the actuator 590 is not moved in the fourth direction 5004, a portion of the middle shaft 5100 connected to the outer shaft 5200 may also protrude relative to the third surface 413. According to various embodiments, when the actuator 590 is moved in the fourth direction 5004 by an external force, the middle shaft 5100 may not protrude relative to the third surface 413.

According to various embodiments, the outer shaft 5200 and/or inner shaft 5300 may be a circular shaft having an outer diameter, or, since the outer shaft 5200 and/or inner shaft 5300 is not a portion that supports linear movement and rotation of the actuator 590 with respect to the hole 4130, the outer shaft 5200 and/or inner shaft 5300 may not be a circular shaft having an outer diameter.

According to an embodiment, when viewed from a cross section, the middle shaft 5100 may be formed to substantially become narrower in the fourth direction 5004 along the central line 5903. For example, the middle shaft 5100 may include a first middle shaft 5101 connected to the outer shaft 5200, a third middle shaft 5103 connected to the inner shaft 5300, and a second middle shaft 5102 connecting the first middle shaft 5101 and the third middle shaft 5103. An outer diameter 51011 of the first middle shaft 5101 may be larger than an outer diameter 51021 of the second middle shaft 5102. The outer diameter 51021 of the second middle shaft 5102 may be larger than an outer diameter 51031 of the third middle shaft 5103.

The outer shaft 5200 may be a circular shaft having an outer diameter 52001, and the outer diameter 52001 of the outer shaft 5200 may be the same as the outer diameter 51011 of the first middle shaft 5101.

According to an embodiment, the shaft 510 may include a space 5111 which is dug in the fourth direction 5004. For example, the space 5111 may be a space which is dug or formed or located in a portion of the second middle shaft 5102 in the fourth direction 5004. According to an embodiment, the space 5111 may be a cylindrical space substantially having an inner diameter 5115. Due to the space 5111, the second middle shaft 5102, the first middle shaft 5101, and the outer shaft 5200 may have a vessel shape which is substantially convex in the fourth direction 5004.

According to an embodiment, the actuator 590 may include the key top 520 installed at one end 5901 thereof. The key top 520 may be coupled to the outer shaft 5200 and may be used as a portion receiving an external force for a mechanical actuation of the input apparatus 500. According to various embodiments, when viewed from a cross section, the key top 520 may have a vessel shape (for example, a circular vessel shape) which is substantially convex in the opposite direction (hereinafter, a "fifth direction") 5005 to the fourth direction 5004. The key top 520 may include a space (or a recess) 5201 which is dug in the fifth direction 5005. According to various embodiments, the space 5201 may be a substantially cylindrical space. The outer shaft 5200 may be coupled to the space 5202 of the key top 520. For example, the outer diameter 52001 of the outer shaft 5200 may be substantially the same as an inner diameter of the space 5201 of the key top 520, or may be smaller than the inner diameter of the space 5201 of the key top 520 by a designed tolerance, and the outer shaft 5200 may be fitted into the space 5201 of the key top 520.

According to an embodiment, the actuator 590 may include a pin 550 installed across the space 5111 of the shaft 510. The pin 550 may be a circular shaft having an outer diameter, and its length direction may be perpendicular to the fourth direction 5004. According to various embodiments, the length direction of the pin 550 may be parallel to the direction 4005 (FIG. 4A) between the first extension portion 402 (FIG. 4A) and the second extension portion 403 (FIG. 4A).

According to an embodiment, the shaft 510 may include a pair of pin holes 5112 formed on both sides of the space 5111. A direction between the pair of pin holes 5112 may be perpendicular to the fourth direction 5004. According to various embodiments, the direction between the pair of pin holes 5112 may be parallel to the direction 4005 (FIG. 4A) between the first extension portion 402 (FIG. 4A) and the second extension portion 403 (FIG. 4A). When the pin 550 is installed in the shaft 510 to have one end 5501 and the other end 5502 coupled to the pair of pin holes 5112, a portion between one end 5501 and the other end 5502 of the pin 550 may be placed across the space 5111.

According to an embodiment, the actuator 590 may include a weight 540 disposed in the space 5111 of the shaft 510. The weight 540 may be rotatably coupled to the pin 550 disposed across the space 5111 of the shaft 510. The weight 540 may include a hole 541 coupled to the pin 550.

The weight 540 may include a member 542 which extends in a direction from one end 5421 to the other end 5422. The pin 550 may be coupled to the hole 541 formed between one end 5421 and the other end 5422 of the member 542. The member 542 may include both side portions (not shown) divided with reference to the pin 550. For example, one side portion (hereinafter, a "first portion") may include a portion between one end 5421 and the hole 541 and the other side portion (hereinafter, a "second portion") may include a portion between the other end 5422 and the hole 541.

A torque causing the second portion of the weight 540 to be rotated in the clockwise direction by gravity may be designed to be greater than a torque causing the first portion of the weight 540 to be rotated in the counter clockwise direction by gravity. According to an embodiment, the second portion may be designed to be heavier than the first portion. According to various embodiments, a distance between one end 5421 and the hole 541 may be designed to be smaller than a distance between the other end 5422 and the hole 541. For example, a middle point 544 of a length between one end 5421 and the other end 5422 may be designed to be placed on the second portion. According to various embodiments, at least a portion of the first portion may be designed to be thinner than the second portion along the length from one end 5421 to the other end 5442. According to various embodiments, the weight 540 may further include an additional member 543 connected to the other end 5442.

When the key top 520 is coupled to the shaft 510, the space 5111 of the shaft 510 may be hidden by the key top 520. The other end 5422 of the weight 540 may be placed on the side of the key top 520 with reference to the pin 550. According to an embodiment, the weight 540 may be rotated about the pin 550 by gravity according to a posture of the electronic device 400.

According to an embodiment, the actuator 590 may include a stopper 530 coupled to one end 5421 of the weight 540. The stopper 530 coupled to one end 5421 may be moved by the rotation of the weight 540. According to an embodiment, the stopper 530 may include a coupling portion 531 to which one end 5421 of the weight 540 is coupled. One end 5421 of the weight 540 may be coupled to the coupling portion 531 of the stopper 530 and a linear motion of the stopper 530 may be caused by the rotary motion of the weight 540. The stopper 530 may be disposed between a surface 5113 of the space 5111 of the shaft 510 facing in the fifth direction 5005 and the shaft 510, and may slide along the surface 5113.

According to an embodiment, one end 5421 of the weight 540 may be rotatably coupled to the coupling portion 531 of the stopper 530. For example, the coupling portion 531 of the stopper 530 may include a hole as shown in the drawing. For example, the coupling portion 531 of the stopper 530 may include a groove which is dug in the fourth direction 5004, although it is not illustrated. According to various embodiments, when the coupling portion 531 of the stopper 530 is designed as a hole or a groove, the hole or the groove may include a slope surface 532 for reducing generation of a torque hindering the rotation of the one end 5421 of the weight 540. In addition, various other coupling such as hinge coupling may be applied to couple the stopper 530 and the weight 540.

According to various embodiments, the stopper 530 may be designed to linearly move while being hung on the surface 5113 of the space 5111 although it is not illustrated. For example, the surface 5113 of the space 5111 may include a rail and the stopper 530 may be coupled to the rail and may linearly move by being guided by the rail. In addition, various other embodiments of guiding a linear movement of the stopper 530 are possible.

According to an embodiment, the shaft 510 may include a hole 5114 formed in a linear moving direction (for example, the second direction 4002) of the stopper 530. For example, the stopper 530 may be placed in the space 5111 of the shaft 510 by the rotation of the weight 540. The stopper 530 may be moved in the second direction 4002 by the rotation of the weight 540, and one end 533 of the stopper 530 may protrude out of the shaft 510 through the hole 5114.

According to an embodiment, as shown in the drawing, the stopper 530 may be a plate of a substantially rectangular shape. However, this should not be considered as limiting, and the stopper 530 may have various shapes to smoothly make a linear movement. For example, a corner 534 of the stopper 530 may be formed to taper.

Referring to FIG. 5B, according to an embodiment, when viewed from a cross section, the hole 4130 of the bezel 4006 may include a first hole 4131 for the first middle shaft 5101, a second hole 4132 for the second middle shaft 5102, and a third hole 4133 for the third middle shaft 5103. An inner diameter of the first hole 4131 may be substantially identical to the outer diameter 51011 of the first middle shaft 5101 or may be larger than the outer diameter 51011 of the first middle shaft 5101 by a designed tolerance. An inner diameter of the second hole 4132 may be substantially identical to the outer diameter 51021 of the second middle shaft 5102 or may be larger than the outer diameter 51021 of the second middle shaft 5102 by a designed tolerance. An inner diameter of the third hole 4133 may be substantially identical to the outer diameter 51031 of the third middle shaft 5103 or larger than the outer diameter 51031 of the third middle shaft 5103 by a designed tolerance. According to an embodiment, the inner diameter of the first hole 4131 may be larger than the inner diameter of the second hole 4132 and the inner diameter of the second hole 4132 may be larger than the inner diameter of the third hole 4133. The hole 4130 of the bezel 4006 may include a first stepped surface 4134 connecting the first hole 4131 and the second hole 4132. The hole 4130 of the bezel 4006 may include a second stepped surface 4135 connecting the second hole 4132 and the third hole 4133. The first stepped surface 4134 or the second stepped surface 4135 may substantially face in the fifth direction 5005 (FIG. 5A) and may be formed in a substantially circular or annular ring shape when viewed from the fourth direction 5004 (FIG. 5A). However, all shapes and configurations may be within the scope and spirt of the present application.

According to an embodiment, at least one electronic component 460 may be installed on the third installation surface 420-3 of the support member 420. The at least one electronic component 460 may be aligned with the hole 4130 of the bezel 4006 in the linear moving direction (for example, the fourth direction 5004) of the actuator 590. According to an embodiment, the at least one electronic component 460 may be a push button switch (for example, a dome switch), a rotary switch, or at least one sensor (for example, a pressure sensor). The at least one electronic component 460 may be aligned with the hole 4130 of the bezel 4006 in the linear moving direction of the actuator 590. For example, when the actuator 590 is moved in the fourth direction 5004 by an external force, the at least one electronic component 460 may be pressed by the actuator 590 and may generate an electric signal. In another example, when the actuator 590 is rotated about the central line 5903 of the shaft 510 in the clockwise direction or counter clockwise direction by an external force, the at least one electronic component 460 may generate an electric signal in response to the actuator 590 being rotated.

The actuator 590 may include a release prevention element 570 for preventing the shaft 510 from being released in the fifth direction 5005. According to an embodiment, the actuator 590 may include a washer coupled to the inner shaft 5300 of the shaft 510. The shaft 510 may be prevented from being released in the fifth direction 5005 by the release prevention member 570.

Referring to FIG. 5B, the inner shaft 5300 may include a first inner shaft 5301 and a second inner shaft 5302. The first inner shaft 5301 may be coupled to the third middle shaft 5103. The second inner shaft 5302 may be disposed between the electronic component 460 and the first inner shaft 5301. The release prevention element 570 may be coupled to the first inner shaft 5301. According to various embodiments, an outer diameter of the first inner shaft 5301 may be smaller than an outer diameter of the second inner shaft 5302 and the outer diameter of the third middle shaft 5103. When viewed from the fourth direction 5004, a circular ring-shaped space 5303 may be formed between the first inner shaft 5301, the second inner shaft 5302, and the third middle shaft 5103, and the release prevention element 570 may be coupled to the space 5303.

The actuator 590 may include a sealing member for preventing a foreign substance from entering through a gap between the shaft 510 and the hole 4130 of the bezel 4006. For example, the sealing member or sealant 560 may be an elastic body that is disposed between an inner surface of the hole 4130 of the bezel 4006 and a circumference surface of the shaft 510. According to an embodiment, the sealing member 560 may be disposed in a space (for example, a circular ring-shaped space) enclosed by an outer circumference surface 51032 of the third middle shaft 5103, a stepped surface 5104 between the third middle shaft 5103 and the second middle shaft 5102, the second stepped surface 4135, and an inner surface of the second hole 4132. According to an embodiment, the sealing member 560 may be an O-ring. According to various embodiments, the sealing member 560 may be designed to be disposed in another position between the inner surface of the hole 4130 of the bezel 4006 and the circumference surface of the shaft 510 although it is not illustrated.

According to another embodiment, when an external force is applied to the actuator 590 in the fourth direction 5004, the actuator 590 may be moved while receiving an elastic force of the sealing member 560. When the external force in the fourth direction 5004 of the electronic device 400 is removed, the actuator 590 may return to its original position due to the elastic restoring force of the sealing member 560.

According to various embodiments, the at least one electronic component 460 may include an elastic structure such as a push button switch. For example, the at least one electronic component 460 may be a dome switch which includes a first contact and a second contact having a metal dome shape. When an external force in the fourth direction 5004 is applied to the actuator 590, the actuator 590 may be moved while receiving an elastic force of the second contact. A portion of the second contact may be deformed to be deflected toward the first contact by the pressure of the actuator 590 and may be brought into contact with the first contact, and the first contact and the second contact may allow an electric current to pass therethrough. When the external force in the fourth direction 5004 of the electronic device 400 is removed, the actuator 590 may return to its original position by the elastic restoring force of the second contact.

According to various embodiments, the actuator 590 may further include an elastic member (for example, a compression spring) (not shown) of various shapes which is disposed between a stepped surface 5105 connecting an outer circumference surface 51012 of the first middle shaft 5101 and an outer circumference surface 51022 of the second middle shaft 5102, and the second stepped surface 4135 of the hole 4130. When the external force in the fourth direction 5004 is applied to the actuator 590, the actuator 590 may be moved while receiving an elastic force of the elastic member. When the external force in the fourth direction 5004 is removed, the actuator 590 may return to its original position by the elastic restoring force of the elastic member.

According to various embodiments, when there is no external force in the fourth direction 5004, the release prevention element 570 of the actuator 590 may be in close contact with the bezel 4006 due to the elastic force of the sealing member 560 and the at least one electronic component 460, which can prevent the actuator 590 from being shaken.

According to an embodiment, when one end 533 of the stopper 530 protrudes out of the shaft 510 through the hole 5114 by the rotation of the weight 540, the stopper 530 may cover the first stepped surface 4134 (or a projection) when viewed from the fourth direction 5004. When one end 533 of the stopper 530 protrudes out of the shaft 510 through the hole 5114, the first stepped surface 4134 may hinder the stopper 530 from being moved in the fourth direction 5004, such that the actuator 590 cannot be moved in the fourth direction 5004.

Figure 8A:
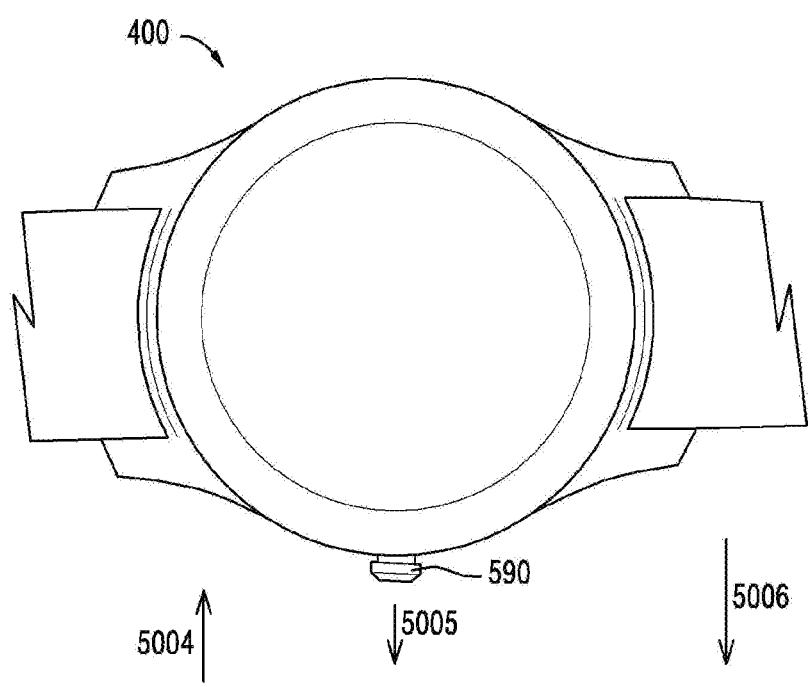
FIG. 8A, FIG. 8B, FIG. 8C and FIG. 8D are views to illustrate a mechanical actuation of an input apparatus according to an embodiment of the present disclosure.
Figure 8B:
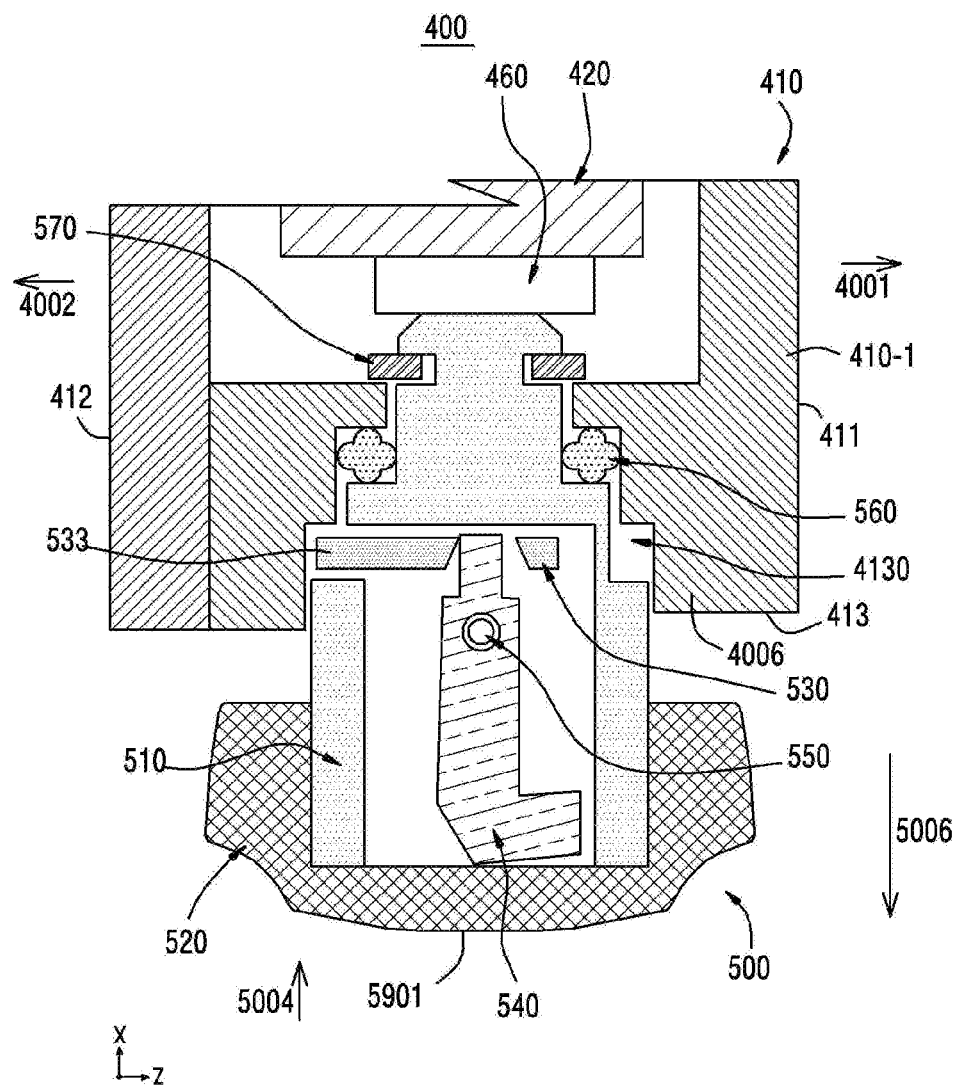

Referring to FIGS. 8A and 8B, when the electronic device 400 is dropped, the electronic device 400 may prevent the actuator 590 from being moved in the fourth direction 5004 by an external shock or load. When the electronic device 400 is dropped with the direction (fifth direction 5005) from the other end 5902 (FIG. 5A) of the actuator 590 to one end 5901 (FIG. 5A) being substantially parallel to the gravity direction 5006 or forming an acute angle, one end 533 of the stopper 530 may protrude out of the shaft 510 through the hole 5114 by the rotation of the weight 540 caused by gravity of the weight 540. Even when an external shock or load going beyond a design criterion is applied to the actuator 590 due to the dropping of the electronic device 400, the actuator 590 may be prevented from being moved in the fourth direction 5004 by the stopper 530, and accordingly, a damage to the electronic component 406 can be prevented.

Figure 8C:
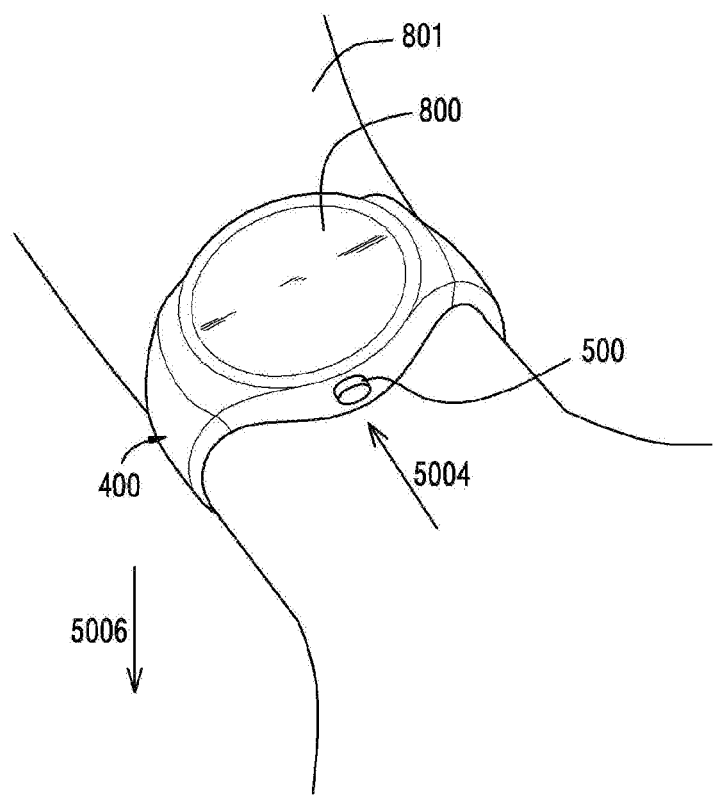
Figure 8D:
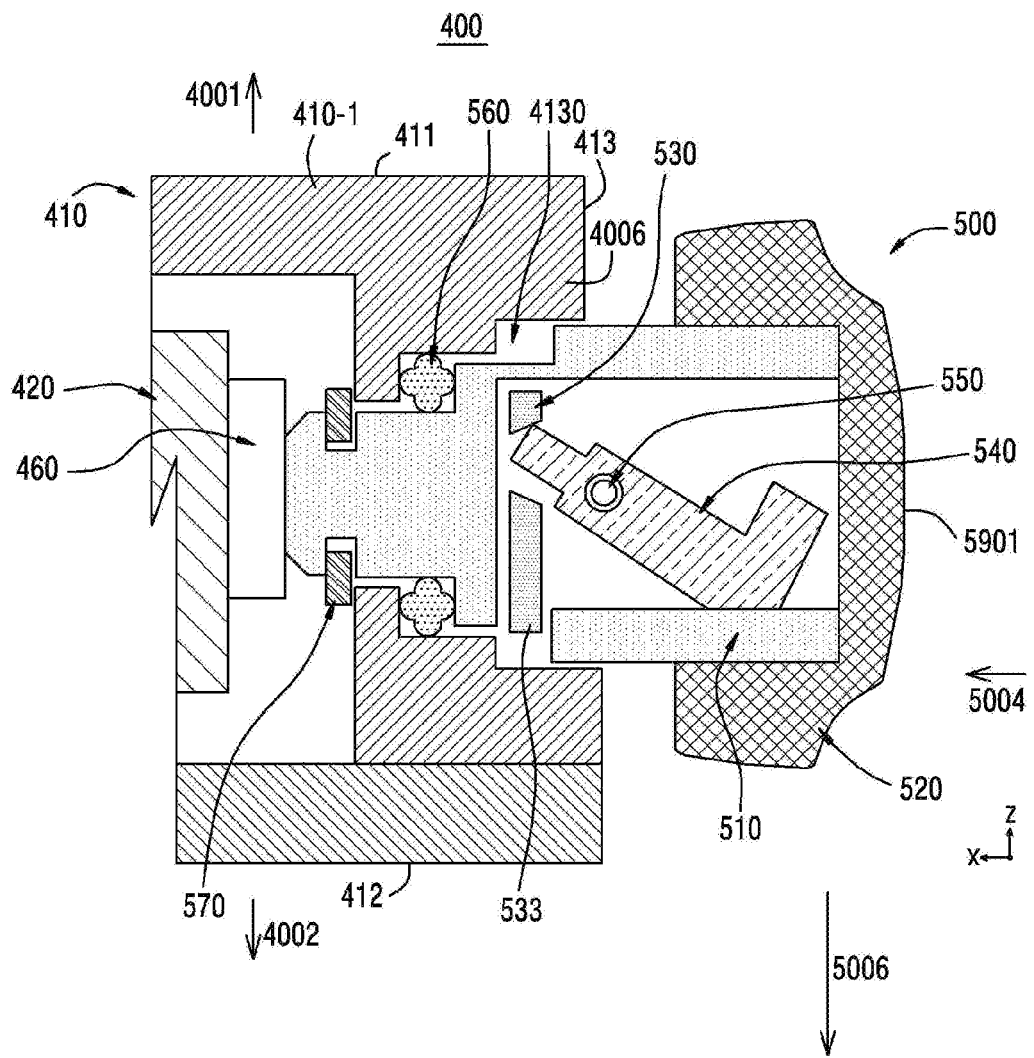

Referring to FIGS. 8C and 8D, when the electronic device 400 is worn on a user's wrist and a screen 800 is positioned to face in a direction substantially opposite to the gravity direction 5006, one end 533 of the stopper 530 may not protrude out of the shaft 510 through the hole 5114 by the rotation of the weight 540 caused by gravity. When one end 533 of the stopper 530 does not protrude out of the shaft 510 through the hole 5114, the actuator 590 may be in a state in which it is movable in the fourth direction 5004 by an external force (for example, a user's operating force).

FIGS. 9A to 9D are views to illustrate an actuator and a mechanical actuation thereof according to another embodiment of the present disclosure. The actuator 990 may include a shaft 910, a key top 920, a stopper 930, a weight 940, a pin 950, a sealing member 960, or a release prevention member 970. According to various embodiments, the shaft 910, the key top 920, the weight 940, the pin 950, the sealing member 960, and the release prevention element 970 may be substantially similar to or the same as the shaft 510, the key top 520, the weight 540, the pin 550, the sealing member 560, and the release prevention element 570 of FIGS. 5A to 7, and thus a description thereof is omitted to avoid unduly obsfucating the present disclosure in unnecessary detail.

The stopper 930 may be coupled to one end 941 of the weight 940 and may be moved by the rotation of the weight 940 caused by gravity. According to an embodiment, when the weight 940 is rotated about the pin 950 by gravity, a linear motion of the stopper 930 may be caused.

According to an embodiment, when viewed from a direction 9004 from one end 9901 of the actuator 990 to the other end 9902, the stopper 930 may be a plate of a shape that is fitted into a hole 94132 (for example, the second hole 4132 of FIG. 5A) of a bezel 94006 (for example, the bezel 4006 of FIG. 5A). For example, the stopper 930 may be a circular plate having an edge formed along the entirety of a circular inner surface (for example, an inner circumference surface) of the hole 94132, although it is not illustrated.

According to an embodiment, the stopper 930 may be a plate having an edge 9311, 9321 formed along a portion of the inner circumference surface of the hole 94132 as shown in the drawing. The stopper 930 may include a first extension portion 931 and a second extension portion 932 which extend in both directions.

Figure 9A:
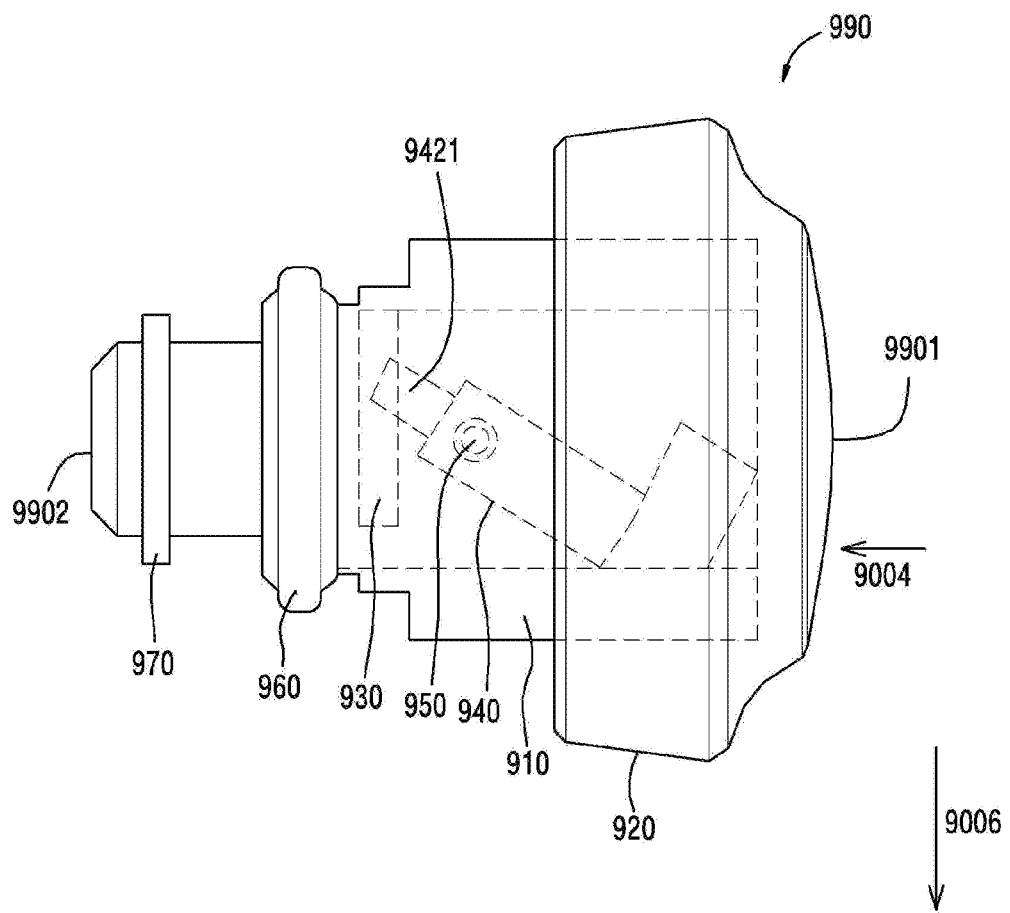
FIG. 9A, FIG. 9B, FIG. 9C and FIG. 9D are views to illustrate an actuator and a mechanical actuation thereof according to another embodiment of the present disclosure.
Figure 9B:
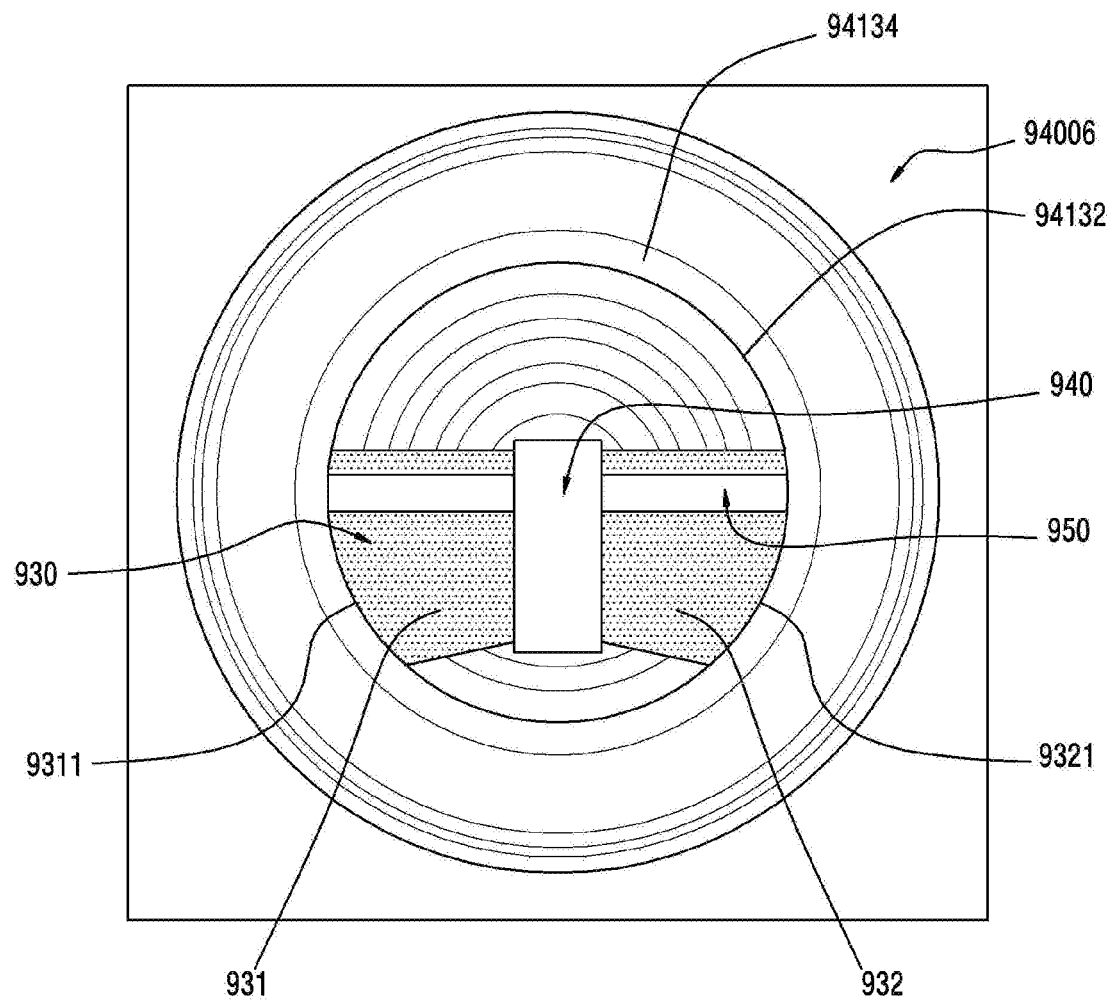

Referring to FIGS. 9A and 9B, when the electronic device (for example, the electronic device 400 of FIG. 4A) having the actuator 990 installed therein is worn on a user's wrist, and the screen (for example, the screen 800 of FIG. 8) is positioned to face in a direction substantially opposite to the gravity direction 9006, the stopper 930 may be moved to a position where the stopper 930 can pass through the hole 94132 by the rotation of the weight 940 caused by gravity. Accordingly, the actuator 990 may be in the state in which it is movable in the direction 9004 by an external force (for example, a user's operating force).

Figure 9C:
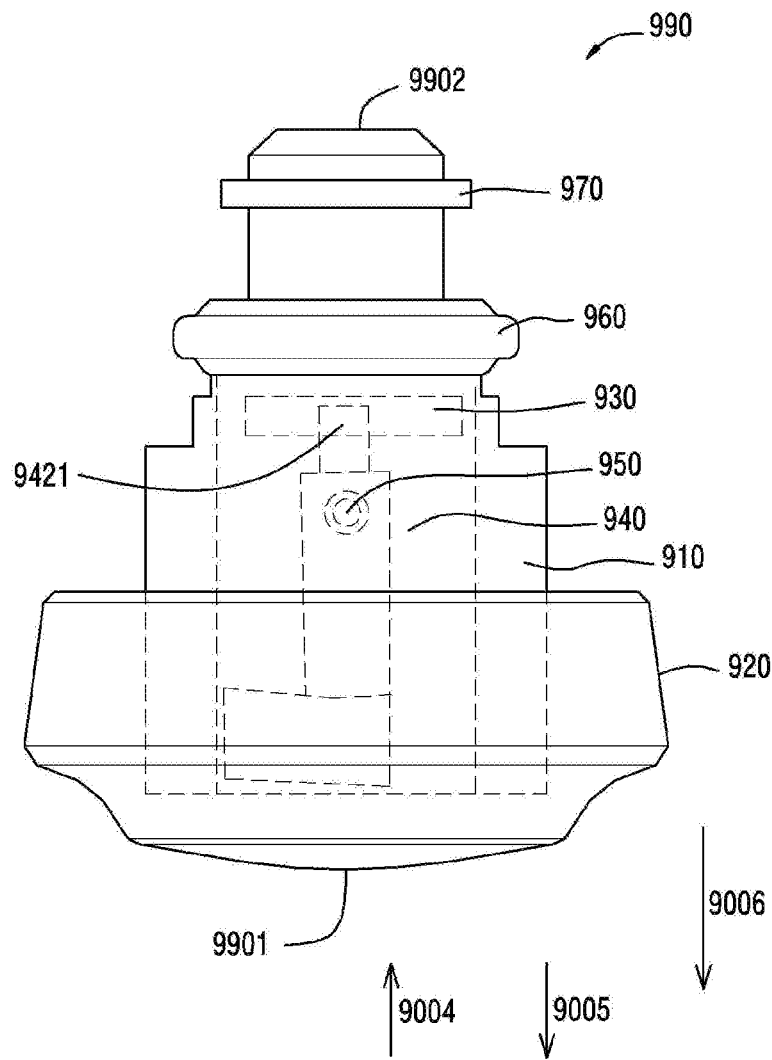
Figure 9D:
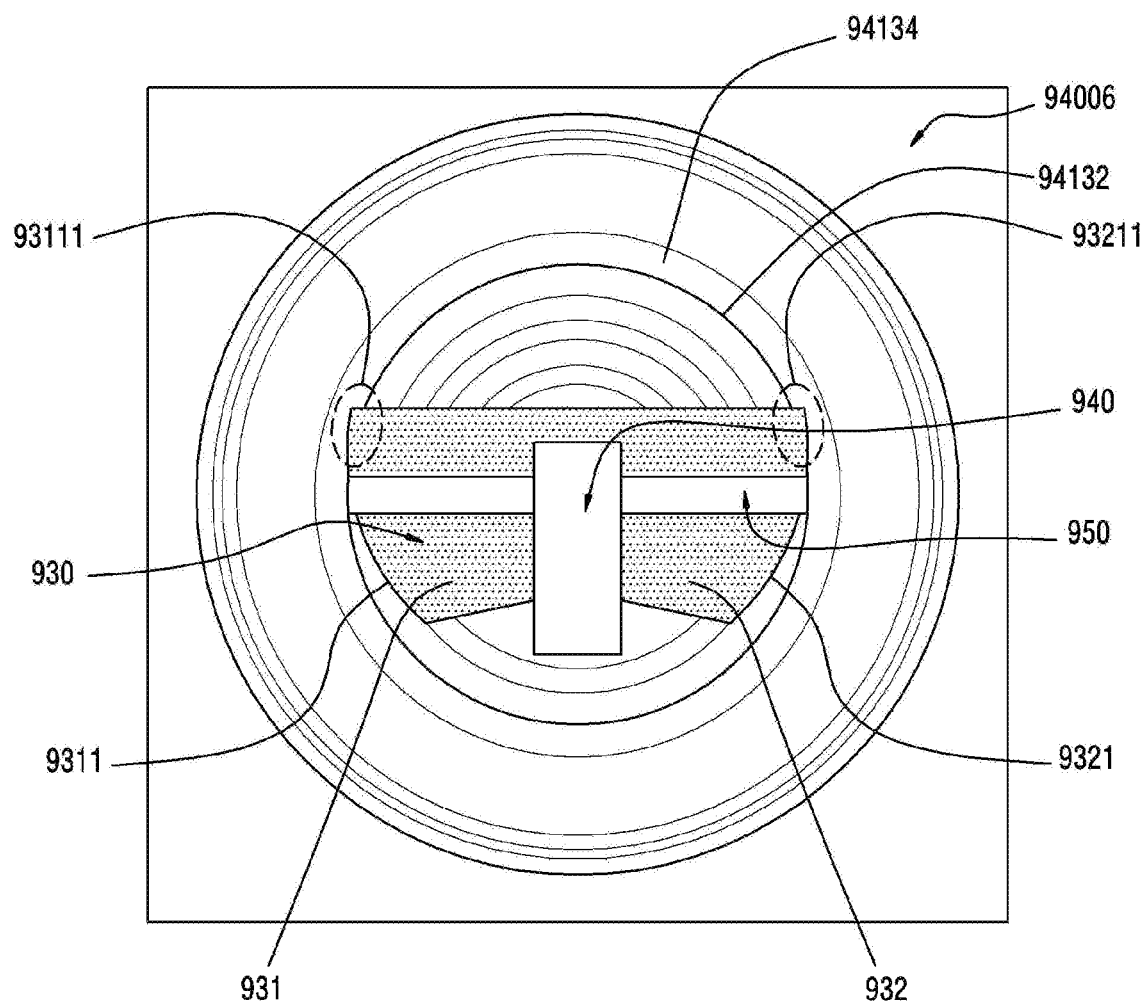

Referring to FIGS. 9C and 9D, when the electronic device (for example, the electronic device 400 of FIG. 4A) is dropped with the direction 9005 from the other end 9902 of the actuator 990 to one end 9901 being substantially parallel to the gravity direction 9006 or forming an acute angle, a portion 93111, 93211 of the edge of the stopper 930 may protrude out of the shaft 910 through a hole (not shown) of the shaft 910 by the rotation of the weight 940 caused by gravity. When viewed from the direction 9004 from one end 9901 of the actuator 990 to the other end 9902, the portion 93111, 93211 of the stopper 930 protruding out of the shaft 910 may cover a stepped surface 94134 (for example, the first stepped surface 4134 of FIG. 5A). Accordingly, the stopper 930 cannot be moved in the inward direction of the electronic device 400.

Figure 10:
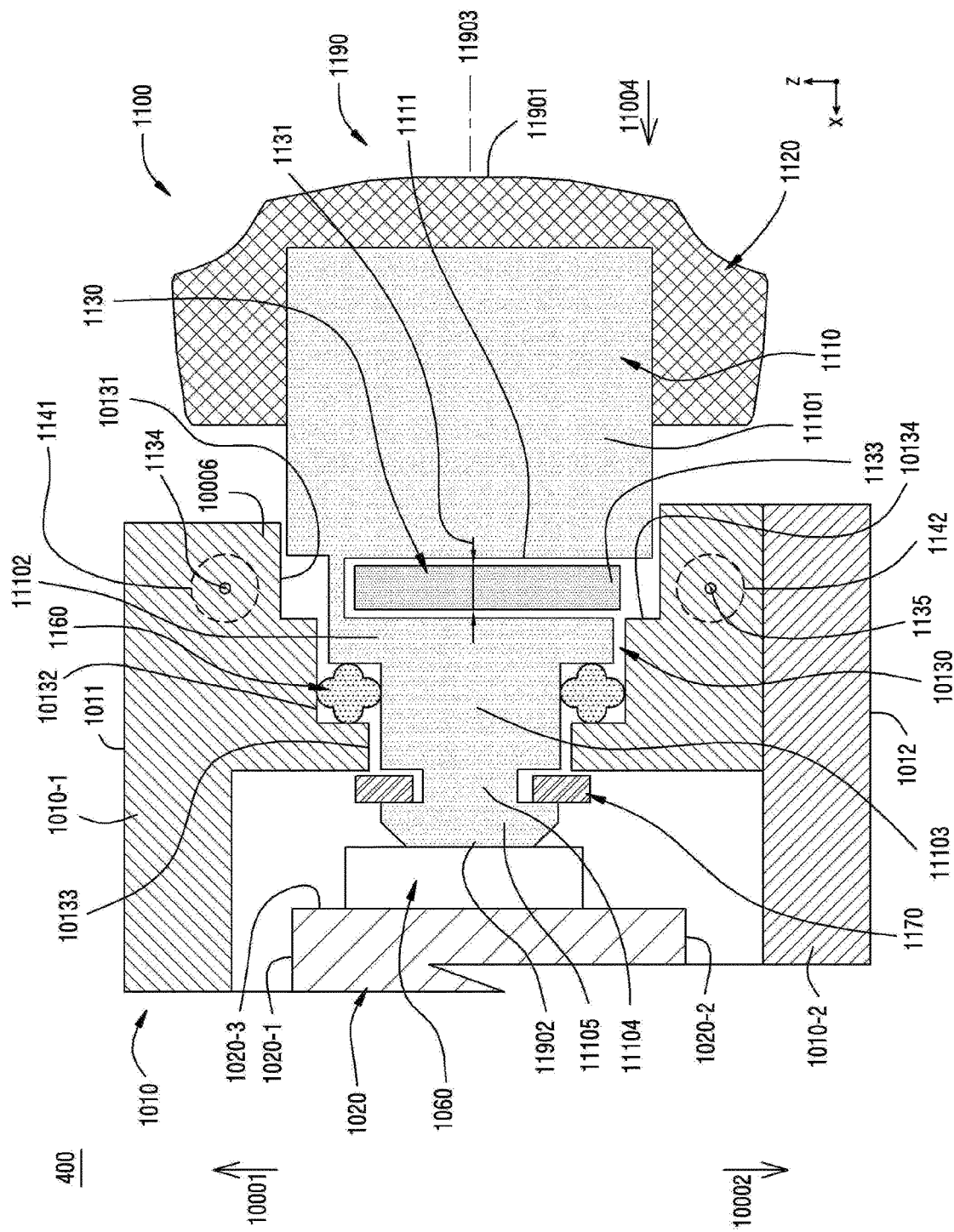
FIG. 10 is a cross section view to illustrate the elements of the electronic device of FIG. 4A having the input apparatus installed therein and providing the shock prevention function according to a further embodiment of the present disclosure.
Figure 11:
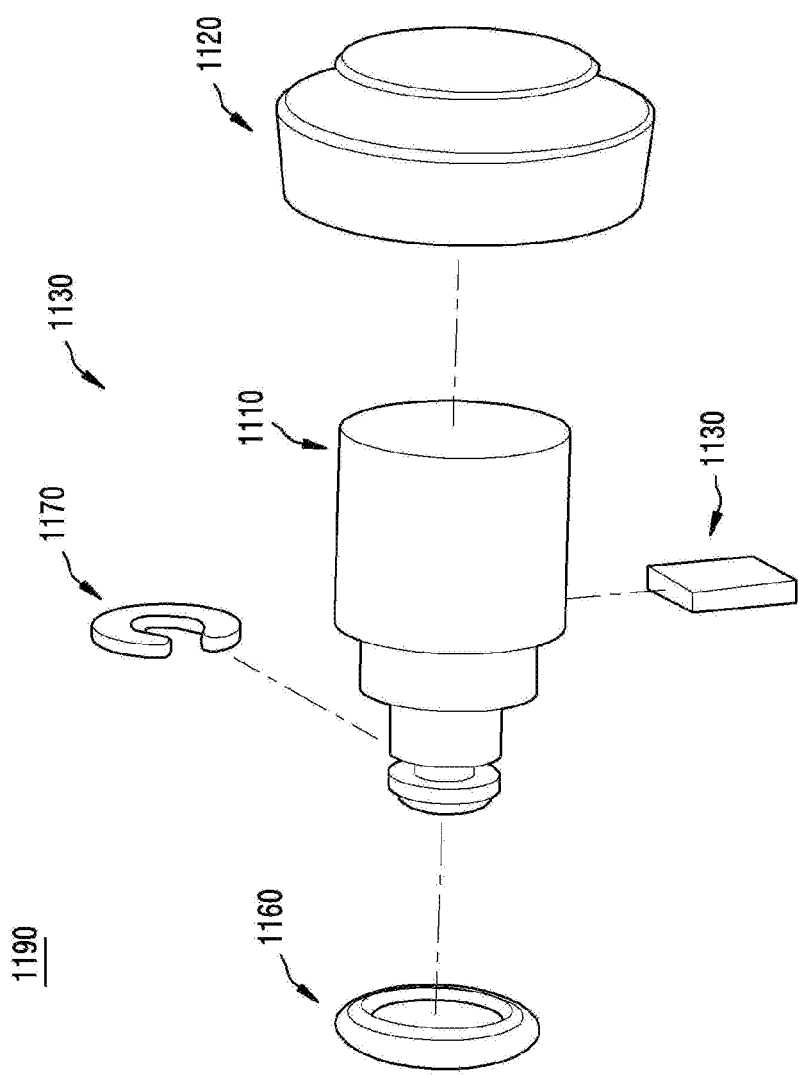
FIG. 11 is a view to illustrate an actuator of an input apparatus according to another embodiment of the present disclosure.
Figure 12:
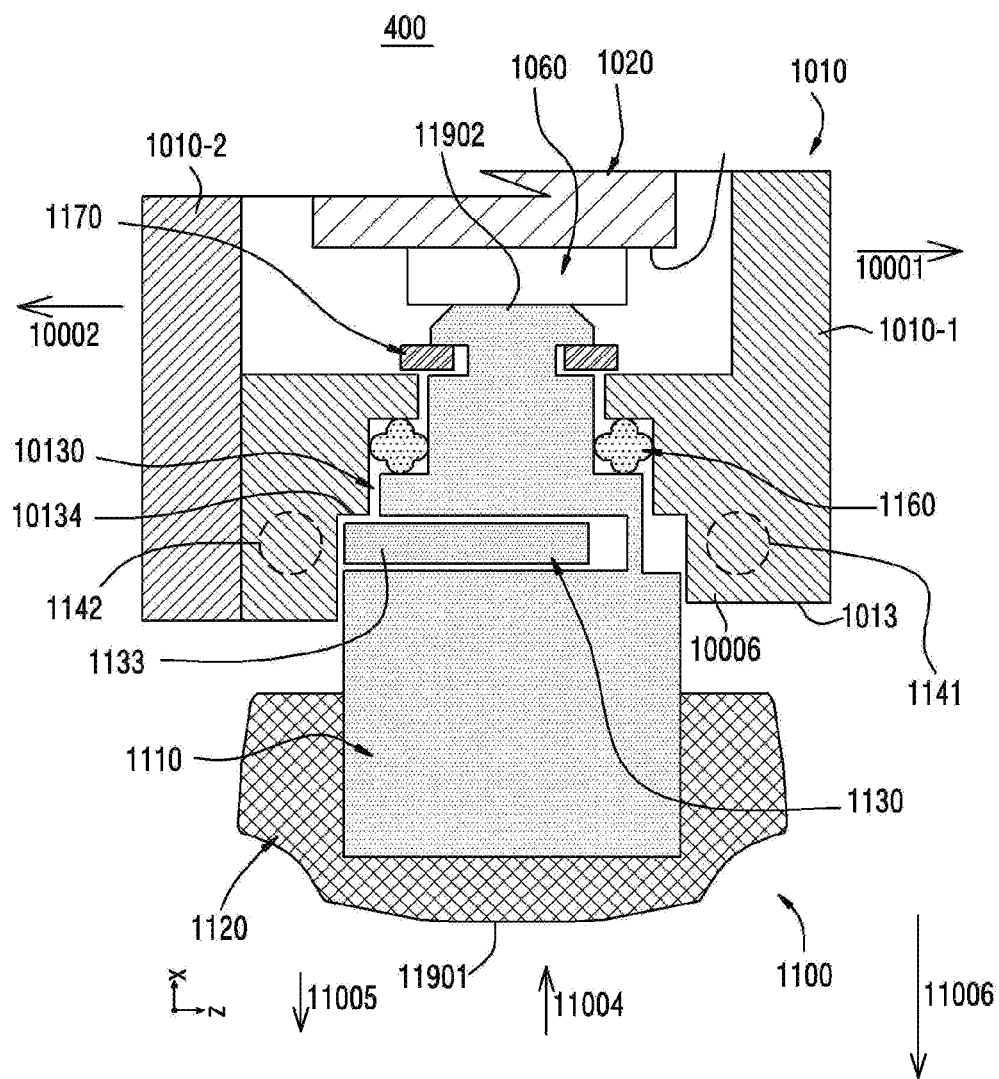
FIG. 12 is a view to illustrate a mechanical actuation of an input apparatus according to an embodiment of the present disclosure.

FIG. 10 is a cross section view to illustrate the elements of the electronic device of FIG. 4A having the input apparatus installed therein and providing the shock prevention function according to an embodiment of the present disclosure. FIG. 11 is a view to illustrate an actuator of an input apparatus according to an embodiment of the present disclosure. FIG. 12 is a view to illustrate a mechanical actuation of an input apparatus according to an embodiment of the present disclosure;

Referring to FIG. 10, the electronic device 400 may include a housing 1010, a support member 1020, and an input apparatus 1100.

The housing 1010 may include a first housing 1010-1 and a second housing 1010-2. The housing 1010 may provide an annular bezel 10006 enclosing a space between a first surface 1011 and a second surface 1012. According to various embodiments, the housing 1010 may be similar to or the same as the housing 410 of FIG. 5A at least in part, and a detailed description thereof is omitted.

The support member 1020 may include a first installation surface 1020-1 having a display (for example, the display 430 of FIG. 4B) installed thereon, a second installation surface 1020-2 having a PCB (for example, the PCB 440 of FIG. 4B) installed thereon, and a third installation surface 1020-3 enclosing a space between the first installation surface 1020-1 and the second installation surface 1020-2. According to various embodiments, the support member 1020 may be similar to or the same as the support member 420 of FIG. 5A at least in part, and thus a detailed description thereof is omitted.

The input apparatus 1100 may include an actuator 1190, a hole 10130 of the bezel 10006, and at least one electronic component 1060. The actuator 1090 may be coupled to the hole 10130 of the bezel 10006, and may be moved in a direction 11004 (hereinafter, a "fourth direction") from one end 11901 of the actuator 1190 to the other end 11902 by an external force. The at least one electronic component 1060 (for example, a push button switch) may generate an electric signal in response to the actuator 1190 being moved in the fourth direction 11004. According to various embodiments, the actuator 1190 may be rotated about a central line 11903 of a shaft 1110 in the clockwise direction or counter clockwise direction. The at least one electronic component 1060 (for example, a rotary switch) may be generate an electric signal in response to the actuator 1190 being rotated. According to various embodiments, the at least one electronic component 1060 may be various types of sensors generating an electric signal in response to the actuator 1190 being moved or rotated. According to various embodiments, the at least one electronic component 1060 may be designed or configured to be similar to or the same as the at least one electronic component 460 of FIG. 5A at least in part.

The actuator 1190 may be coupled to the hole 10130 of the bezel 10006. The actuator 1090 may straightly extend substantially in a direction from one end 11901 (1120) to the other end 11902. When the actuator 1190 is coupled to the hole 10130 of the bezel 10006, one end 11901 (for example, a key top 1120) of the actuator 1190 may be exposed to the outside and the other end 11902 of the actuator 1190 may be disposed inside the electronic device 400.

Referring to FIGS. 10 and 11, according to an embodiment, the actuator 1190 may include the shaft 1110 straightly extending in the fourth direction 11004. When an external force in the fourth direction 11004 is applied to one end 11901 of the actuator 1190, the shaft 1110 may slide in the hole 10130 of the bezel 10006 and the actuator 1190 may be linearly moved in the fourth direction 11004.

According to various embodiments, the shaft 1110 may be a shaft of a circular cross section having an outer diameter. When viewed from the fourth direction 11004, the hole 10130 of the bezel 10006 may be a circular hole which enables the shaft 1110 to linearly move or rotate.

According to an embodiment, when viewed from a cross section, the shaft 1110 may be formed to substantially become narrower in the fourth direction 11004 along the central line 11903. For example, the shaft 1110 may include a first shaft 11101, a second shaft 11102, a third shaft 11103, a fourth shaft 11104, and a fifth shaft 11105 which are arranged in the fourth direction 11004. An outer diameter of the first shaft 11101 may be larger than an outer diameter of the second shaft 11102. The outer diameter of the second shaft 11102 may be larger than an outer diameter of the third shaft 11103. The outer diameter of the third shaft 11103 may be larger than an outer diameter of the fourth shaft 11104. The outer diameter of the fourth shaft 11104 may be smaller than an outer diameter of the fifth shaft 11105.

According to an embodiment, the actuator 1190 may include the key top 1120 installed or disposed at one end 11901 thereof. The key top 1120 may be coupled to the first shaft 11101 and may be used as a portion to which an external force for a mechanical actuation of the input apparatus 1100 is applied. According to various embodiments, the key top 1120 may be substantially similar to or the same as the key top 520 of FIG. 5A.

According to an embodiment, the shaft 1110 may include a space 1111 which is dug in a first direction 10001. The actuator 1190 may include a stopper 1130 coupled to the space 1111 of the shaft 1110. The stopper 1130 may be moved in a second direction 10002 by a force generated in at least one transfer apparatus installed in the electronic apparatus 1100.

According to an embodiment, when viewed from a cross section, the stopper 1130 may be a plate having a substantially uniform thickness 1131. When viewed from the cross section, the space 1111 of the shaft 1110 may have a width substantially identical to the thickness 1131 of the stopper 1130 or larger than the thickness 1131 by a designed tolerance. The stopper 1130 may slide on the inner surface of the space 1111.

According to an embodiment, the stopper 1130 may be moved in the second direction 10002 by the at least one transfer apparatus, and one end 1133 of the stopper 1130 may protrude out of the shaft 1110. The stopper 1130 may return to the inside of the space 1111 of the shaft 1110 by the at least one transfer apparatus, and one end 1133 of the stopper 1130 may not protrude out of the shaft 1110.

According to an embodiment, the at least one transfer apparatus may be at least one electromagnet installed in the proximity of the shaft 1110. For example, one electromagnet 1141 (hereinafter, a "first electromagnet") may be disposed at a first position 1134, and another electromagnet 1142 (hereinafter, a "second electromagnet") may be disposed at a second position 1135. The first position 1134 may be spaced from the shaft 1110 in the first direction 10001. The second position 1135 may be spaced from the shaft 1110 in the second direction 10002. According to various embodiments, a virtual straight line connecting the first position 1134 and the second position 1135 may correspond to a linear moving path of the stopper 1130.

According to an embodiment, the first electromagnet 1141 or the second electromagnet 1142 may be coupled to the housing 1010. For example, the first electromagnet 1141 or the second electromagnet 1142 may be disposed on one surface of the housing 1010 or inside the housing 1010.

Although not shown, the at least one transfer apparatus (for example, the first electromagnet 1141, the second electromagnet 1142) may be electrically connected to the electronic device 400. According to an embodiment, the at least one transfer apparatus may be electrically connected to a control circuit (not shown) (for example, the processor 120 of FIG. 1 or the processor 210 of FIG. 2) of the electronic device 400. The control circuit may control the at least one transfer apparatus and the stopper 1130 may be moved by the at least one transfer apparatus.

According to an embodiment, the control circuit (for example, the processor 120 of FIG. 1 or the processor 210 of FIG. 2) may selectively activate the first electromagnet 1141 or the second electromagnet 1142. When the second electromagnet 1142 is activated and the first electromagnet 1141 is inactivated, the stopper 1130 including metal may be moved in the second direction 10002 by the force of attraction of the activated second electromagnet 1142, and one end of the stopper 1130 may protrude out of the shaft 1110. When the first electromagnet 1141 is activated and the second electromagnet 1142 is inactivated, the stopper 1130 may return to the inside of the space 1111 by the force of attraction of the first electromagnet 1141 and one end of the stopper 1130 may not protrude out of the shaft 1110.

According to another embodiment, the transfer apparatus may include an electromagnet (not shown) which is able to change polarity under the control of the control circuit, and the stopper 1130 may be designed to include a magnet. The polarity of the electromagnet may be changed under control of the control circuit, and the stopper 1130 may be moved in the second direction 10002 or may be moved in the first direction 10001 and return to the inside of the space 1111 by the force of attraction or repulsion of the electromagnet. According to various embodiments, the electromagnet may be installed at at least one of the first position 1134 and the second position 1135.

According to an embodiment, when viewed from a cross section, the hole 10130 of the bezel 10006 may include a first hole 10131 for the first shaft 11101, a second hole 10132 for the second shaft 11102, and a third hole 10133 for the third shaft 11103.

According to an embodiment, when one end 1133 of the stopper 1130 protrudes out of the shaft 1110, one end 1133 of the stopper 1130 may cover a stepped surface 10134 (for example, the first stepped surface 4134 of FIG. 5A) connecting the first hole 10131 and the second hole 10132 when viewed from the fourth direction 11004. When one end 1133 of the stopper 1130 protrudes out of the shaft 1110, the stepped surface 10134 may hinder the stopper 1130 from being moved in the fourth direction 11004. Therefore, even when an external force is applied to the actuator 1190 in the fourth direction 11004, the actuator 1190 cannot be moved in the fourth direction 11004.

According to various embodiments, the electronic device 400 may include at least one sensor (not shown) (for example, the sensor module 240 of FIG. 2) functionally coupled to the electronic device 400. The control circuit (for example, the processor 120 of FIG. 1 or the processor 210 of FIG. 2) may acquire information on a motion or a posture of the electronic device 400 using the at least one sensor (for example, a gravity sensor, an acceleration sensor, a gyro sensor, a six-axis sensor, or the like). The electronic device 400 may determine the posture of the electronic device 400 based on the information acquired from the at least one sensor. For example, the information on the posture of the electronic device 400 may include an angle of the electronic device 400 which is rotated with respect to space axes, x, y, z-axes. The control circuit may determine whether the electronic device 400 is dropped based on the information acquired from the at least one sensor. For example, based on the information acquired from the at least one sensor, the control circuit may determine whether the electronic device 400 is in a dropping state, that is falling by moving in the gravity direction with a gravitational acceleration.

According to an embodiment, when it is determined that the electronic device 400 is in the dropping state, the control circuit may control at least one transfer apparatus (for example, the first electromagnet 1141 and the second electromagnet 1142) such that the stopper 1130 is moved in the second direction 10002. When one end 1133 of the stopper 1130 protrudes out of the shaft 1110 due to the movement of the stopper 1130 and even an external shock or load going beyond a design criterion is applied to the actuator 190 due to the dropping of the electronic device 400, the actuator 1190 may be prevented from being moved in the fourth direction 11004 by the stopper 1130, and thus a damage to the electronic component 1006 can be prevented or inhibited.

Referring to FIG. 12, when the electronic device 400 is dropped with a direction 11005 (hereinafter, a "fifth direction") from the other end 11902 of the actuator 1190 to one end 11901 being substantially parallel to the gravity direction 11006 (see FIG. 8A), the control circuit may control the transfer apparatus (for example, the first electromagnet 1141 and the second electromagnet 1142) such that the stopper 1130 is moved in the second direction 10002. When the stopper 1130 is moved in the second direction 10002, one end 1133 of the stopper 1130 may protrude out of the shaft 1110. When viewed from the fourth direction 11004, one end 1133 of the stopper 1130 which protrudes may cover the stepped surface 10134. When one end 1133 of the stopper 1130 protrudes out of the shaft 1110, the stepped surface 10134 may hinder the stopper 1130 from being moved in the fourth direction 1004, and accordingly, even when an external force is applied to the actuator 1190, the actuator 1190 cannot be moved in the fourth direction 11004. According to various embodiments, when the electronic device 400 is dropped in the fifth direction 11005 and forms an acute angle with the gravity direction 11006, the control circuit may control the transfer apparatus (for example, the first electromagnet 1141 and the second electromagnet 1142) such that the stopper 1130 is moved in the second direction 10002.

According to an embodiment, when it is determined that the electronic device 400 is not in the dropping state, the control circuit may control the transfer apparatus (for example, the first electromagnet 1141 and the second electromagnet 1142) such that the stopper 1130 is moved in the first direction 10001 (for example, see FIG. 10). For example, when the electronic device 400 is worn on a user's wrist, the control circuit may control the transfer apparatus such that the stopper 1130 is moved in the first direction 10001.

According to various embodiments, according to whether the electronic device 400 is in the proximity of the user or whether the electronic device 400 is worn on the user, the control circuit may control the transfer apparatus (for example, electromagnets 1141, 1142). For example, when the electronic device 400 is worn on the user's wrist, the control circuit may control the transfer apparatus such that the stopper 1130 is moved in the first direction 10001.

According to an embodiment, the control circuit may determine whether the electronic device 400 is in the proximity of the user or whether the electronic device 400 is worn on the user or carried by the user based on information acquired from at least one sensor (for example, a grip sensor, a proximity sensor, a heart rate sensor, a temperature sensor, or the like) (not shown) functionally coupled to the electronic device 400. For example, when sensor data on a user's heart rate is acquired from the heart rate sensor, the control circuit may determine that the electronic device 400 is in a wearing state or a carrying state.

The actuator 1190 may include a release prevention element 1170 for preventing the shaft 1110 from being released to the outside. According to various embodiments, the release prevention element 1170 may be similar to or the same as the release prevention element 1170 of FIG. 5A at least in part, and a detailed description thereof is omitted.

The actuator 1190 may include a sealing member 1160 for preventing or inhibiting a foreign substance (for example, water, dust, or the like) from entering through a gap between the shaft 1110 and the hole 10130 of the bezel 10006. According to various embodiments, the sealing member 1160 may be similar to or the same as the sealing member 1160 of FIG. 5A at least in part, and a detailed description thereof is omitted.

Figure 13:
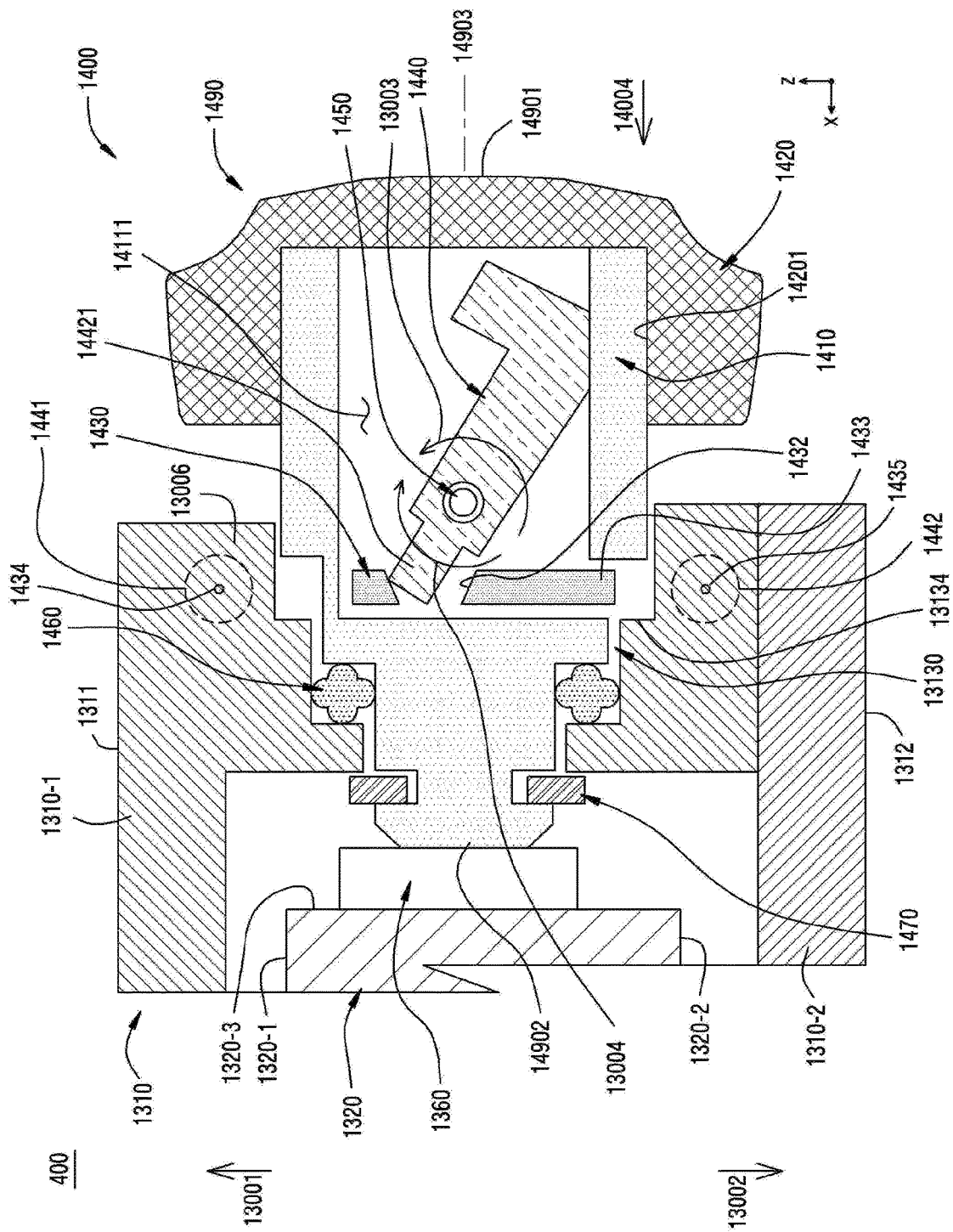
FIG. 13 is a cross section view to illustrate the elements of the electronic device of FIG. 4A having the input apparatus installed therein and providing the shock prevention function according to an embodiment of the present disclosure.
Figure 14:
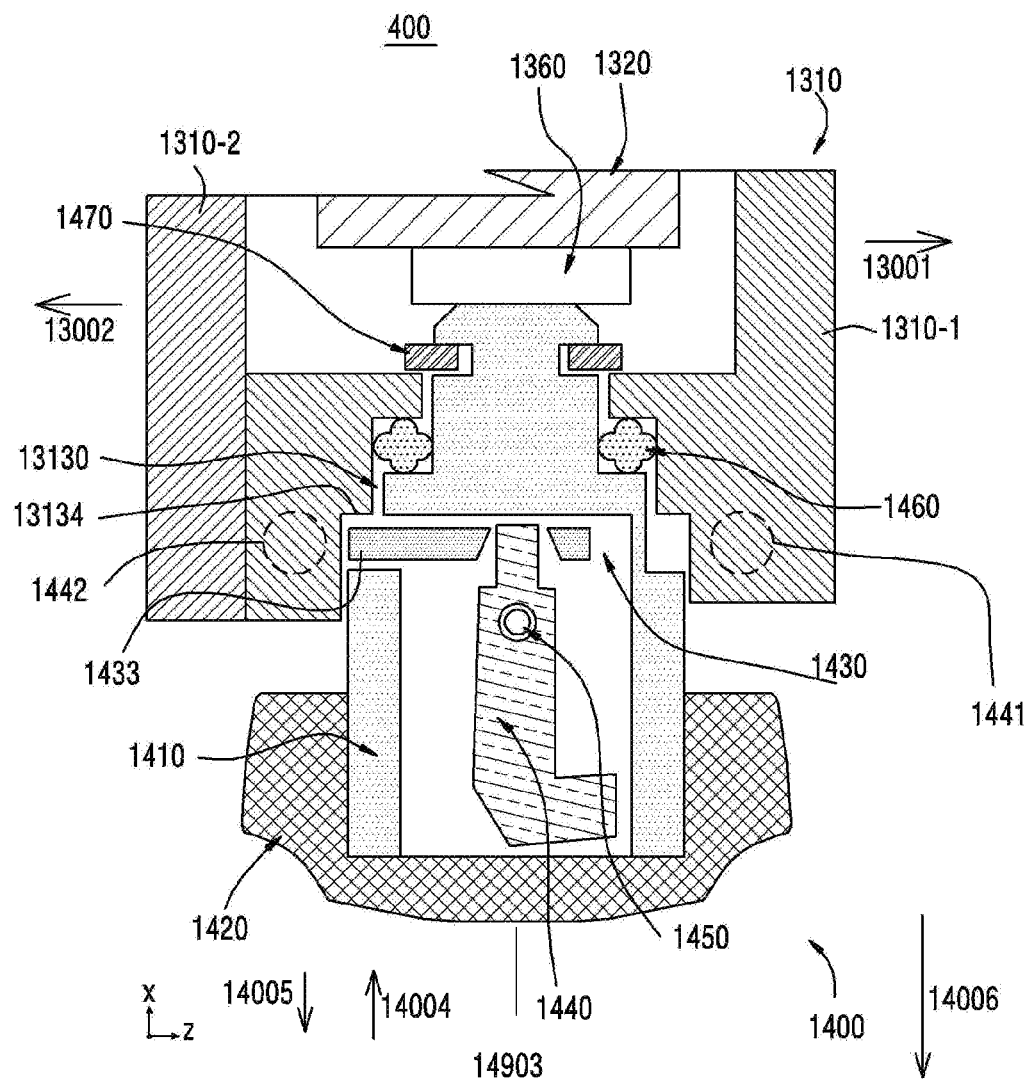
FIG. 14 is a view to illustrate a mechanical actuation of an input apparatus according to an embodiment of the present disclosure.

FIG. 13 is a cross section view to illustrate the elements of the electronic device of FIG. 4A having the input apparatus installed therein and providing the shock prevention function according to an embodiment of the present disclosure. FIG. 14 is a view to illustrate a mechanical actuation of an input apparatus according to an embodiment of the present disclosure.

Referring to FIGS. 13 and 14, the electronic device 400 may include a housing 1310, a support member 1320, and an input apparatus 1400.

According to various embodiments, the housing 1310 may be similar to or the same as the housing 410 of FIG. 5A at least in part, and a detailed description thereof is omitted. For example, a first housing 1310-1 and a second housing 1310-2 of the housing 1310 may be similar to or the same as the first housing 410-1 and the second housing 410-2 of the housing 410 of FIG. 5A, respectively. A first surface 1311, a second surface 1312, and a bezel 13006 of the housing 1310 may be similar to or the same as the first surface 411, the second surface 412, and the bezel 4006 of the housing 410 of FIG. 5A, respectively.

According to various embodiments, the support member 1320 may be similar to or the same as the support member 420 of FIG. 5A at least in part, and a detailed description thereof is omitted. For example, a first installation surface 1320-1, a second installation surface 1320-2, and a third installation surface 1320-3 of the support member 1320 may be similar to or the same as the first installation surface 420-1, the second installation surface 420-2, and the third installation surface 420-3 of the support member 420 of FIG. 5A, respectively.

The input apparatus 1400 may include an actuator 1490, a hole 13130 of the bezel 13006, and at least one electronic component 1360. According to various embodiments, the actuator 1490 may be similar to or the same as the actuator 490 of FIG. 5A at least in part, and a detailed description thereof is omitted. For example, a shaft 1410, a key top 1420, a stopper 1430, a weight 1440, a pin 1450, a sealing member 1460, and a release prevention element 1470 of the actuator 1490 may be similar to or the same as the shaft 510, the key top 520, the stopper 530, the weight 540, the pin 550, the sealing member 560, and the release prevention element 570 of the actuator 590 of FIG. 5A, respectively. According to various embodiments, the hole 13130 of the bezel 13006 may be similar to or the same as the hole 4130 of the bezel 4006 of FIG. 5A at least in part, and a detailed description thereof is omitted. According to various embodiments, the at least one electronic component 1460 may be similar to or the same as the at least one electronic component 460 of FIG. 5A at least in part, and a detailed description thereof is omitted.

According to an embodiment, the actuator 1490 may be coupled to the hole 13130 of the bezel 13006 and may be moved in a direction 14004 (hereinafter, a "fourth direction") from one end 14901 of the actuator 1490 to the other end 14902 by an external force. The at least one electronic component 1360 may generate an electric signal in response to the actuator 1490 being moved in the fourth direction 14004. According to various embodiments, the actuator 1490 may be rotated about a central line 14903 of the shaft 1410 in the clockwise direction or counter clockwise direction. The at least one electronic component 1360 may generate an electric signal in response to the actuator 1490 being rotated.

The electronic device 400 may include at least one transfer apparatus installed in the proximity of the shaft 1410. The stopper 1430 may be moved in a second direction 13002 by the at least one transfer apparatus, and one end 1433 of the stopper 1430 may protrude out of the shaft 1410. The stopper 1430 may return to the inside of a space 14111 of the shaft 1410 by the at least one transfer apparatus, and one end 1433 of the stopper 1430 may not protrude out of the shaft 1410.

According to an embodiment, the at least one transfer apparatus may be at least one electromagnet. For example, the at least one electromagnet 1441 (hereinafter, a "first electromagnet") may be disposed at a first position 1434 and at least one other electromagnet 1442 (hereafter, a "second electromagnet") may be disposed at a second position 1435. The first position 1434 may be a position which is spaced from the shaft 1410 in a first direction 13001. The second position 1435 may be a position which is spaced from the shaft 1410 in the second direction 13002. According to various embodiments, a virtual straight line connecting the first position 1434 and the second position 1435 may correspond to a linear moving path of the stopper 1430.

According to an embodiment, the first electromagnet 1441 or the second electromagnet 1442 may be coupled to the housing 1310. For example, the first electromagnet 1441 or the second electromagnet 1442 may be disposed on one surface of the housing 1310 or inside of the housing 1310.

Although not shown, the at least one transfer apparatus (for example, the first electromagnet 1441 and the second electromagnet 1442) may be electrically connected to the electronic device 400. According to an embodiment, the at least one transfer apparatus may be electrically connected to a control circuit (not shown) (for example, the processor 120 of FIG. 1 or the processor 210 of FIG. 2) of the electronic device 400. The control circuit may control the at least one transfer apparatus and the stopper 1130 may be moved by the at least one transfer apparatus. According to an embodiment, the control circuit (for example, the processor 120 of FIG. 1 or the processor 210 of FIG. 2) may selectively activate the first electromagnet 1441 or the second electromagnet 1442.

For example, when the second electromagnet 1442 is activated and the first electromagnet 1441 is inactivated, the stopper 1430 including metal may be moved in the second direction 13002 by the force of attraction of the activated second electromagnet 1442, and one end 1433 of the stopper 1430 may protrude out of the shaft 1410. When the stopper 1430 is moved in the second direction 13002, the weight 1440 having one end 14221 coupled to a hole 1432 of the stopper 1430 may be rotated around the pin 1450 in a counter clockwise direction 13003.

For example, when the first electromagnet 1441 is activated and the second electromagnet 1442 is inactivated, the stopper 1430 may return to the inside of the space 14111 by the force of attraction of the first electromagnet 1441, and one end 1433 of the stopper 1430 may not protrude out of the shaft 1410. When the stopper 1430 returns to the inside of the space 14111, the weight 1440 having one end 14421 coupled to the hole 1432 of the stopper 1430 may be rotated about the pin 1450 in a clockwise direction 13004.

According to various embodiments, the transfer apparatus may include an electromagnet (not shown) which is able to change polarity under the control of the control circuit, and the stopper 1430 may be a magnet. The polarity of the electromagnet may be changed under the control of the control circuit, and the stopper 1430 may be moved in the second direction 13002 or may return to the inside of the space 14111 by the force of attraction or repulsion of the electromagnet. According to various embodiments, the electromagnet may be installed or positioned in at least one of the first position 1434 and the second position 1435.

According to an embodiment, when the at least one transfer apparatus (for example, the first electromagnet 1441, the second electromagnet 1442) is not activated, the stopper 1430 may be moved by the rotation of the weight 1440 caused by gravity since the stopper 1430 is coupled to the weight 1440.

The control circuit (for example, the processor 120 of FIG. 1 or the processor 210 of FIG. 2) may selectively activate the at least one transfer apparatus. According to an embodiment, when the electronic device 400 is in a wearing state or a carrying state, the electronic device 400 may activate the at least one transfer apparatus such that the stopper 1430 is moved in the first direction 13001 and is placed at a specific position. Since the stopper 1430 is not released from the specific position by the activated at least one transfer apparatus in the wearing state or the carrying state of the electronic device 400, the weight 1440 cannot be rotated by gravity even when there is a user's motion (for example, walking, running, or the like).

According to an embodiment, when the electronic device 400 is not in a dropping state, the control circuit may activate the at least one transfer apparatus such that the stopper 1430 is moved in the first direction 13001 and is placed at the specific position. For example, a state in which the electronic device 400 is not in the dropping state may include the wearing state or carrying state of the electronic device 400.

According to an embodiment, when the electronic device 400 is not in the wearing state or the carrying state, the control circuit may inactivate the at least one transfer apparatus. When the at least one transfer apparatus is inactivated, the stopper 1430 may be in a state in which the stopper 1430 is movable by the rotation of the weight 1440 caused by gravity. For example, when the electronic device 400 is in the dropping state, the control circuit may inactivate the at least one transfer apparatus.

Referring to FIG. 14, when the electronic device 400 is dropped with a direction 14005 (hereinafter, a "fifth direction") from the other end 14902 of the actuator 590 to one end 14005 being substantially parallel to the gravity direction 14006 (see FIG. 8A), the stopper 1430 may be moved in the second direction 13002 by the rotation of the weight 1440 caused by gravity. According to various embodiments, when the electronic device 400 is dropped with the fifth direction 14005 forming an acute angle with the gravity direction 14006, the stopper 1430 may be moved in the second direction 13002 by the rotation of the weight 1440 caused by gravity. When the stopper 1430 is moved in the second direction 13002, one end 1433 of the stopper 1430 may protrude out of the shaft 1410. When viewed from the fourth direction 14004, one end 1433 of the stopper 1430 which protrudes may cover a stepped surface 13134. When one end 1433 of the stopper 1430 protrudes out of the shaft 1410, the stepped surface 13134 may hinder the stopper 1430 from being moved in a fourth direction 14004, and accordingly, even when an external force is applied to the actuator 1490, the actuator 1490 cannot be moved in the fourth direction 14004.

Figure 15:
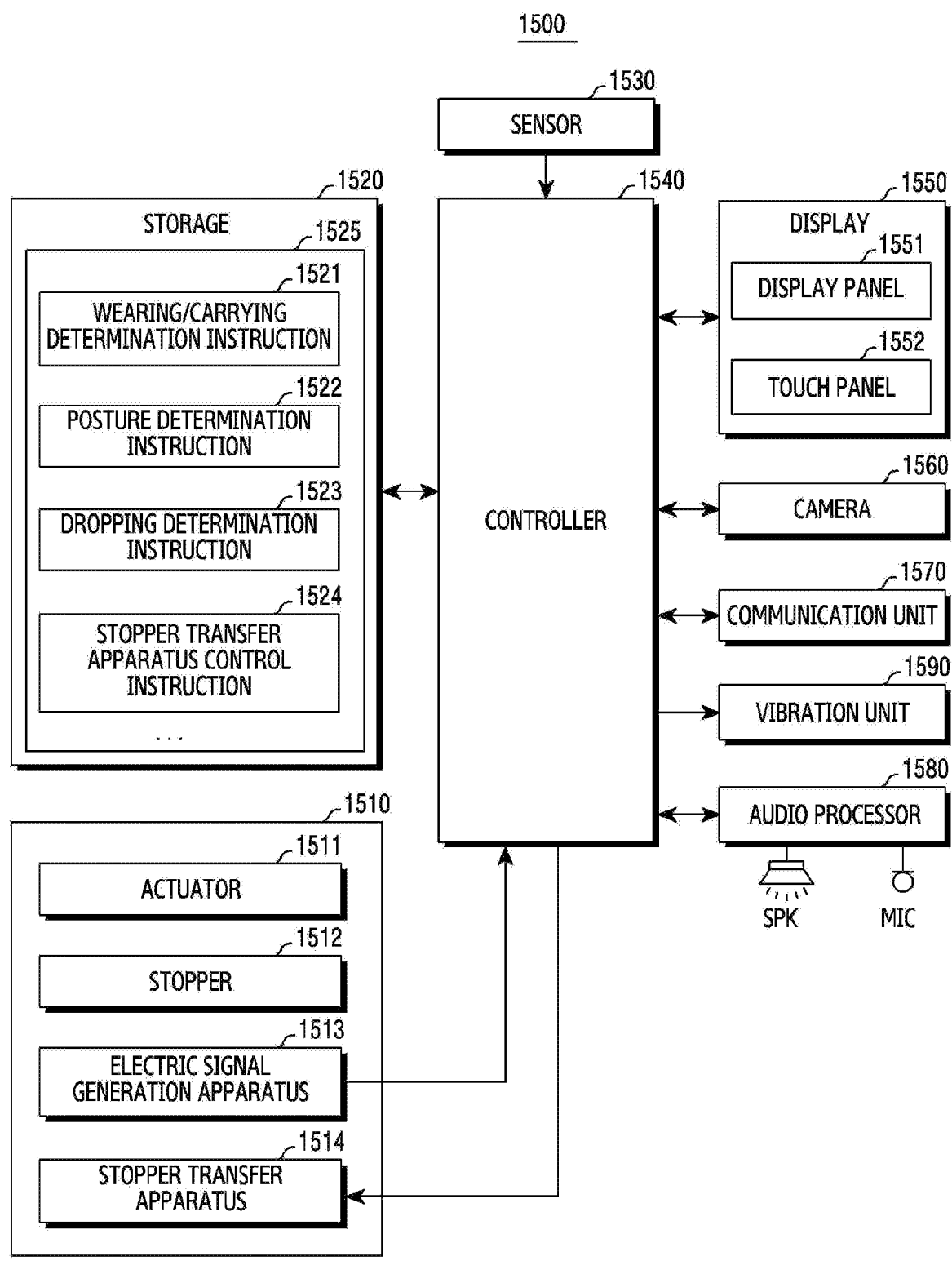
FIG. 15 is a block diagram of an electronic device having an input apparatus installed therein and providing a shock prevention function according to an embodiment of the present disclosure.

FIG. 15 is a block diagram of an electronic device having an input apparatus installed therein and providing a shock prevention function according to an embodiment of the present disclosure. According to various embodiments, the electronic device 1500 may include an entirety or a part of the electronic device 101 of FIG. 1, the electronic device 201 of FIG. 2, or the electronic device 400 of FIG. 4A. According to various embodiments, the electronic device 1500 may be the electronic device 400 of FIG. 10 or the electronic device 400 of FIG. 13.

Referring to FIG. 15, the electronic device 1500 may include an input apparatus 1510, a storage 1520, a sensor 1530, and a controller 1540.

According to an embodiment, the input apparatus 1510 may include an actuator 1511, a stopper 1512, an electric signal generation apparatus 1513, and a stopper transfer apparatus 1514.

The actuator 1511 (or a key button actuator) may be an element which is movable (for example, a translational motion or a rotary motion) on the electronic device 1500 by an external force. According to various embodiments, the actuator 1511 may be the actuator 1190 of FIG. 10 or the actuator 1490 of FIG. 13, and a detailed description thereof is omitted.

The stopper 1512 may be moved to a first position or a second position by the stopper transfer apparatus 1514. According to an embodiment, when the stopper 1512 is moved to the first position, the actuator 1511 may be in a state in which it is movable in the inward direction of the electronic device 1500 by an external force. When the stopper 1512 is moved to the second position, the actuator 1511 may be in a state in which the actuator 1511 has difficulty in moving in the inward direction of the electronic device 1500 due to the stopper 1512 even when an external force is applied to the actuator 1511. According to various embodiments, the stopper 1512 may be the stopper 1130 of FIG. 10 or the stopper 1430 of FIG. 13, and a detailed description thereof is omitted to avoid obsfucating the present disclosure in unnecessary detail.

The electric signal generation apparatus 1513 may be functionally (or operatively) coupled to the actuator 1511, and may generate an electric signal in response to a motion of the actuator 1511 made by an external force. According to various embodiments, the electric signal generation apparatus 1513 may be the at least one electronic component 1060 of FIG. 10 or the at least one electronic component 1360 of FIG. 13, and a detailed description thereof is omitted.

The stopper transfer apparatus 1514 may generate a force for moving the stopper 1512. According to various embodiments, the stopper transfer apparatus 1514 may be the first and second electromagnets 1141, 1142 of FIG. 10 or the first and second electromagnets 1441, 1442 of FIG. 13, and a detailed description thereof is omitted.

According to various embodiments, the stopper transfer apparatus 1514 may move the stopper 1512 using gravity. According to various embodiments, the stopper transfer apparatus 1514 may include the weight 1440 of FIG. 13 and elements functionally coupled thereto, and a detailed description thereof is omitted.

The storage 1520 (for example, the memory 230 of FIG. 2) may store various basic operating systems necessary for operating the electronic device 1500 and data or application programs and an algorithm 1525 corresponding to various user functions. According to an embodiment, the controller 1540 may perform various operations of the electronic device 1500 using instructions, information, or the like included in the storage 1520.

According to an embodiment, the storage 1520 may include a wearing/carrying determination instruction 1521, a posture determination instruction 1522, a dropping determination instruction 1523, and a stopper transfer apparatus control instruction 1524.

The wearing/carrying determination instruction 1521 may include instructions that cause the controller 1540 to determine whether the electronic device 1500 is worn on a user or is carried by the user. According to an embodiment, the wearing/carrying determination instruction 1521 may include an activation routine for selecting and activating at least one element (for example, the sensor 1530, a camera 1560, or the like) which is used to determine whether the electronic device is worn/carried. For example, according to the wearing/carrying determination instruction 1521, the at least one element may be periodically activated. According to various embodiments, the wearing/carrying determination instruction 1521 may include an acquisition routine for collecting information or data from the activated element. According to various embodiments, the wearing/carrying determination instruction 1521 may include a determination routine for determining whether the electronic device 1500 is worn or carried based on the collected information or data.

The posture determination instruction 1522 may include instructions that cause the controller 1540 to determine a posture of the electronic device 1500. According to an embodiment, the posture determination instruction 1522 may include an activation routine for selecting and activating at least one element (for example, the sensor 1530 or the like) which is used to determine the posture. For example, according to the posture determination instruction 1522, the at least one element may be periodically activated. According to various embodiments, the posture determination instruction 1522 may include an acquisition routine for collecting information or data from the activated element. According to various embodiments, the posture determination instruction 1522 may include a determination routine for determining the posture of the electronic device 1500 based on the collected information or data.

For example, the posture determination instruction 1522 may determine the posture of the electronic device 1500 based on information or data from at least one sensor (for example, a gravity sensor, an acceleration sensor, a gyro sensor, a six-axis sensor, or the like) of the sensor 1530. According to an embodiment, the posture of the electronic device 1500 may include an angle of the electronic device 1500 rotated with respect to space which may be defined by Cartesian coordinates including the x, y, z-axes defining 3D-space.

The dropping determination instruction 1523 may include instructions that cause the controller 1540 to determine whether the electronic device 1500 is dropped. According to an embodiment, the dropping determination instruction 1523 may include an activation routine for selecting and activating at least one element (for example, the sensor 1530 or the like) which is used to determine the dropping of the electronic device 1500. For example, according to the dropping determination instruction 1523, the at least one element may be periodically activated. According to various embodiments, the dropping determination instruction 1523 may include an acquisition routine for collecting information or data from the activated element. According to various embodiments, the dropping determination instruction 1523 may include a determination routine for determining whether the electronic device 1500 is dropped based on the collected information or data.

For example, the dropping determination instruction 1523 may determine whether the electronic device 1500 is dropped based on information or data from at least one sensor (for example, a gravity sensor, an acceleration sensor, a gyro sensor, a six-axis sensor) of the sensor 1530. According to an embodiment, the dropping determination instruction 1523 may include instructions that cause the controller 1540 to determine the dropping of the electronic device 1500 when the electronic device 1500 is moved in the gravity direction with a gravitational acceleration. According to various embodiments, the dropping determination instruction 1523 may include instructions that cause the controller 1540 to determine the dropping of the electronic device 1500 when the electronic device 1500 is moved in the gravity direction with a gravitational acceleration for longer than a threshold time.

The stopper transfer apparatus control instruction 1524 may include instructions that cause the controller 1540 to control the stopper transfer apparatus 1514 (for example, the first and second electromagnets 1141, 1142 of FIG. 10 or the first and second electromagnets 1441, 1442 of FIG. 13) according to whether the electronic device 1500 is worn (or carried). The stopper 1512 may be moved by the stopper transfer apparatus 1514 controlled by the controller 1540.

In the example of FIG. 10, according to the stopper transfer apparatus control instruction 1524, when the wearing state or the carrying state of the electronic device 400 (for example, the electronic device 1500 of FIG. 15) is determined, the controller 1540 may activate the first electromagnet 1141 and inactivate the second electromagnet 1142 such that the stopper 1130 (for example, the stopper 1512 of FIG. 15) is moved in the first direction 10001 and placed at the first position. According to the stopper transfer apparatus control instruction 1524, when the wearing state or the carrying state of the electronic device 400 is not determined, the controller 1540 may inactivate the first electromagnet 1141 and activate the second electromagnet 1142 such that the stopper 1130 (for example, the stopper 1512 of FIG. 15) is moved in the second direction 10002 and placed at the second position.

In the example of FIG. 13, according to the stopper transfer apparatus control instruction 1524, when the wearing state or the carrying state of the electronic device 400 (for example, the electronic device 1500 of FIG. 15) is determined, the controller 1540 may activate the first electromagnet 1141 and inactivate the second electromagnet 1142 such that the stopper 1430 (for example, the stopper 1512 of FIG. 15) is moved in the first direction 13001 and placed at the first position. Since the stopper 1430 is not released from the first position by the activated first electromagnet 1441 in the wearing state or carrying state of the electronic device 400, the weight 1440 cannot be rotated by gravity even when there is a user's motion (for example, walking, running, or the like). According to the stopper transfer apparatus control instruction 1524, when the wearing state or the carrying state of the electronic device 400 is not determined, the controller 1540 may inactivate at least one transfer apparatus (for example, the first and second electromagnets 1441, 1442). When the at least one transfer apparatus (for example, the first and second electromagnets 1441, 1442) is inactivated, the stopper 1430 may be in a state in which it is movable by the rotation of the weight 1440 caused by gravity.

The stopper transfer apparatus control instruction 1524 may include instructions that cause the controller 1540 to control the stopper transfer apparatus 1514 (for example, the first and second electromagnets 1141, 1142 of FIG. 10, or at least one transfer apparatus (i.e., the first and second electromagnets 1441, 1442 of FIG. 13) when the electronic device 1500 is dropped in a specific posture. The stopper 1512 may be moved by the stopper transfer apparatus 1514 controlled by the controller 1540.

In the example of FIG. 10, according to the stopper transfer apparatus control instruction 1524, when the electronic device 400 (for example, the electronic device 1500 of FIG. 15) is dropped with the direction 11005 being substantially parallel to the gravity direction or forming an acute angle, the controller 1540 may activate the second electromagnet 1142 and inactivate the first electromagnet 1141 such that the stopper 1130 (for example, the stopper 1512 of FIG. 15) is moved in the second direction 10002 and placed at the second position. According to the stopper transfer apparatus control instruction 1524, when the electronic device 400 is not dropped with the direction 11005 being substantially parallel to the gravity direction or forming an acute angle, the controller 1540 may activate the first electromagnet 1141 and inactivate the second electromagnet 1142 such that the stopper 1130 (for example, the stopper 1512 of FIG. 15) is moved in the first direction 10001 and placed at the first position.

The sensor 1530 may measure a physical quantity or may detect an operation state of the electronic device 1500. The sensor 1530 may convert the measured or detected information into an electric signal, and transmit the electric signal to the controller 1540. According to various embodiments, the sensor 1530 may include an entirety or a part of the sensor module 240 of FIG. 2.

According to an embodiment, the sensor 1530 may acquire information or data which is used to determine whether the user is in the proximity of the electronic device 1500. For example, the sensor 1530 may acquire information or data regarding the wearing state or carrying state of the electronic device 1500. According to various embodiments, the sensor 1530 may acquire information or data regarding the posture of the electronic device 1500. According to various embodiments, the sensor 1530 may acquire information or data regarding a motion of the electronic device 1500.

According to various embodiments, the electronic device 1500 may further include a display 1550. The display 1550 may be designed to provide various screen interfaces necessary for operating the electronic device 1500. According to an embodiment, the display 1550 may include a touch screen having a display panel 1551 (for example, the display 260 of FIG. 2) and a touch panel 1552 (for example, the touch panel 252 of FIG. 2) overlapping each other. According to an embodiment, the display panel 1551 may display, for example, various screens such as an image, a text, or the like based on the instruction 1525. For example, the touch panel 1552 may be designed to receive various touch inputs on the screen displayed through the display panel 1551 based on the instruction 1525.

According to various embodiments, the storage 1520 may include instructions that cause the controller 1540 to control the display 1550 according to a signal generated by the electric signal generation apparatus 1513 of the input apparatus 1510.

According to various embodiments, the electronic device 1500 may further include the camera 1560. The camera 1560 may be designed to activate a camera function in various modes under the control of the controller 1540. According to an embodiment, the camera 1560 may be used based on the wearing/carrying determination instruction 1521 or the posture determination instruction 1522. For example, the controller 1540 may activate the camera 1560 (for example, an image sensor) and may capture image data on an object from the camera 1560. The controller 1540 may determine whether the electronic device 1500 is worn/carried or the posture of the electronic device 1500 based on the image data captured by the camera 1560.

According to various embodiments, the storage 1520 may include instructions that cause the controller 1540 to control the camera 1560 according to a signal generated by the electric signal generation apparatus 1513 of the input apparatus 1510. For example, the controller 1540 may enter a camera mode according to a signal generated by the electric signal generation apparatus 1513 of the input apparatus 1510 and may activate the camera 1560.

According to various embodiments, the electronic device 1500 may further include a communication unit 1570 (for example, the communication module 220 of FIG. 2). The communication unit 1570 may be designed to support a communication function of the electronic device 1500. The communication unit 1570 may be provided in the form of a mobile communication module to support the communication function (for example, a mobile communication function) of the electronic device 1500. The communication unit 1570 may support signal transmission and reception for performing the mobile communication function of the electronic device 1500 by forming a communication channel with a mobile communication system. For example, the communication unit 1570 may form at least one of a voice service channel, a video service channel or a data service channel with the mobile communication system, and may support transmission and reception of a specific signal according to a corresponding service channel.

According to various embodiments, the storage 1520 may include instructions that cause the controller 1540 to control the communication unit 1570 according to a signal generated by the electric signal generation apparatus 1513 of the input apparatus 1510. For example, the controller 1540 may enter a communication mode (for example, a call) using at least a portion of the communication unit 1570 according to a signal generated by the electric signal generation apparatus 1513 of the input apparatus 1510.

According to various embodiments, the electronic device 1500 may further include an audio processor 1580, a vibration unit 1590, or the like. The audio processor 1580 (for example, the audio module 280 of FIG. 2) may output various audio data regarding the operation of the electronic device 1500, audio data received from the outside, or the like through a speaker (SPK). According to various embodiments, the audio processor 1580 may include an audio decoder (not shown) and a D/A converter (not shown). The audio decoder may convert audio data stored in the storage 1520 into a digital audio signal. The D/A converter may convert the digital audio signal converted by the audio decoder into an analogue audio signal. The audio processor 1580 may receive a voice through a microphone (MIC). For example, the audio processor 1580 may include an A/D converter (not shown). The A/D converter may convert an analogue voice signal transmitted through the microphone (MIC) into a digital voice signal. According to various embodiments, the storage 1520 may include instructions that cause the controller 1540 to control the audio processor 1580 according to a signal generated by the electric signal generation apparatus 1513 of the input apparatus 1510.

The vibration unit 1590 may include at least one vibrator (not shown) disposed at at least one position of the electronic device 1500. The vibration unit 1590 may activate the vibrator in various vibration patterns based on various types of trigger generated from the electronic device 1500 under the control of the controller 1540. According to an embodiment, the storage 1520 may include instructions that cause the controller 1540 to control the vibration unit 1590 according to a signal generated by the electric signal generation apparatus 1513 of the input apparatus 1510.

According to various embodiments, the electronic device 1500 may further include various modules according to a providing form thereof. For example, the electronic device 1500 may further include elements which have not been mentioned in the above description, such as a short range communication module for short range communication, an interface for transmitting and receiving data in a wire communication method or a wireless communication method of the electronic device 1500, an Internet communication module for performing an Internet function by communicating with an Internet network, a digital broadcasting module for performing functions of receiving and reproducing a digital broadcast, or the like. Forms of these elements may be changed in various ways according to the trend of convergence of digital devices and, although all of the elements are not mentioned, elements having the same level as the above-mentioned elements may further be included in the device. According to various embodiments, in the electronic device 1500, specific elements from among the above-described elements may be excluded or may be substituted with other elements according to a providing form of the electronic device. This will be easily understood by a person skilled in the art.

Figure 16:
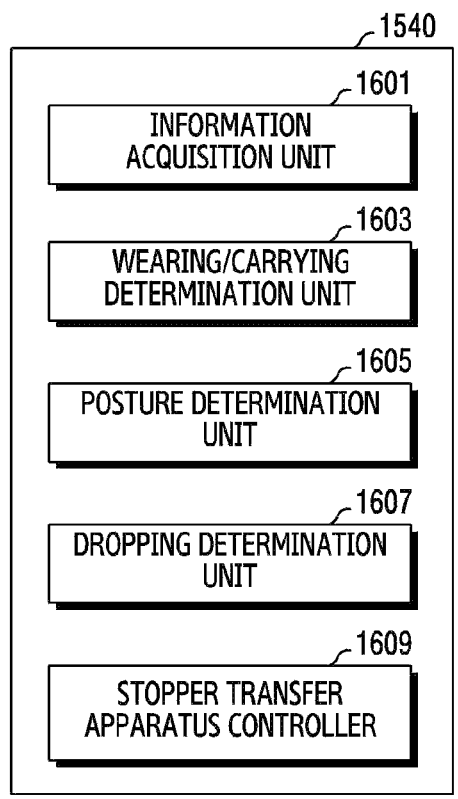
FIG. 16 is a view illustrating a controller in detail according to an embodiment of the present disclosure.

FIG. 16 is a view showing the controller 1540 in detail according to an embodiment of the present disclosure.

Referring to FIG. 16, the controller 1540 according to an embodiment may include an information acquisition unit 1601, a wearing/carrying determination unit 1602, a posture determination unit 1605, a dropping determination unit 1607, and/or a stopper transfer apparatus controller 1609.

The information acquisition unit 1601 may acquire (collect) information or data on wearing or carrying of the electronic device 1500 (FIG. 15) using various elements in a wearing/carrying determination mode according to the wearing/carrying determination instructions 1521 of the storage 1520. The information acquisition unit 1601 may acquire information or data on the posture of the electronic device 1500 (FIG. 15) using various elements in a posture determination mode according to the posture determination instruction 1522 of the storage 1520. The information acquisition unit 1601 may acquire information or data on the dropping of the electronic device 1500 (FIG. 15) using various elements in a dropping determination mode according to the dropping determination instruction 1523 of the storage 1520.

The wearing/carrying determination unit 1603 may receive information or data from the information acquisition unit 1601. The wearing/carrying determination unit 1603 may determine whether the electronic device 1500 is worn or carried based on information or data from the information acquisition unit 1601 according to the wearing/carrying determination instruction 1521 of the storage 1520.

The posture determination unit 1605 may receive information or data from the information acquisition unit 1601. The posture determination unit 1605 may determine the posture of the electronic device 1500 based on information or data from the information acquisition unit 1601 according to the posture determination instruction 1522 of the storage 1520. The dropping determination unit 1607 may receive information or data from the information acquisition unit 1601. The dropping determination unit 1607 may determine whether the electronic device 1500 is dropped based on information or data from the information acquisition unit 1601 according to the dropping determination instruction 1523 of the storage 1520.

The stopper transfer apparatus controller 1609 may control the stopper transfer apparatus 1514 (FIG. 5) according to the stopper transfer apparatus control instruction 1524 of the storage 1520. According to an embodiment, the stopper transfer apparatus controller 1609 may control the stopper transfer apparatus 1514 according to whether the electronic device 1500 is worn/carried, which is determined by the wearing/carrying determination unit 1603. According to an embodiment, the stopper transfer apparatus controller 1609 may control the stopper transfer apparatus 1514 according to the posture of the electronic device 1500 which is determined by the posture determination unit 1605, and/or whether the electronic device 1500 is dropped, which is determined by the dropping determination unit 1607.

Figure 17:
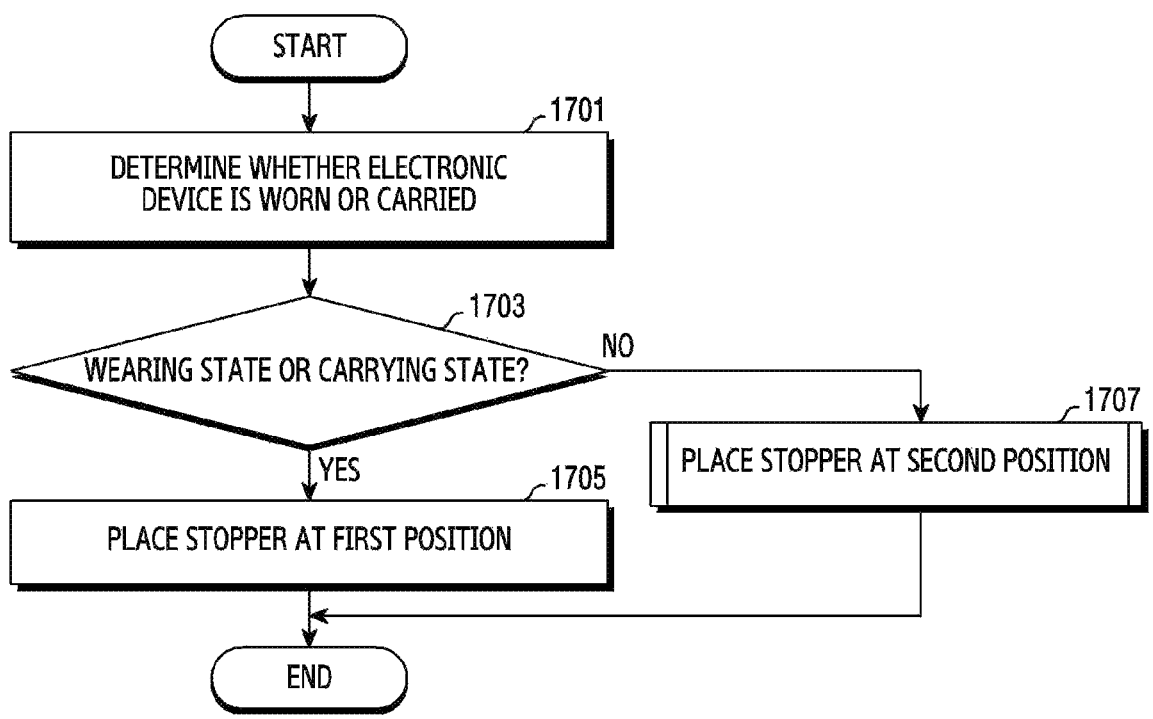
FIG. 17 is a flowchart showing an operation flow of the electronic device of FIG. 10 having the input apparatus installed therein and providing the shock prevention function according to an embodiment of the present disclosure.

FIG. 17 illustrates an operation flow of the electronic device 400 of FIG. 10 having the input apparatus installed therein and providing the shock prevention function according to an embodiment of the present disclosure. According to various embodiments, the electronic device 400 may be the electronic device 1500 of FIG. 15.

Referring to FIG. 17, in operation 1701, the controller (for example, the controller 1540 of FIG. 15) may determine whether the electronic device 1500 is worn or carried. According to an embodiment, the controller 1540 may determine whether the electronic device 1500 is worn or carried using at least one sensor (for example, the sensor 493 of FIG. 4C) (for example, a heart rate sensor).

In operation 1703, when the wearing state or carrying state of the electronic device 1500 is determined, the controller 1540 may perform operation 1705. In operation 1705, the controller 1540 may control the stopper transfer apparatus 1514 such that the stopper 1512 (for example, the stopper 1130 of FIG. 10) is placed at the first position. Referring to FIG. 10, when the stopper 1130 is placed at the first position, one end 1133 of the stopper 1130 may not protrude out of the shaft 1110. When one end 1133 of the stopper 1130 does not protrude out of the shaft 1110, the actuator 1190 may be in a state in which the actuator 1190 is movable toward the electronic component 1060 by an external force (for example, a user's operating force). According to an embodiment, to place the stopper 1130 at the first position, the controller 1540 may activate the first electromagnet 1141 and inactivate the second electromagnet 1142.

In operation 1703, when the wearing state or carrying state of the electronic device 1500 is not determined, the controller 1540 may perform operation 1707. In operation 1707, the controller 1540 may control the stopper transfer apparatus 1514 such that the stopper 1512 (for example, the stopper 1130 of FIG. 10) is placed at the second position. Referring to FIG. 10, when the stopper 1130 is placed at the second position, one end 1133 of the stopper 1130 may protrude out of the shaft 1110. When one end 1133 of the stopper 1130 protrudes out of the shaft 1110, the actuator 1190 may be prevented from being moved toward the electronic component 1060 even when an external force is applied to the actuator 1190. According to an embodiment, to place the stopper 1130 at the second position, the controller 1540 may activate the second electromagnet 1142 and inactivate the first electromagnet 1141.

Figure 18:
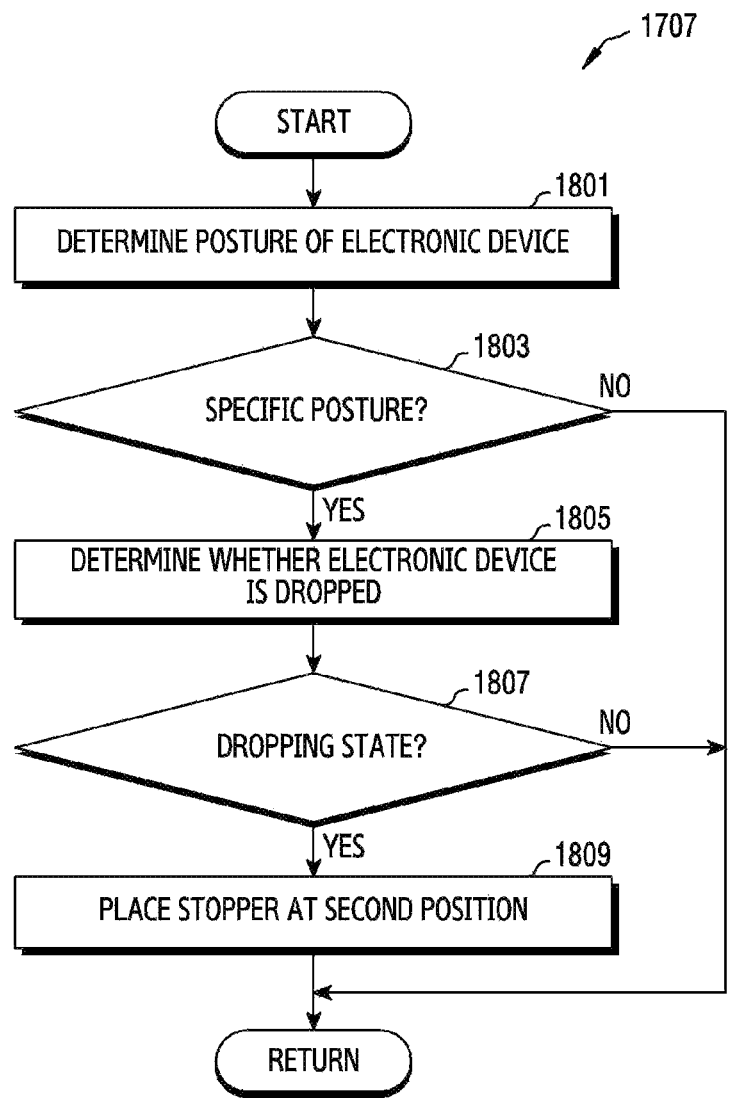
FIG. 18 is a flowchart showing an operation flow regarding disposal of a stopper in a second position in the operation method of FIG. 17 according to an embodiment of the present disclosure.

FIG. 18 illustrates an operation flow regarding disposal of the stopper at the second position in the operation method of FIG. 17 according to an embodiment of the present disclosure.

Referring to FIG. 18, in operation 1801, the controller 1540 (FIG. 15) may determine a posture of the electronic device 1500 (FIG. 15). According to an embodiment, the controller 1540 may acquire information or data from at least one sensor (for example, a gravity sensor, an acceleration sensor, a gyro sensor, a six-axis sensor, or the like), and may determine the posture of the electronic device 1500 based on the information or data. For example, the information on the posture of the electronic device 1500 may include an angle of the electronic device 1500 which is rotated with respect to 3D-space defined by the Cartesian coordinate system including the x, y, z-axes defining the 3D-space.

In operation 1803, the controller 1540 may determine whether the posture of the electronic device 1500 is a specific posture. When the posture of the electronic device 1500 is the specific posture, the controller 1540 may perform operation 1805, and, when the posture of the electronic device 1500 is not the specific posture, may resume operation 1801.

According to an embodiment, the specific posture may include a posture in which the direction 11005 from the other end 11902 of the actuator 1190 to one end 11901 is substantially parallel to the gravity direction or forms an acute angle.

In operation 1805, the controller 1540 may determine whether the electronic device 1500 is dropped. According to an embodiment, the controller 1540 may acquire information or data from at least one sensor (for example, a gravity sensor, an acceleration sensor, a gyro sensor, a six-axis sensor, or the like), and determine whether the electronic device 1500 is dropped based on the information or data. For example, when the electronic device 1500 moves in the gravity direction with a gravitational acceleration for longer than a threshold time, the controller 1540 may determine the dropping of the electronic device 1500.

In operation 1807, when the dropping state of the electronic device 1500 is determined, the controller 1540 may perform operation 1809, and, when the dropping state of the electronic device 1500 is not determined, may resume operation 1801. In operation 1809, the controller 1540 may control the stopper transfer apparatus 1514 (FIG. 15) such that the stopper 1512 (for example, the stopper 1130 of FIG. 10) is placed at the second position.

Figure 19:
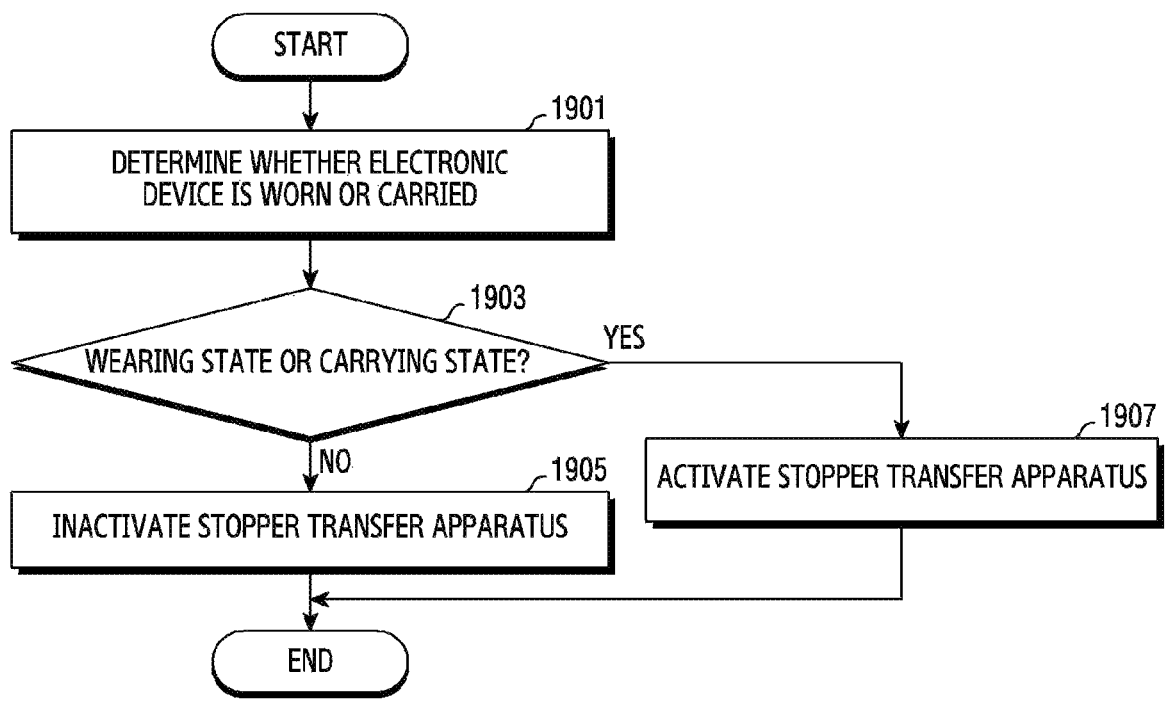
FIG. 19 is a flowchart showing an operation flow of the electronic device 13 having the input apparatus installed therein and providing the shock prevention function according to an embodiment of the present disclosure.

FIG. 19 illustrates an operation flow of the electronic device 400 of FIG. 13 having the input apparatus installed therein and providing the shock prevention function according to an embodiment of the present disclosure. According to various embodiments, the electronic device 400 may be the electronic device 1500 of FIG. 15.

Referring to FIG. 19, in operation 1901, the controller (for example, the controller 1540 of FIG. 15) may determine whether the electronic device 1500 is worn or carried. According to an embodiment, the controller 1540 may determine whether the electronic device 1500 is worn or carried using at least one sensor (for example, the sensor 493 of FIG. 4C) (for example, a heart rate sensor).

In operation 1903, when the wearing state or carrying state of the electronic device 1500 is determined, the controller 1540 may perform operation 1907. In operation 1907, the controller 1540 may activate the stopper transfer apparatus 1514. In response to the stopper transfer apparatus 1514 being activated, the stopper 1512 (for example, the stopper 1430 of FIG. 13) may be placed at the first position. Referring to FIG. 13, when the stopper 1430 is placed at the first position, one end 1433 of the stopper 1430 may not protrude out of the shaft 1410. When one end 1433 of the stopper 1430 does not protrude out of the shaft 1410, the actuator 1490 may be in a state in which it is movable toward the electronic component 1360 by an external force (for example, a user's operating force). According to an embodiment, to place the stopper 1430 at the first position, the controller 1540 may activate the first electromagnet 1441 and inactivate the second electromagnet 1442. For example, referring to FIG. 13, in the wearing state or carrying state of the electronic device 400, the stopper 1430 may not be released from the first position by the force of attraction of the activated first electromagnet 1441, and thus the weight 1440 may not be rotated by gravity even when there is a user's motion (for example, walking, running, or the like).

In operation 1903, when the wearing state or carrying state of the electronic device 1500 is not determined, the controller 1540 may perform operation 1905. In operation 1905, the controller 1540 may inactivate the stopper transfer apparatus 1514. Referring to FIG. 13, when at least one transfer apparatus (for example, the first electromagnet 1441, the second electromagnet 1442) is not activated, the stopper 1430 may be moved by the rotation of the weight 1440 caused by gravity since the stopper 1430 is connected to the weight 1440. For example, when the electronic device 400 is dropped with the direction 14005 from the other end 14902 of the actuator 1490 to one end 14901 being substantially parallel to the gravity direction or forming an acute angle, the stopper 1430 may be moved to the second position by the rotation of the weight 1440 caused by gravity. When the stopper 1430 is moved to the second position, the actuator 1490 may not be moved in the inward direction 14004 of the electronic device 400 by the stopper 1430 moved to the second position even when a shock or load is applied to the actuator 1490 due to the dropping of the electronic device 400.

According to an embodiment of the present disclosure, an electronic device may include: a housing with an internal space and a hole comprising an opening through the housing; an actuator extending in a direction from a first end to a second end, and coupled to the hole to be movable in the direction, the first end exposed to the outside of the housing and the second end disposed to the internal space; at least one electronic component disposed the internal space, the electronic component generating an electric signal when the actuator is moved in the direction in response to application of an external force applied at the first end; and a stopper being configured to regulate a movement of the actuator in the direction in a specific state of the electronic device.

According to an embodiment of the present disclosure, the specific state includes when the electronic device is in the specific posture, the stopper is moved to a position for regulating the movement of the actuator in the direction.

According to an embodiment of the present disclosure, the specific posture of the electronic device comprises a posture where the direction is substantially parallel to a gravity direction or a direction opposite to the direction makes an acute angle with the gravity direction.

According to an embodiment of the present disclosure, the stopper is moved to the position by a gravitation force when the electronic device is in the specific state.

According to an embodiment of the present disclosure, the electronic device may include a weight which is rotatable about a shaft rotatably coupled to the stopper. The stopper is coupled to one end of the weight and is linearly moved to the position in response to rotation of the weight by the gravitation force.

According to an embodiment of the present disclosure, the actuator includes a space formed therein, the weight and the stopper being disposed in the space. When the stopper is linearly moved to the position, an end of the stopper protrudes out of the actuator.

According to an embodiment of the present disclosure, when the electronic device is dropped, the stopper is moved to a position for regulating the movement of the actuator in the direction.

According to an embodiment of the present disclosure, the hole of the housing includes an inner surface facing in a direction opposite to the direction. In the specific state of the electronic device, the stopper is moved to the position where the stopper prevents the actuator from being moved in the direction. A portion of the moved stopper overlaps the inner surface of the hole to prevent the actuator from being moved.

According to an embodiment of the present disclosure, the electronic device may include at least one electromagnet; and a processor electrically coupled to the at least one electromagnet and the at least one electronic component. In the specific state of the electronic device, the processor is configured to control the at least one electromagnet, and the stopper is moved to a position for regulating the movement of the actuator in the direction by a force of attraction or repulsion of the at least one electromagnet.

According to an embodiment of the present disclosure, the electronic device may include at least one sensor electrically coupled to the processor. The processor is configured to determine the specific state of the electronic device based on information acquired from the at least one sensor.

According to an embodiment of the present disclosure, the electronic device may include a weight which is rotatable about the shaft rotatably coupled to the stopper; at least one electromagnet; and a processor electrically coupled to the least one electromagnet and the at least one electronic component. When the electronic device is not in a wearing state or a carrying state and is dropped, the processor is configured to inactivate the at least one electromagnet and the stopper is moved to the position where the stopper prevents the actuator from being moved in the direction by rotation of the weight, the rotation of the weight being caused by gravity. When the electronic device is in the wearing state or the carrying state, the processor is configured to activate the at least one electromagnet, and the stopper is moved to the position allowing movement of the actuator in the direction, the stopper being moved by a force of attraction or repulsion of the activated at least one electromagnet.

According to an embodiment of the present disclosure, the housing may comprise a bezel enclosing a space between a first surface facing in a first direction and a second surface facing in a second direction opposite to the first direction. The hole is formed in the bezel. The electronic device further comprises a display which is received in the housing and exposed through the first surface.

According to an embodiment of the present disclosure, the electronic device may include a sealing member which is disposed between the hole and the actuator.

According to an embodiment of the present disclosure, the at least one electronic component is a push button switch.

According to an embodiment of the present disclosure, the actuator is formed as a shaft and is rotatable about a central line extending along a length of the shaft in response to an external force. The at least one electronic component is configured to generate an electric signal in response to the actuator being rotated.

According to an embodiment of the present disclosure, the electronic device comprises a watch which is wearable on a user's wrist.

According to an embodiment of the present disclosure, an operation method of an electronic device, the operation method may include: determining a posture of the electronic device; when the posture of the electronic device is a specific posture, determining whether the electronic device is dropped or not; and when it is determined that the electronic device is dropped, regulating a movement of an actuator of an input apparatus installed in the electronic device.

According to an embodiment of the present disclosure, when the electronic device is moved in a gravity direction with a gravitational acceleration for longer than a threshold time, it is determined whether the electronic device is dropped.

According to an embodiment of the present disclosure, the operation method of the electronic device may further include: determining whether the electronic device is worn or carried; and when it is determined that the electronic device is worn or carried, placing the actuator in a state in which the actuator is movable by an external force.

According to an embodiment of the present disclosure, the operation method of the electronic device may further include: when it is not determined that the electronic device is worn or carried, determining a posture of the electronic device; when the posture of the electronic device is a specific posture, determining whether the electronic device is dropped; and when it is determined that the electronic device is dropped, regulating the movement of the actuator of the input apparatus installed in the electronic device.

The above-described embodiments of the present disclosure may be prepared by a program which can be executed in a computer, and may be implemented in a generic digital computer which operates the program using a computer readable recording medium. In addition, the structure of the data used in the above-described embodiments of the present disclosure may be recorded on a computer readable recording medium through various means. The computer readable recording medium may include a storage medium such as a magnetic storage medium (for example, a read only memory (ROM), a floppy disk, a hard disk, or the like) and an optical reading medium (for example, a CD-ROM, a DVD, or the like).

The various exemplary embodiments disclosed in the present specification and drawings are merely specific embodiments to easily explain the technical features and assist easy understanding, and are not intended to limit the scope of the present disclosure. Therefore, the scope of the present disclosure is defined not by the detailed description of the disclosure but by the appended claims, and all differences within the scope should be construed as being included in the present disclosure.

What is claimed is:

1. An electronic device comprising:
a housing with an internal space and a hole comprising an opening through the housing;
an actuator extending in a direction from a first end to a second end, and coupled to the hole to be movable in the direction, the first end exposed to the outside of the housing and the second end disposed to the internal space;
at least one electronic component disposed the internal space, the electronic component generating an electric signal when the actuator is moved in the direction in response to application of an external force applied at the first end; and
a stopper being configured to regulate a movement of the actuator in the direction in a specific state of the electronic device.

2. The electronic device of claim 1, wherein the specific state includes when the electronic device is in the specific posture, the stopper is moved to a position for regulating the movement of the actuator in the direction.

3. The electronic device of claim 2, wherein the specific posture of the electronic device comprising a posture where the direction is substantially parallel to a gravity direction or a direction opposite to the direction makes an acute angle with the gravity direction.

4. The electronic device of claim 1, wherein the stopper is moved to the position by a gravitation force when the electronic device is in the specific state.

5. The electronic device of claim 4, further comprising a weight which is rotatable about a shaft rotatably coupled to the stopper,
wherein the stopper is coupled to one end of the weight and is linearly moved to the position in response to rotation of the weight by the gravitation force.

6. The electronic device of claim 5, wherein the actuator includes a space formed therein, the weight and the stopper being disposed in the space, and
wherein, when the stopper is linearly moved to the position, an end of the stopper protrudes out of the actuator.

7. The electronic device of claim 1, wherein, when the electronic device is dropped, the stopper is moved to a position for regulating the movement of the actuator in the direction.

8. The electronic device of claim 1, wherein the hole of the housing includes an inner surface facing in a direction opposite to the direction,
wherein, in the specific state of the electronic device, the stopper is moved to the position where the stopper prevents the actuator from being moved in the direction, wherein a portion of the moved stopper overlaps the inner surface of the hole to prevent the actuator from being moved.

9. The electronic device of claim 1, further comprising:
at least one electromagnet; and
a processor electrically coupled to the at least one electromagnet and the at least one electronic component,
wherein, in the specific state of the electronic device, the processor is configured to control the at least one electromagnet, and the stopper is moved to a position for regulating the movement of the actuator in the direction by a force of attraction or repulsion of the at least one electromagnet.

10. The electronic device of claim 9, further comprising at least one sensor electrically coupled to the processor, and
wherein the processor is configured to determine the specific state of the electronic device based on information acquired from the at least one sensor.

11. The electronic device of claim 1, further comprising:
a weight which is rotatable about the shaft rotatably coupled to the stopper;
at least one electromagnet; and
a processor electrically coupled to the least one electromagnet and the at least one electronic component,
wherein, when the electronic device is not in a wearing state or a carrying state and is dropped, the processor is configured to inactivate the at least one electromagnet and the stopper is moved to the position where the stopper prevents the actuator from being moved in the direction by rotation of the weight, the rotation of the weight being caused by gravity, and
wherein, when the electronic device is in the wearing state or the carrying state, the processor is configured to activate the at least one electromagnet, and the stopper is moved to the position allowing movement of the actuator in the direction, the stopper being moved by a force of attraction or repulsion of the activated at least one electromagnet.

12. The electronic device of claim 1, wherein the housing comprises a bezel enclosing a space between a first surface facing in a first direction and a second surface facing in a second direction opposite to the first direction,
wherein the hole is formed in the bezel, and
wherein the electronic device further comprises a display which is received in the housing and exposed through the first surface.

13. The electronic device of claim 12, further comprising a sealing member which is disposed between the hole and the actuator.

14. The electronic device of claim 1, wherein the at least one electronic component is a push button switch.

15. The electronic device of claim 1, wherein the actuator is formed as a shaft and is rotatable about a central line extending along a length of the shaft in response to an external force, and
wherein the at least one electronic component is configured to generate an electric signal in response to the actuator being rotated.

16. The electronic device of claim 1, wherein the electronic device comprises a watch which is wearable on a user's wrist.

17. An operation method of an electronic device, the operation method comprising:
determining a posture of the electronic device;
when the posture of the electronic device is a specific posture, determining whether the electronic device is dropped or not; and
when it is determined that the electronic device is dropped, regulating a movement of an actuator of an input apparatus installed in the electronic device.

18. The operation method of claim 17, wherein, when the electronic device is moved in a gravity direction with a gravitational acceleration for longer than a threshold time, it is determined whether the electronic device is dropped.

19. The operation method of claim 17, further comprising:
determining whether the electronic device is worn or carried; and
when it is determined that the electronic device is worn or carried, placing the actuator in a state in which the actuator is movable by an external force.

20. The operation method of claim 19, further comprising:
when it is not determined that the electronic device is worn or carried, determining a posture of the electronic device;
when the posture of the electronic device is a specific posture, determining whether the electronic device is dropped; and
when it is determined that the electronic device is dropped, regulating the movement of the actuator of the input apparatus installed in the electronic device.

* * * * *